US008497450B2

(12) United States Patent
Bruland et al.

(10) Patent No.: US 8,497,450 B2
(45) Date of Patent: *Jul. 30, 2013

(54) ON-THE FLY LASER BEAM PATH DITHERING FOR ENHANCING THROUGHPUT

(75) Inventors: Kelly Bruland, Portland, OR (US);
Mark Unrath, Portland, OR (US);
Stephen Swaringen, Rockwall, TX (US); Ho Wai Lo, Portland, OR (US);
Clint Vandergiessen, Beaverton, OR (US); Keith Grant, Aloha, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1540 days.

This patent is subject to a terminal disclaimer.

(21) Appl. No.: 11/925,562

(22) Filed: Oct. 26, 2007

(65) Prior Publication Data
US 2008/0093349 A1 Apr. 24, 2008

Related U.S. Application Data

(63) Continuation-in-part of application No. 11/616,070, filed on Dec. 26, 2006, which is a continuation of application No. 10/985,840, filed on Nov. 9, 2004, now Pat. No. 7,245,412, which is a continuation-in-part of application No. 10/077,691, filed on Feb. 15, 2002, now Pat. No. 6,816,294.

(60) Provisional application No. 60/269,646, filed on Feb. 16, 2001.

(51) Int. Cl.
*B23K 26/00* (2006.01)
*B23K 26/06* (2006.01)
*B23K 26/16* (2006.01)

(52) U.S. Cl.
USPC ............ 219/121.69; 219/121.64; 219/121.65; 219/121.66; 219/121.67; 219/121.68; 219/121.7; 219/121.71; 219/121.72; 219/121.8; 438/662; 359/196.1; 359/226.2

(58) Field of Classification Search
CPC ...................................................... B23K 26/00
USPC ......... 359/196.1–226.2; 219/121.64–121.75, 219/121.77, 121.8, 121.81, 121.82; 438/662
See application file for complete search history.

(56) References Cited

U.S. PATENT DOCUMENTS

| 3,432,671 A | 3/1969 | Edmunds |
| 4,001,840 A | 1/1977 | Becker et al. |

(Continued)

FOREIGN PATENT DOCUMENTS

| JP | 55-081095 | 6/1980 |
| JP | 56-143434 | 11/1981 |

(Continued)

OTHER PUBLICATIONS

First Office action in CN 200710091523.1 dated Jul. 10, 2009, pp. 1-3.

(Continued)

*Primary Examiner* — Henry Yuen
*Assistant Examiner* — Brett Spurlock
(74) *Attorney, Agent, or Firm* — Stoel Rives LLP

(57) ABSTRACT

A laser-based workpiece processing system includes sensors connected to a sensor controller that converts sensor signals into focused spot motion commands for actuating a beam steering device, such as a two-axis steering mirror. The sensors may include a beam position sensor for correcting errors detected in the optical path, such as thermally-induced beam wandering in response to laser or acousto-optic modulator pointing stability, or optical mount dynamics.

45 Claims, 30 Drawing Sheets

U.S. PATENT DOCUMENTS

| | | | |
|---|---|---|---|
| 4,520,816 A * | 6/1985 | Schachar et al. | 606/4 |
| 4,532,402 A | 7/1985 | Overbeck | |
| 4,541,712 A * | 9/1985 | Whitney | 355/53 |
| 4,544,889 A | 10/1985 | Hendriks et al. | |
| 4,620,288 A * | 10/1986 | Welmers | 358/1.7 |
| 4,663,513 A * | 5/1987 | Webber | 219/121.6 |
| 4,678,889 A * | 7/1987 | Yamanaka | 219/121.69 |
| 4,685,775 A | 8/1987 | Goodman et al. | |
| 4,727,381 A * | 2/1988 | Bille et al. | 347/234 |
| 4,861,983 A * | 8/1989 | Sasada et al. | 250/235 |
| 4,912,487 A * | 3/1990 | Porter et al. | 347/255 |
| 4,941,082 A | 7/1990 | Pailthorp et al. | |
| 4,955,691 A * | 9/1990 | Mifune et al. | 359/29 |
| 4,969,200 A * | 11/1990 | Manns et al. | 382/288 |
| 4,980,882 A | 12/1990 | Baer et al. | |
| 4,985,927 A * | 1/1991 | Norwood et al. | 382/149 |
| 4,996,434 A * | 2/1991 | Tanaka | 250/492.3 |
| 5,027,132 A * | 6/1991 | Manns et al. | 347/225 |
| 5,074,628 A | 12/1991 | Khattak et al. | |
| 5,120,927 A * | 6/1992 | Williams et al. | 219/121.68 |
| 5,121,245 A | 6/1992 | Johnson | |
| 5,126,648 A | 6/1992 | Jacobs | |
| 5,223,692 A | 6/1993 | Lozier et al. | |
| 5,262,707 A | 11/1993 | Okazaki et al. | |
| 5,280,378 A | 1/1994 | Lombardo | |
| 5,295,014 A | 3/1994 | Toda | |
| 5,367,143 A * | 11/1994 | White, Jr. | 219/121.68 |
| 5,382,770 A | 1/1995 | Black et al. | |
| 5,414,235 A * | 5/1995 | Lucas et al. | 219/121.43 |
| 5,449,882 A | 9/1995 | Black et al. | |
| 5,452,275 A | 9/1995 | Ogawa | |
| 5,484,982 A | 1/1996 | Nihei et al. | |
| 5,491,319 A * | 2/1996 | Economikos et al. | 219/121.69 |
| 5,498,851 A * | 3/1996 | Hayashi et al. | 219/121.7 |
| 5,526,165 A * | 6/1996 | Toda et al. | 359/202.1 |
| 5,536,916 A | 7/1996 | Kohari et al. | |
| 5,566,103 A * | 10/1996 | Hyatt | 365/45 |
| 5,571,430 A | 11/1996 | Kawasaki et al. | |
| 5,596,413 A * | 1/1997 | Stanton et al. | 356/401 |
| 5,629,790 A | 5/1997 | Neukermans et al. | |
| 5,635,267 A * | 6/1997 | Yamada et al. | 428/64.4 |
| 5,653,900 A | 8/1997 | Clement et al. | |
| 5,666,202 A | 9/1997 | Kyrazis | |
| 5,673,110 A | 9/1997 | Erickson et al. | |
| 5,690,846 A * | 11/1997 | Okada et al. | 219/121.78 |
| 5,744,780 A * | 4/1998 | Chang et al. | 219/121.73 |
| 5,751,585 A * | 5/1998 | Cutler et al. | 700/161 |
| 5,798,927 A | 8/1998 | Cutler et al. | |
| 5,837,962 A * | 11/1998 | Overbeck | 219/121.68 |
| 5,847,960 A * | 12/1998 | Cutler et al. | 700/187 |
| 5,854,460 A * | 12/1998 | Graf et al. | 219/121.67 |
| 5,936,764 A * | 8/1999 | Kobayashi | 359/385 |
| 5,940,789 A | 8/1999 | Yuan | |
| 5,946,152 A | 8/1999 | Baker | |
| 5,961,859 A * | 10/1999 | Chou et al. | 219/121.63 |
| 5,973,309 A * | 10/1999 | Livingston | 250/203.1 |
| 5,981,901 A * | 11/1999 | La Rocca | 219/121.63 |
| 5,995,521 A * | 11/1999 | Moore et al. | 372/20 |
| 6,025,256 A * | 2/2000 | Swenson et al. | 438/601 |
| 6,031,852 A * | 2/2000 | Thompson et al. | 372/20 |
| 6,084,202 A * | 7/2000 | Okazaki et al. | 219/121.61 |
| 6,087,625 A * | 7/2000 | Iso | 219/121.8 |
| 6,088,107 A | 7/2000 | Livingston | |
| 6,144,118 A * | 11/2000 | Cahill et al. | 310/12.06 |
| 6,172,325 B1 * | 1/2001 | Baird et al. | 219/121.62 |
| 6,237,604 B1 * | 5/2001 | Burnside et al. | 128/897 |
| 6,243,441 B1 * | 6/2001 | Zur | 378/98.8 |
| 6,252,412 B1 * | 6/2001 | Talbot et al. | 324/754.22 |
| 6,300,590 B1 * | 10/2001 | Lauer et al. | 219/121.6 |
| 6,462,306 B1 | 10/2002 | Kitai et al. | |
| 6,479,788 B1 | 11/2002 | Arai et al. | |
| 6,521,866 B1 | 2/2003 | Arai et al. | |
| 6,555,781 B2 | 4/2003 | Ngoi et al. | |
| 6,662,063 B2 | 12/2003 | Hunter et al. | |
| 6,706,999 B1 | 3/2004 | Barrett et al. | |
| 6,720,519 B2 | 4/2004 | Liu et al. | |
| 6,794,660 B2 | 9/2004 | Watson | |
| 6,816,294 B2 * | 11/2004 | Unrath et al. | 359/225.1 |
| 6,838,639 B2 | 1/2005 | Kreuter et al. | |
| 6,849,824 B2 | 2/2005 | Arai et al. | |
| 6,875,951 B2 | 4/2005 | Sakamoto et al. | |
| 6,909,735 B2 | 6/2005 | Lizotte et al. | |
| 6,984,802 B2 | 1/2006 | Kuroiwa et al. | |
| 7,027,199 B2 | 4/2006 | Johnson | |
| 7,129,601 B2 | 10/2006 | Brown et al. | |
| 7,245,412 B2 * | 7/2007 | Bruland et al. | 359/225.1 |
| 7,608,800 B2 * | 10/2009 | Bruland et al. | 219/121.69 |
| 7,687,740 B2 * | 3/2010 | Bruland et al. | 219/121.69 |
| 7,923,306 B2 * | 4/2011 | Bruland et al. | 438/132 |
| 7,935,941 B2 * | 5/2011 | Bruland et al. | 438/662 |
| 7,964,819 B2 * | 6/2011 | Bruland | 219/121.62 |
| 2002/0003130 A1 * | 1/2002 | Sun et al. | 219/121.68 |
| 2002/0167581 A1 | 11/2002 | Cordingley | |
| 2005/0279736 A1 | 12/2005 | Bruland et al. | |
| 2005/0281101 A1 | 12/2005 | Bruland et al. | |
| 2006/0283334 A1 * | 12/2006 | Ho | 99/372 |

FOREIGN PATENT DOCUMENTS

| | | |
|---|---|---|
| JP | 63-302503 | 12/1988 |
| JP | 64-044295 | 2/1989 |
| JP | 1989-224189 | 8/1989 |
| JP | 1989-1289592 | 11/1989 |
| JP | 1990-2192885 | 7/1990 |
| JP | 03-297588 | 12/1991 |
| JP | 1996-8118057 | 5/1996 |
| JP | 10-328873 | 12/1998 |
| JP | 11-019786 | 1/1999 |
| JP | 11-104863 | 4/1999 |
| JP | 11-104871 | 4/1999 |
| JP | 11-245060 | 9/1999 |
| JP | 11-245073 | 9/1999 |
| JP | 11-267873 | 10/1999 |
| JP | 1999-11267873 | 10/1999 |
| JP | 2000-190087 | 7/2000 |
| JP | 2000-321528 | 11/2000 |
| JP | 2001-121279 | 5/2001 |
| JP | 2001-170788 | 6/2001 |
| JP | 2001-269790 | 10/2001 |
| JP | 2002-011588 | 1/2002 |
| JP | 2002-361464 | 12/2002 |
| JP | 2003-053561 | 2/2003 |
| JP | 2003-053575 | 2/2003 |
| JP | 2003-053576 | 2/2003 |
| JP | 2005-177788 | 7/2005 |

OTHER PUBLICATIONS

Office action dated Sep. 7, 2010 issued by the Japanese Patent Office for corresponding Japanese Patent Application No. 2007-114,770.

U.S. Appl. No. 11/616,070, filed Dec. 26, 2006, Bruland et al.

"Precision Fast Steering Mirrors," Bali Aerospace & Technologies Corp., Bolder, CO, ©1999, pp. 1-3.

"S-330 QxQy Ultra-Fast Piezo Tip/Tilt Platforms," Physik instrumente (PI) GmbH & Co., Karlsruhe, Germany, printed Feb. 5, 2002 from www.physikinstrurnente.com/pztactiveoptics/3_10.html, pp. 1-5.

"Fast Steering Mirrors", Newport Corporation, Irvine, California, Jan. 2001, 4 pages.

"Fast Steering Mirror Technology: Active Beam Stabilization", Phillip V. Mitchell, Newport Corporation, Irvine, California, Jan. 2001, 6 pages.

English translation of Paragraphs 0013-0028 and drawing captions of JP 2000-321528 (Nov. 24, 2000) "Document 3" (DA).

English translation of Paragraphs 0001-0031, 0054, and 0057 and brief description of drawings of JP 1999-11267873 (Oct. 5, 1999) "Document 2" (DB).

English translation of Paragraphs 0035-0038 and drawing captions of JP 1996-8118057 (May 14, 1996) "Document 4" (DC).

English translation of JP 1989-1289592 (without claims) (Nov. 21, 1989) "Document 1" (DE).

Office action dated Apr. 14, 2010 issued by the Japanese Patent Office for corresponding Japanese Patent Application No. 2007-114,770.

Office action dated Apr. 19, 2011 issued by the Japanese Patent Office for corresponding Japanese Patent Application No. 2007-114,770.
Office action dated Oct. 27, 2011 issued by the Chinese Patent Office for corresponding Chinese Patent Application No. 2007-10091523.1.
Office action dated Mar. 30, 2011 issued by the USPTO for related U.S. Appl. No. 11/616,070.

Office action dated Jan. 5, 2012 issued by the USPTO for related U.S. Appl. No. 11/616,070.
Office action dated Jul. 23, 2013 issued by the Chinese Patent Office for corresponding Chinese Patent Application No. 2007-10091523.1.

* cited by examiner

ON-THE FLY LASER BEAM PATH DITHERING FOR ENHANCING THROUGHPUT

RELATED APPLICATIONS

This is a continuation-in-part of U.S. patent application Ser. No. 11/616,070, filed Dec. 26, 2006, which is a continuation of U.S. patent application Ser. No. 10/985,840, filed Nov. 9, 2004, now U.S. Pat. No. 7,245,412, which is a continuation-in-part of U.S. patent application Ser. No. 10/077,691, filed Feb. 15, 2002, now U.S. Pat. No. 6,816,294, which claims benefit of U.S. Provisional Patent Application No. 60/269,646, filed Feb. 16, 2001.

TECHNICAL FIELD

This invention relates to laser processing of integrated circuit ("IC") links and, in particular, to a laser system and method employing a laser beam and substrate positioning system that incorporates a steering mirror to compensate for stage positioning errors and enhance link severing throughput.

BACKGROUND OF THE INVENTION

Yield-reducing defects, such those as resulting from particulate contaminants or alignment variations of subsurface layers or patterns, often occur in IC device fabrication processes. FIGS. 1, 2A, and 2B show repetitive electronic circuits 10 of an IC device or workpiece 12 that are typically fabricated in rows or columns to include multiple iterations of redundant circuit elements 14, such as spare rows 16 and columns 18 of memory cells 20. With reference to FIGS. 1, 2A, and 2B, circuits 10 are also designed to include particular laser severable circuit links 22 between electrical contacts 24 that can be removed to disconnect a defective memory cell 20, for example, and substitute a replacement redundant cell 26 in a memory device such as a DRAM, an SRAM, or an embedded memory. Similar techniques are also used to sever links to program a logic product, gate arrays, or ASICs.

Links 22 are designed with conventional link widths 28 of about 2.5 microns, link lengths 30, and element-to-element pitches (center-to-center spacings) 32 of about 8 microns or less from adjacent circuit structures or elements 34, such as link structures 36. Link dimensions and pitches are continually being reduced by device manufacturers, and smaller links 22 may have widths 28 of about 0.5 microns and pitches 32 of about 2 microns. Although the most prevalent link materials have been polysilicon and like compositions, memory manufacturers have more recently adopted a variety of more conductive metallic link materials that may include, but are not limited to, aluminum, copper, gold nickel, titanium, tungsten, platinum, as well as other metals, metal alloys such as nickel chromide, metal nitrides such as titanium or tantalum nitride, metal silicides such as tungsten silicide, or other metal-like materials.

Circuits 10, circuit elements 14, or cells 20 are tested for defects. The links to be severed for correcting the defects are determined from device test data, and the locations of these links are mapped into a database or program. Laser pulses have been employed for more than 20 years to sever circuit links 22. FIGS. 2A and 2B show a laser spot 38 of spot size diameter 40 impinging a link structure 36 composed of a link 22 positioned above a silicon substrate 42 and between component layers of a passivation layer stack including an overlying passivation layer 44 (shown in FIG. 2A but not in FIG. 2B) and an underlying passivation layer 46 (shown in FIG. 2B but not in FIG. 2A). FIG. 2C is a fragmentary cross-sectional side view of the link structure of FIG. 2B after the link 22 is removed by the laser pulse.

FIG. 3 is a plan view of a beam positioner travel path 50 performed by a traditional link processing positioning system. Because links 22 are typically arranged in rows 16 and columns 18 (representative ones shown in dashed lines), the beam position and hence the laser spots 38 are scanned over link positions along an axis in a first travel direction 52, moved to a different row 16 or column 18, and then scanned over link positions along an axis in a second travel direction 54. Skilled persons will appreciate that scanning may include moving the workpiece 12, moving the laser spot 38, or moving the workpiece 12 and the laser spot 38. Skilled persons will also appreciate that many different link layouts are possible and that FIG. 3 is merely a representative layout.

Traditional positioning systems are characterized by X-Y translation tables in which the workpiece 12 is secured to an upper stage that moves along a first axis and is supported by a lower stage that moves along a second axis that is perpendicular to the first axis. Such systems typically move the workpiece relative to a fixed beam position or laser spot 38 and are commonly referred to as stacked stage positioning systems because the lower stage supports the inertial mass of the upper stage which supports workpiece 12. These positioning systems have excellent positioning accuracy because interferometers are typically used along each axis to determine the absolute position of each stage. This level of accuracy is preferred for link processing because the laser spot size 40 is typically only a little bigger than link width 28, so even a small discrepancy between the position of laser spot 38 and link 22 can result in incomplete link severing. In addition, the high density of features on semiconductor wafers results in small positioning errors potentially causing laser damage to nearby structures. Stacked stage positioning systems are, however, relatively slow because the starting, stopping, and change of direction of the inertial mass of the stages increase the time required for the laser tool to process all the designated links 22 on workpiece 12.

In split-axis positioning systems, the upper stage is not supported by, and moves independently from, the lower stage and the workpiece is carried on a first axis or stage while the tool, such as a fixed reflecting mirror and focusing lens, is carried on the second axis or stage. Split-axis positioning systems are becoming advantageous as the overall size and weight of workpieces 12 increase, utilizing longer and hence more massive stages.

More recently, planar positioning systems have been employed in which the workpiece is carried on a single stage that is movable by two or more actuators while the tool remains in a substantially fixed position. These systems translate the workpiece in two dimensions by coordinating the efforts of the actuators. Some planar positioning systems may also be capable of rotating the workpiece.

Semiconductor Link processing ("SLP") systems built by Electro Scientific Industries, Inc. ("ESI") of Portland, Oreg. employ on-the-fly ("OTF") link processing to achieve both accuracy and high throughput. During OTF processing, the laser beam is pulsed as a linear stage beam positioner passes designated links 12 under the beam position. The stage typically moves along a single axis at a time and does not stop at each link position. The on-axis position of beam spot 38 in the direction travel 52 does not have to be accurately controlled; rather, its position is accurately sensed to trigger laser spot 38 to hit link 22 accurately.

In contrast and with reference again to FIG. 3, the position of beam spot 38 along cross-axes 56 or 58 is controlled within specified accuracy as the beam positioner passes over each link 22. Due to the inertial mass of the stage or stages, a set-up move to start an OTF run produces ringing in the cross-axis position, and the first link 22 in an OTF run cannot be processed until the cross-axis position has settled properly. The settling delay or setting distance 60 reduces processing throughput. Without a settling delay (or, equivalently, a buffer zone of settling distance 60) inserted before the first laser pulse, several links 22 would be processed with serious cross-axis errors.

Although OTF speed has been improved by accelerating over gaps in the link runs, one limiting factor on the effectiveness of this "gap profiling" is still the requirement for the cross-axis to settle within its specified accuracy. At the same time, feature sizes, such as link length 30 and link pitch 32, are continuing to decrease, causing the need for dimensional precision to increase. Efforts to further increase the performance of the stage or stages substantially increase the costs of the positioning system.

The traditional way to provide for two-axis deflection of a laser beam employs a high-speed short-movement positioner ("fast positioner") 62, such as a pair of galvanometer driven mirrors 64 and 66 shown in FIG. 4. FIG. 4 is a simplified depiction of a galvanometer-driven X-axis mirror 64 and a galvanometer-driven Y-axis mirror 66 positioned along an optical path 70 between a fixed mirror 72 and focusing optics 78. Each galvanometer-driven mirror deflects the laser beam along a single axis. U.S. Pat. No. 4,532,402 of Overbeck discloses a stacked stage beam positioning system that employs such a fast positioner, and U.S. Pat. Nos. 5,751,585 and 5,847,960 of Cutler et al. disclose split-axis beam positioning systems in which the upper stage(s) carry at least one fast positioner. Systems employing such fast positioners are used for nonlink blowing processes, such as via drilling, because they cannot currently deliver the beam as accurately as "fixed" laser head positioners.

The split-axis nature of such positioners may introduce rotational Abbe errors, and the galvanometers may introduce additional positioning errors. In addition, because there must be separation between the two galvanometer-controlled mirrors, the mirrors cannot both be located near the entrance pupil to the focusing optics. This separation results in an offset of the beam that can degrade the quality of the focused spot. Moreover, two-mirror configurations constrain the entrance pupil to be displaced farther from the focusing optics, resulting in an increased complexity and limited numerical aperture of the focusing optics, therefore limiting the smallest achievable spot size. Even assuming such positioners could be used for link-severing, the above-described spot quality degradation would cause poor quality link-severing or incomplete link-severing and result in low open resistance across severed links 22.

What is still needed, therefore, is a system and method for achieving higher link-processing throughput while maintaining focused spot quality.

SUMMARY OF THE INVENTION

An object of the invention is, therefore, to provide a system and/or method for achieving higher link-processing throughput while maintaining focused spot quality.

Another object of the invention is to employ a two-axis steering mirror to correct for linear stage settling errors.

A further object of the invention is to provide a positioner system employing coordinated motion for semiconductor link processing applications.

This invention preferably employs a two-axis steering mirror, pivotally mounted at the entrance pupil of the focusing lens, to perform small-angle motions that deflect the laser beam enough to compensate for cross-axis settling errors on the order of tens of microns. Although the settling errors occur in both axes, one embodiment of this invention is concerned primarily with correcting settling errors in a cross-axis direction to the OTF direction of linear stage travel. A two-axis steering mirror is employed for these corrections because either axis of the linear stage may be used as the OTF axis. The beam steering mirror is preferably used for error correction only and does not require coordination with or modification of the linear stage position commands, although such coordination is possible. The steering mirror may also be employed to correct for various sensed system errors, such as thermal drift, optical distortions, and optical path device errors that lead to laser beam wandering.

At least three technologies can be used to tilt a mirror in two axes about a single pivot point. Two of these technologies create a fast steering mirror (FSM) using voice coil actuators or piezoelectric actuators to tilt a mirror. Piezoelectric FSMs are preferred. Deformable mirrors represent a third technology and employ piezoelectric or electrostrictive actuators to deform the surface of a mirror. Other beam steering technologies can be used to tilt a mirror in practice of the invention.

Advantages of the invention include the elimination of cross-axis settling time, resulting in increased throughput particularly for SLP systems. The invention also facilitates improved manufacturability of the main positioning stage(s) due to relaxed servo performance requirements because the steering mirror can correct for linear stage errors.

Additional objects and advantages of this invention will be apparent from the following detailed description of preferred embodiments thereof which proceed with reference to the accompanying drawings.

DETAILED DESCRIPTION OF PREFERRED EMBODIMENTS

One embodiment of a representative beam positioning system is described in detail in U.S. Pat. No. 4,532,402 of Overbeck, which is assigned to the assignee of this application. A preferred X-Y stage is a "Dynamix" model available from Newport Corporation of Irvine, Calif.

The beam positioning system preferably employs a laser controller that controls a stacked, split-axis, or planar positioner system and coordinates with reflectors to target and focus laser system output to a desired laser link 22 on IC device or workpiece 12. The beam positioning system permits quick movement between links 22 on the same or different workpieces 12 to effect unique link-severing operations based on provided test or design data. The beam positioning system may alternatively or additionally employ the improvements, beam positioners, or coordinated motion schemes described in U.S. Pat. Nos. 5,751,585, 5,798,927, and 5,847,960 of Cutler et al., which are assigned to the assignee of this application. Other fixed head or linear motor driven conventional positioning systems could also be employed, as well as the systems employed in the 9000, 9800, and 1225 model series manufactured by ESI of Portland, Oreg., the assignee of this patent application.

Figure 4:
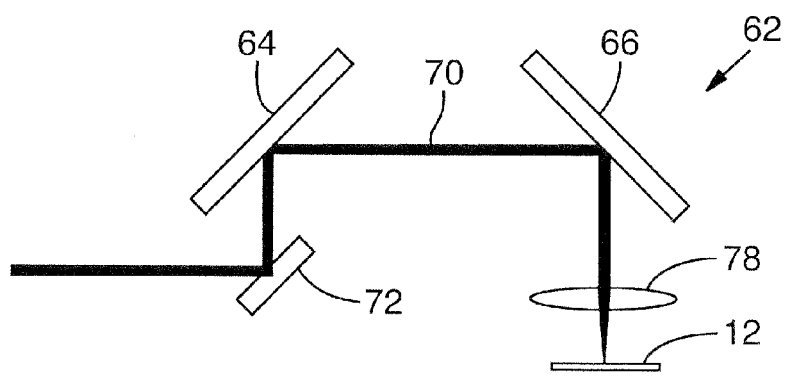
FIG. 4 is a simplified side view of a prior art fast positioner employing a pair of galvanometer-driven mirrors that deflect the laser beam along different respective single axes.
Figure 5:
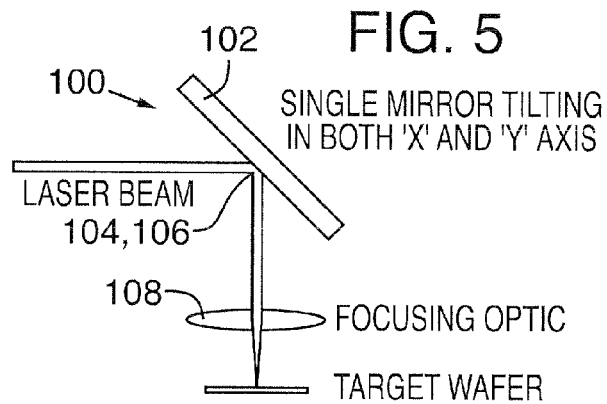
FIG. 5 schematically illustrates a side sectional view of a preferred two-axis mirror employed in the practice of the invention.
Figure 6:
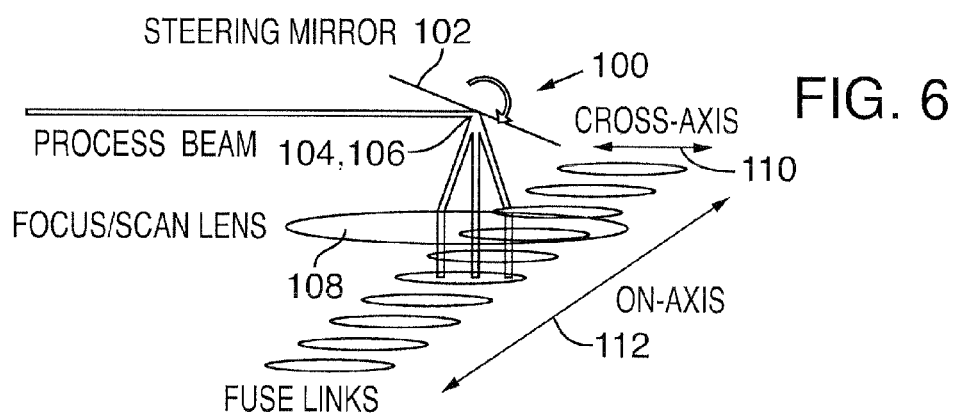
FIG. 6 schematically illustrates a partial front view of a preferred two-axis mirror employed in the practice of the invention.

With reference to FIGS. 5 and 6 and with respect to this invention, the final turn mirror of a fixed head system or alternatively fast positioner 66 (FIG. 4) is preferably replaced by a single high-speed, high-accuracy two-axis steering mirror system 100 that includes a mirror 102 capable of actuation with at least two degrees of freedom. Mirror 102 has a centrally positioned pivot point 104 that preferably coincides with an entrance pupil 106 of a focusing lens 108. Two-axis steering mirror system 100 is preferably used for error correction, although it may be employed for beam steering because either axis of the linear stage may be used as the OTF axis.

Because the beam is focused to a very fine spot size for SLP applications, the mechanism directing mirror system 100 preferably pivots the mirror 102 along at least two axes about pivot point 104, which is located at or near the entrance pupil of focusing optics or lens 108. Small angle perturbations in the position of mirror 102 deflect the beam enough to correct for linear stage settling errors at the work surface, and because mirror 102 is located at or near the entrance pupil of focusing lens 108, the beam is shifted without distorting the focused spot, allowing delivery of a small, high quality spot.

In one embodiment, settling errors in a cross-axis direction 110 are corrected by mirror 102, while motion in an on-axis direction 112 is not corrected. This single-axis correction allows the linear stage interferometer feedback to be the sole source of laser pulse triggering. However, with proper coordination, on-axis direction 112 steering mirror 102 motion is possible, although it complicates the design and introduces additional error sources that can degrade on-axis direction 112 accuracy if such errors are not addressed.

Motion in each axis of mirror 102 exhibits scale factor and offset errors, noise, and cross-axis coupling. These error sources can be well-controlled and calibrated out in the system, with noise and temperature stability effects controlled through conventional design techniques.

Figure 1:
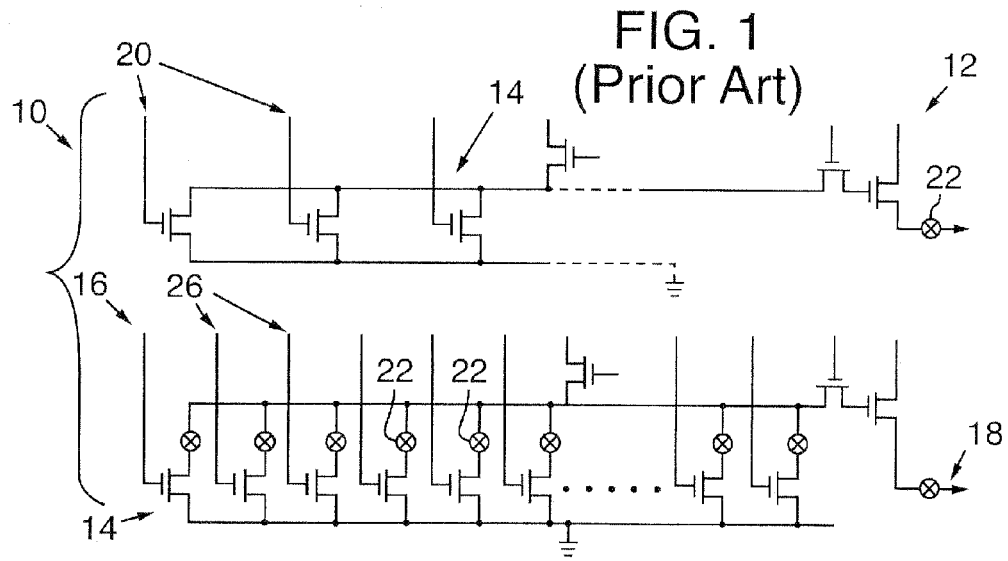
FIG. 1 is a schematic diagram of a portion of a DRAM showing the redundant layout of and programmable links in a spare row of generic circuit cells.
Figure 2A:
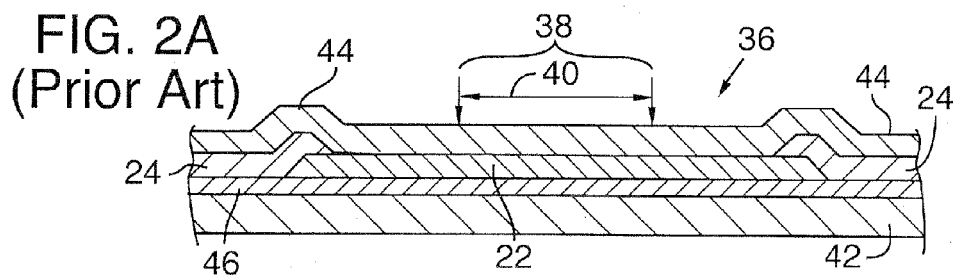
FIG. 2A is a fragmentary cross-sectional side view of a conventional, large semiconductor link structure receiving a laser pulse characterized by prior art pulse parameters.
Figure 2B:
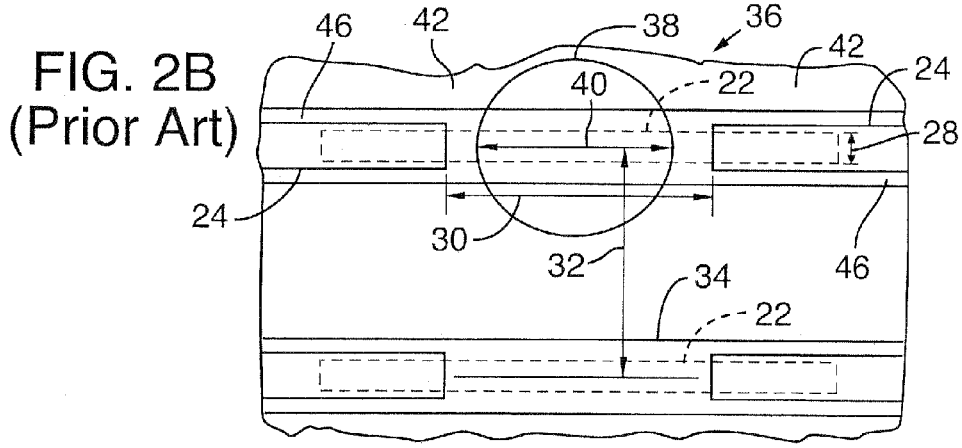
FIG. 2B is a fragmentary top view of the link structure and the laser pulse of FIG. 2A, together with an adjacent circuit structure.
Figure 2C:
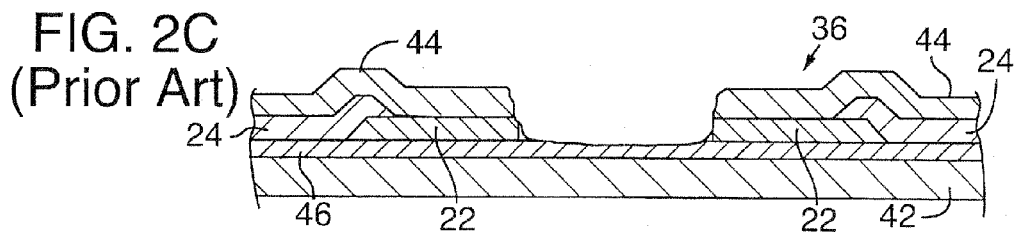
FIG. 2C is a fragmentary cross-sectional side view of the link structure of FIG. 2B after the link is removed by the prior art laser pulse.
Figure 3:
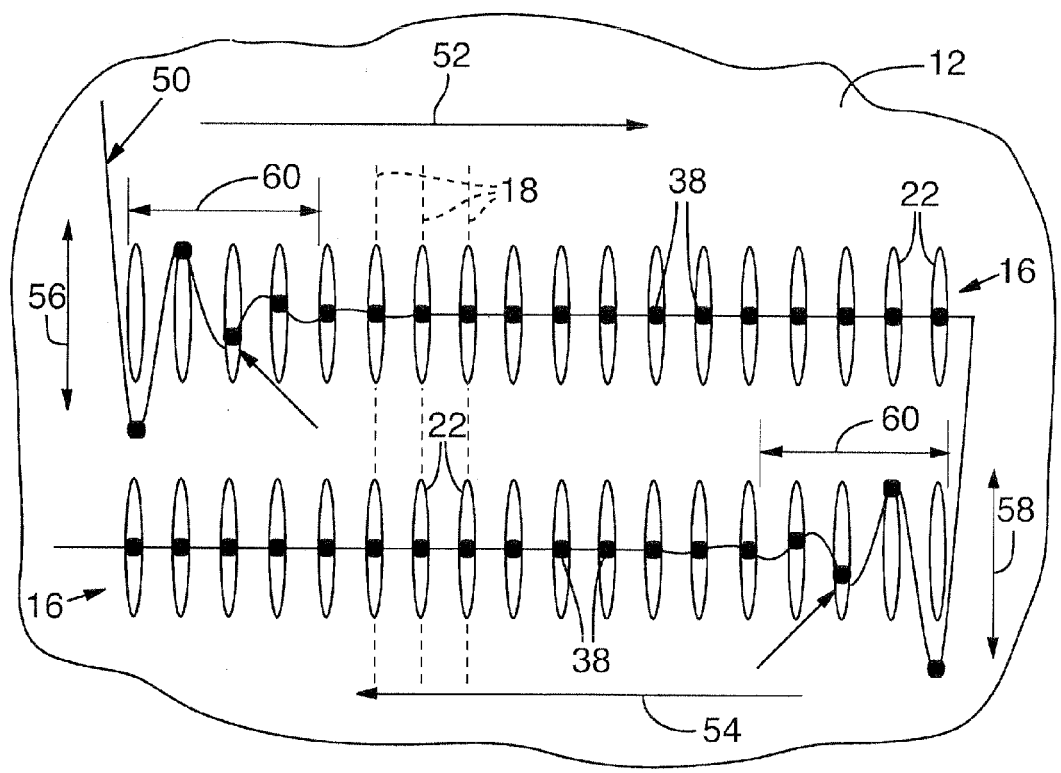
FIG. 3 is a plan view of a prior art beam travel path.

Calibration of mirror system 100 through beam-to-work ("BTW") alignments can correct for any non-linearity and alignment errors in steering mirror 102. Traditionally, the term beam-to-work is used as nomenclature for the process of scanning the linear stage back and forth, while directing the laser beam spot at low power at an alignment target on the wafer or workpiece 12 (FIG. 1). Optical measurements of the reflection off the target are used to precisely determine target and hence wafer location. By scanning several targets with BTW scans, the offset and rotation of the wafer relative to the beam spot can be ascertained. It is also possible to map out other effects such as axis orthogonality and positional distortions.

After mirror system 100 is added to the laser system, traditional BTW type scans can be used to map out any inaccuracies/nonlinearities in steering mirror 102 response. This is accomplished by doing a BTW scan with mirror 102 in the nominal zero offset (in either axis) position. Then mirror 102 is tilted, and another BTW scan is performed to determine how much lateral offset of the laser beam spot is imparted by the tilt. By measuring the offset caused by numerous mirror tilts in the U and V axes, mirror system 100 can be fully characterized.

Once the response of mirror system 100 is determined to sufficiently fine precision, then instead of moving the linear stage back and forth, it is possible to use mirror system 100 for subsequent BTW type alignment scans.

Figure 7:
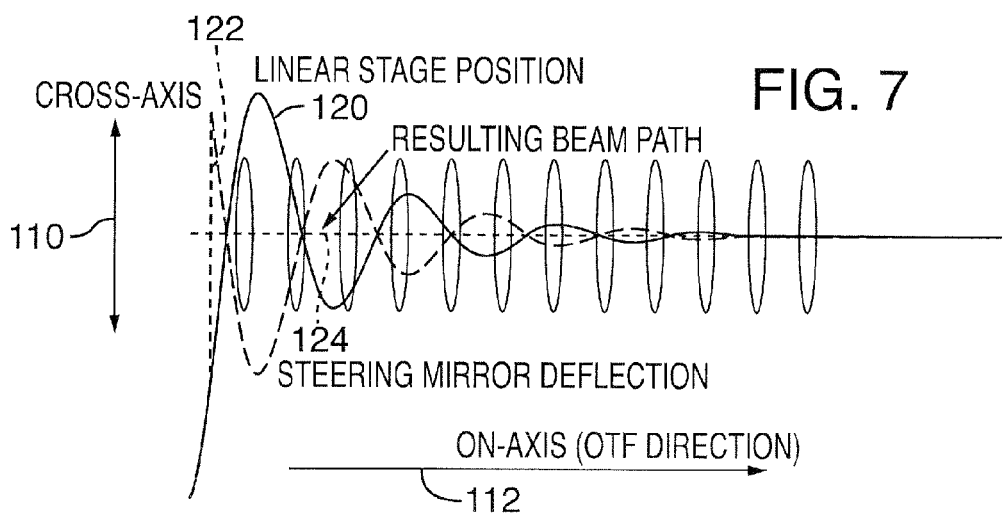
FIG. 7 illustrates the effect of the steering mirror during the OTF run.

FIG. 7 illustrates the corrective effect of two-axis steering mirror system 100 during an OTF run. A linear stage ringing is represented by a ringing curve 120. Mirror 102 deflects the laser beam in cross-axis direction 110 as represented by a correction curve 122 that is the inverse of ringing curve 120. The resulting beam position is the sum of the linear stage motion and the deflected beam position and is represented by a resulting beam path curve 124, which is free from cross-axis error.

Figure 8:
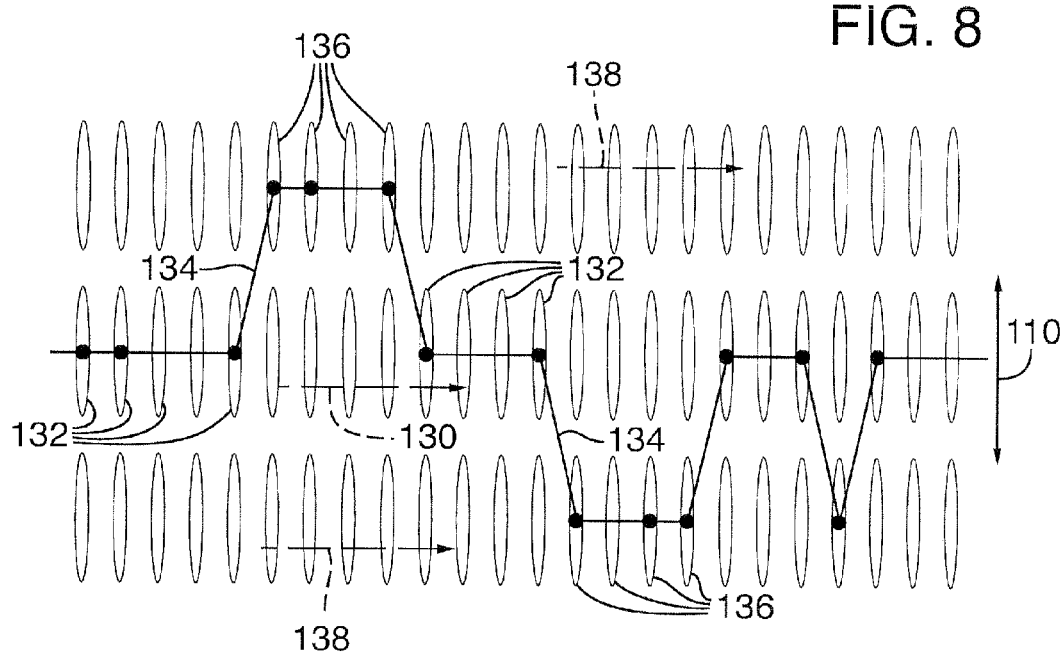
FIG. 8 illustrates an exemplary multi-row, cross-axis dithering ("MRCAD") operational mode work path.

FIG. 8 illustrates using steering mirror system 100 for MRCAD processing during boustrophedon or raster scanning in the context of link severing to further improve the speed at which links are blown. In a preferred mode of operation, MRCAD scanning is done in cross-axis direction 110 while moving along a row 130 of links 132. In preferred embodiments, MRCAD scanning employs steering mirror 102 (FIGS. 5 and 6) to direct the laser beam along a pathway 134 at links 132 and adjacent links 136 in adjacent rows 138 without needing to move the slower linear motion stage in cross-axis direction 110. This is possible because not all the links in each row need to be blown. Link processing becomes far more efficient with MRCAD because the linear or stages do not have to be scanned or slewed down each row, so the total number of link row scans can be substantially reduced. As integration increases and link sizes, spot sizes, and pitch distance decrease, MRCAD scanning will become an even more valuable technique.

In another mode, supplemental on-axis dithering ("SOAD") uses mirror 102 to deflect the beam in on-axis direction 112 (FIGS. 5-7). In this operational mode, the beam can be quickly directed ahead in on-axis direction 112, severing links while the linear motion stage catches up. The SOAD scan ahead or scan behind the stage feature allows the positioning system to reduce stage velocity changes or to sever several links during a single slowed movement segment.

As indicated above, there are at least three technologies that can be employed to tilt mirror 102 in two axes about pivot point 104. The FSMs, which are preferred, use voice coil actuators or piezoelectric actuators to tilt the surface of mirror 102. Suitable voice coil actuated FSMs are available from Ball Aerospace Corporation of Broomfield, Colo. and Newport Corporation of Irvine, Calif. However, the preferred actuator is a model S-330 Ultra-Fast Piezo Tip/Tilt Platform manufactured by Physik Instrumente ("PI") GmbH & Co. of Karlsruhe, Germany.

Traditional galvanometers are not typically used for this application because they each tilt a mirror about only one axis and ordinarily have insufficient positioning accuracy. Moreover, a pair of physically separated galvanometer mirrors is required for two axes of actuation. This separation is incompatible with the desire that actuation occur about one pivot point located near the entrance pupil of focusing lens 108 (FIGS. 5 and 6) to maintain a high quality laser spot at the surface of workpiece 12. Nevertheless, it is possible to employ galvanometer deflected mirrors in this invention, particularly if employed in single-axis and small deflection applications to maintain accuracy and well focused laser spots.

Figure 9:
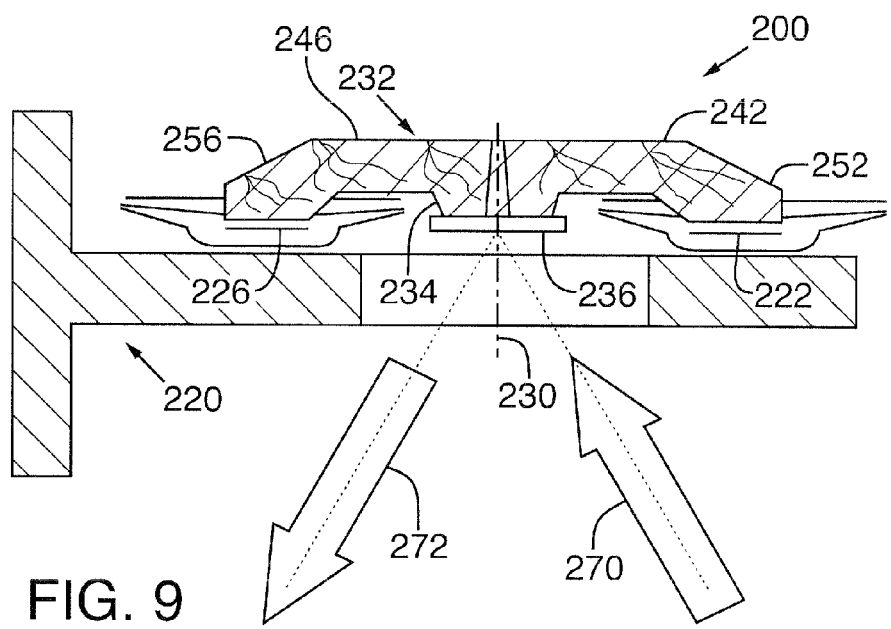
FIG. 9 is a side sectional view of a representative two-axis steering mirror.
Figure 10:
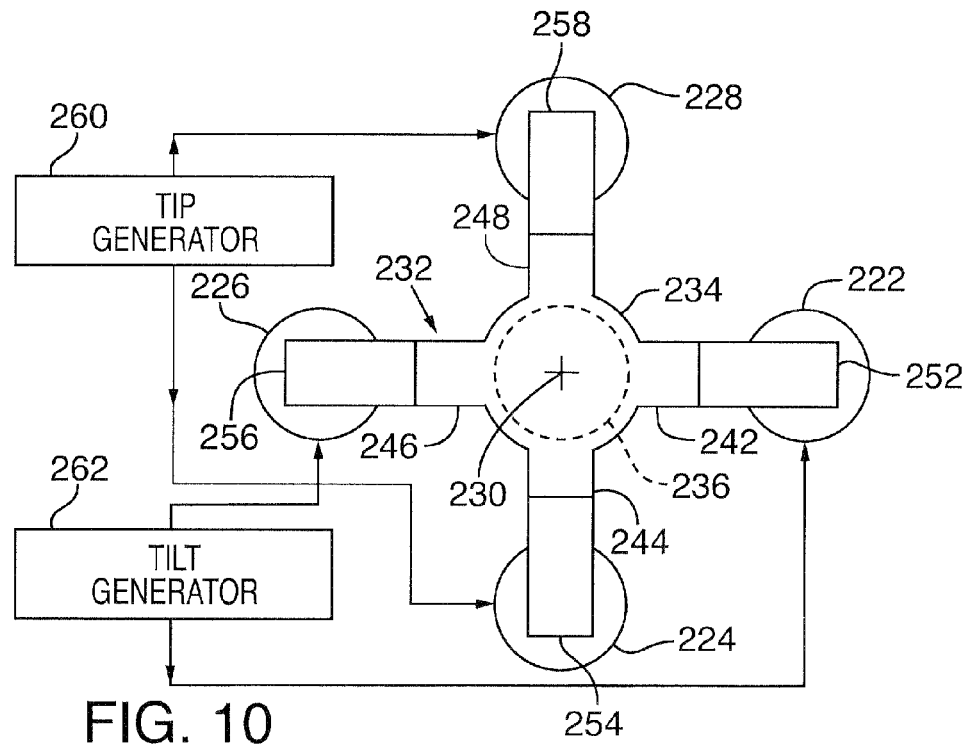
FIG. 10 is a simplified plan view of a representative two-axis steering mirror.

By way of example only, FIGS. 9 and 10 show an FSM two-axis mirror system 200 in which four electrical to mechanical vibration generators or transducers are supported by a transducer support platform 220 in a quadrature relationship, whereby transducers 222, 224, 226, and 228 are positioned at 0, 90, 180, and 270 degrees with respect to a central axis 230; therefore, adjacent ones of the transducers are set at right angles with respect to each other. A movable mirror support member 232 has a central portion or hub 234 bearing a mirror or reflective surface 236 centered with respect to axis 230. Mirror 236 has a diameter of about 30 mm or less to reduce its weight and facilitate high frequency response for desired beam correction. Mirror 236 is coated with conventional laser optical coatings to account for laser wavelength or design parameters.

Four lightweight rigid struts or elongated members 242, 244, 246, and 248 extend radially from hub 234 of mirror support member 232, and have respective peripheral terminal portions 252, 254, 256, and 258 affixed to respective transducers 222, 224, 226, and 228, which are electrically movable voice coils. For a further description of a suitable conventional voice coil/loudspeaker arrangement, see Van Nostrand's Scientific Encyclopedia, Sixth Edition, page 1786. The use of such conventional loudspeaker coils for the transducers to perform mechanical actuation, decreases the manufacturing cost of the apparatus. The floating mirror support 232 can beneficially be made of a lightweight material, such as metal (e.g. aluminum or beryllium) or plastic, enabling rapid response to the electrical input signals to the voice coils to be described.

A tip control generator 260 is connected to transducers 224 and 228 to cause them to move in a complementary "push pull" relationship with each other. Similarly, a tilt control generator 262 is connected to transducers 222 and 226 to cause these coils to also move in a complementary push pull relationship with each other. A laser beam 270 is reflected off reflective surface 236 and a reflected beam 272 is positioned by the generators controlling the cross axis, which is perpendicular to OTF direction of travel, to compensate for cross axis errors. The pairs of signals produced by each generator assume a push-pull relationship, so that when transducer 222 is pulling upper terminal portion 252 of support member 232 to the right in FIG. 10, lower transducer 226 is pushing terminal portion 256 to the left, to tilt reflective surface 236, thereby deflecting reflected beam 272. The actuation can be alternated at the beginning of an OTF run, for example, to move reflective surface 236 at a proper frequency and damped amplitude to compensate for linear stage ringing in cross-axis direction 110, thereby eliminating the negative effects of linear stage settling time and producing a relatively straight beam path. Thus, links that would otherwise be in the conventional buffer zone can be processed accurately.

Mirror systems suitable for use with this invention can be implemented with a large enough field to do MRCAD scans by providing beam deflection in a range of about 50 to 100 microns; however, such mirror systems can also be implemented for cross-axis correction only by providing beam deflection in a range of about 10 to 50 microns or as little as about 10 to 20 microns. The mirror is preferably positioned within about plus or minus 1 mm of the entrance pupil of the focusing lens. These ranges are exemplary only and can be modified to suit the system design and particular link processing applications.

The preferred model S-330 Tip/Tilt Platform manufactured by PI uses piezoelectric actuators for high speed, two-dimensional mirror tilting. Strain gage sensors accurately determine mirror position and provide feedback signals to the control electronics and drive circuitry. A more complete description of the model S-330 Tip/Tilt Platform is available at the PI web site, www.physikinstrumente.com.

The main advantages of the PI Piezo Tip/Tilt Platform are that the device is commercially available and has a very compact size that readily mounts in an ESI model 9820 positioning system.

A disadvantage of the PI Piezo Tip/Tilt Platform is that its beam deflection range limits its use in the MRCAD application of FIG. 8, even though the beam deflection range is sufficient for error correction applications. Specifically, the PI Piezo Tip/Tilt Platform is capable of a ±5 micron beam deflection range. Positioning the linear stage in the cross-axis direction to enable the steering mirror to process one row of links with a +4 micron deflection and then positioning the linear stage to process an adjacent row of links with a −4 micron deflection would afford an 8 micron shift of the laser beam in the cross-axis direction. Combining the operations of the linear stage and steering mirror in this manner leaves available very little remaining beam deflection range. Moreover, nonlinear motion, thermal drift, hysteresis, and high-voltage actuation are all inherent problems with piezoelectric actuation that have to be accounted for. Calibration techniques, application of feedback control, and good system design can appropriately manage these challenges.

In addition to all the other above-described advantages, this invention permits a relaxation on the requirements for the linear motors (jerk time, settling time) using the secondary system to correct for errors. This substantially reduces the cost of the linear motors and also reduces the dependency of the system throughput on the acceleration limit of the linear stage or stages.

Figure 11:
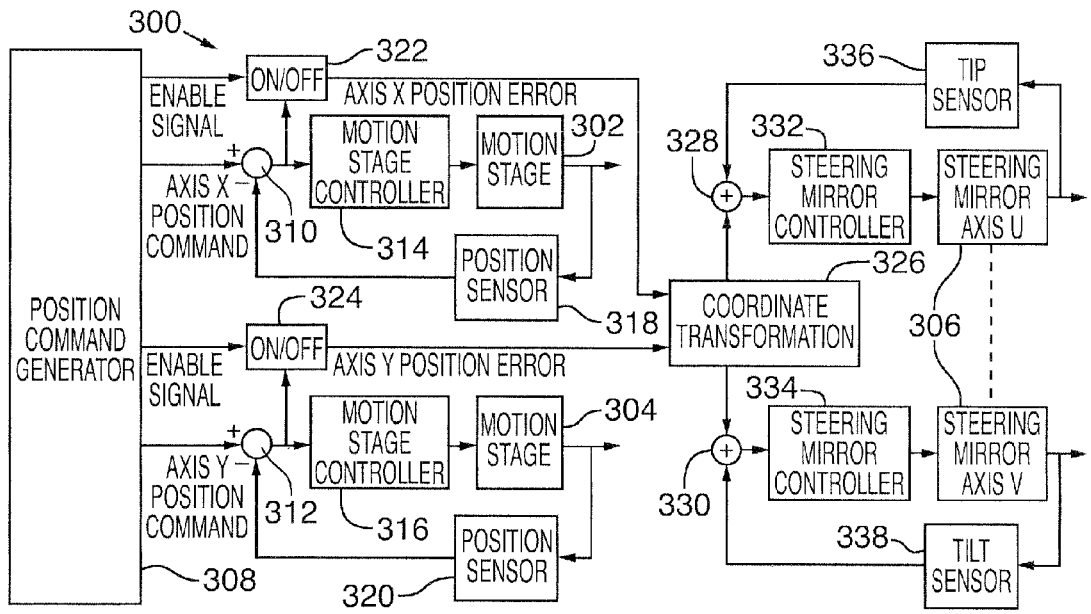
FIG. 11 is a simplified schematic block diagram of an exemplary positioner control system for coordinating the stage positioning and the steering mirror for error correction.

FIG. 11 shows an embodiment of a positioner control system 300 of this invention for coordinating the positioning of X- and Y-axis motion stages 302 and 304, and also the positioning of a two-axis steering mirror 306 for positioning error correction. Of course, motion stages 302 and 304 may be combined into a single planar motion stage having positioning control in the X- and Y-axis directions. In a standard operational mode, two-axis steering mirror 306 is used to correct positioning errors caused by X- and Y-axis motion stages 302 and 304.

A position command generator 308 generates X- and Y-axis position command signals for delivery through summing junctions 310 and 312 to X- and Y-axis motion controllers 314 and 316 to respective X- and Y-axis motion stages 302 and 304. The actual positions of X- and Y-axis motion stages 302 and 304 are sensed by respective X- and Y-axis position sensors 318 and 320 and signals representing the actual positions are conveyed to adders or summing junctions 310 and 312 to generate X- and Y-axis position error signals. X- and Y-axis motion controllers 314 and 316 receive the error signals and act to minimize any errors between the commanded and actual positions. For high-accuracy applications, X- and Y-axis position sensors 318 and 320 are preferably interferometers.

Residual error signals, such as those generated by ringing, are conveyed through enabling gates 322 and 324 to a coordinate transformation generator 326, which may be optional depending on whether motion stages 302 and 304 share a common coordinate system with two-axis steering mirror 306. In either event, the residual error signals are passed through adders or summing junctions 328 and 330 to U- and V-axis steering mirror controllers 332 and 334, which act to tip and/or tilt steering mirror 306 by controlled amounts to deflect, for example, laser beam 270 (FIG. 9) to correct for positioning errors of X- and Y-axis motion stages 302 and 304. The actual tip and/or tilt positions of two-axis steering mirror 306 are sensed by respective tip and tilt sensors 336 and 338 and signals representing the actual tip and tilt positions are conveyed to adders or summing junctions 328 and 330 to generate tip and tilt position error signals. U- and V-axis steering mirror controllers 332 and 334 receive the error signals and act to correct any errors between the commanded and actual positions. For high-accuracy applications, two-axis steering mirror 306 is preferably a piezoelectric tilt/tip platform, and position sensors 318 and 320 are preferably strain gages. Suitable alternative sensors may include optical, capacitive, and inductive sensing techniques. In this embodiment, skilled workers will understand that U- and V-axis steering mirror controllers 332 and 334 should be adapted to provide zero to 100 volt drive signals to the piezoelectric actuators deflecting two-axis steering mirror 306.

Enabling gates 322 and 324 implement a provision in which position command generator 308 can selectively disable position error correction for either the X or the Y axis, thereby enabling error correction for the cross-axis while leaving the on-axis unaffected, or vice versa.

Figure 12:
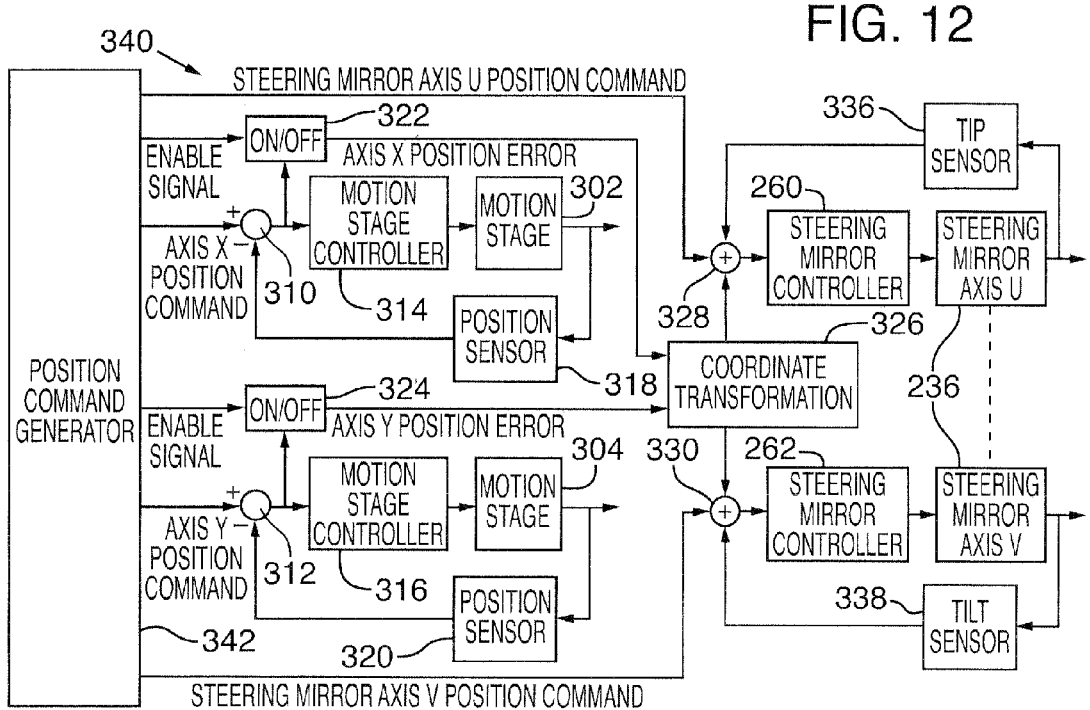
FIG. 12 is a simplified schematic block diagram of an exemplary positioner control system for coordinating the stage positioning and the steering mirror for beam-to-work scans and error correction.

FIG. 12 shows an embodiment of a positioner control system 340 for coordinating the positioning of X- and Y-axis motions stages 302 and 304 and, in this embodiment, FSM 236 (FIGS. 9 and 10) for MRCAD scans and positioning error correction. In an extended operational mode, the steering mirror is used for error correction and MRCAD scanning. In this mode of operation, a position command generator 342 generates X- and Y-axis positioning commands for X- and Y-axis motion stages 302 and 304 and also U- and V-axis tip and tilt commands for deflecting FSM 236. Summing junctions 328 and 330 generate the positioning command for FSM 236 as the sum of the error signals from X- and Y-axis motion stages 302 and 304 and, in this embodiment, also the U- and V-axis tip and tilt commands.

The error signals are generated in the same manner as in the standard error correction mode. The additional U- and V-axis tip and tilt commands are produced by position command generator 342 to accomplish the desired beam-to-work scanning. Because beam-to-work and MRCAD applications typically require wider ranges of mirror deflection, this embodiment of the invention preferably employs voice coil actuated FSM two-axis mirror system 200. However, the following MRCAD applications further allow using a FSM having a more limited range of mirror deflection.

The MRCAD link processing application of FIG. 8 shows combining three adjacent link runs into an MRCAD link run by employing cross-axis laser beam positioning. In the preferred operating mode, FSM 200 is employed to deflect the laser beam during a first link run to laterally spaced link runs because it is faster than the linear stage. While the FSM is very fast and is excellent for jumping laterally, it has a limited deflection range. Therefore, this invention further includes alternate operational modes, some of which also employ the linear stage for cross-axis motion. Other operational modes employ only the linear stage for cross-axis motion.

Figure 13:
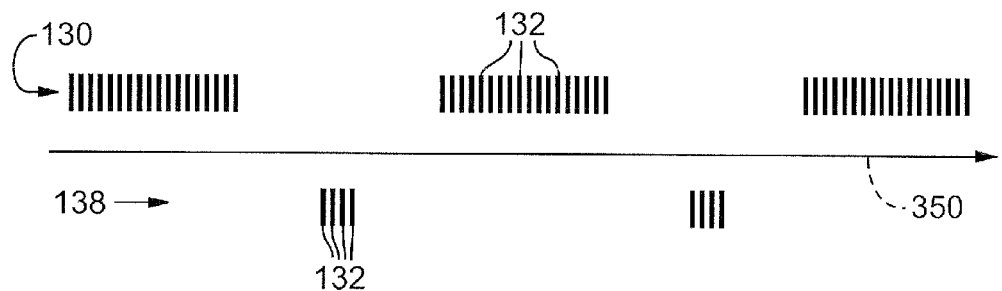
FIG. 13 illustrates a first alternative MRCAD operational mode work path in which the non-deflected laser beam pathway runs between adjacent rows of links.

FIG. 13 shows an operational mode in which the linear stage positions a non-deflected laser beam pathway 350 between row 130 and adjacent row 138 of links 132, and employs the FSM to provide all or a portion of the positioning required to process selected ones of links 132. For example, if the centers of rows 130 and 138 of links are separated by 10 microns, and the FSM has a deflection range of ±6 microns, then the FSM can be employed to very quickly deflect the laser beam to either row 130 or adjacent row 136 for processing links 132 in either row. In this operational mode, the FSM not only corrects for linear stage positioning errors, but also provides lateral (or even on-axis) motion for link processing. Of course, the FSM can execute this mode of link processing with or without position error correction.

Figure 14:
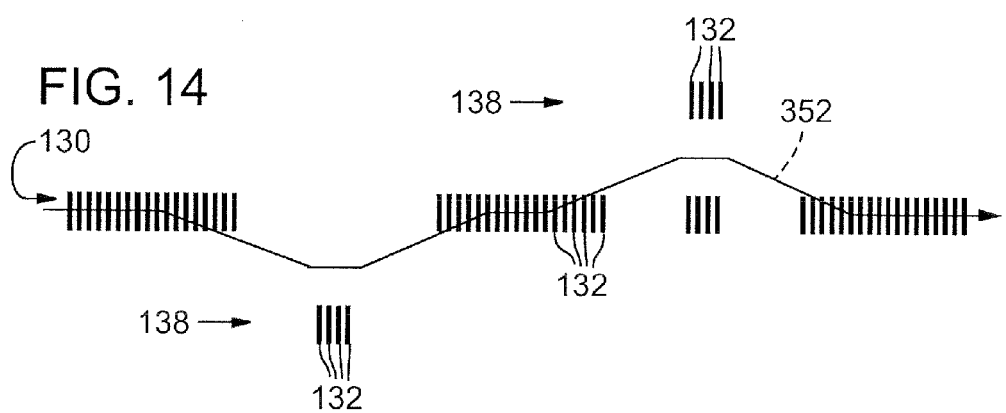
FIG. 14 illustrates a second alternative MRCAD operational mode work path in which the non-deflected laser beam pathway cross-axis position is adjusted as its on-axis motion progresses along selected link rows.

FIG. 14 shows another operational mode in which a non-deflected laser beam pathway 352 is defined when the linear stage cross-axis position is adjusted as its on-axis motion progresses along rows 130 and 138 of links 132. The linear stage cross-axis position may also be changed while processing links. The FSM is used to quickly supply any additional laser beam deflection necessary to properly process links 132 in the desired cross-axis location in an MRCAD link run.

A link run, as defined by the prior art, has one cross-axis position. An MRCAD link run is defined as a synthesis of multiple link runs and may have numerous cross-axis positions. An MRCAD link run does not reverse on-axis direction but may have any cross-axis move profile, including reversals.

Figure 15A:
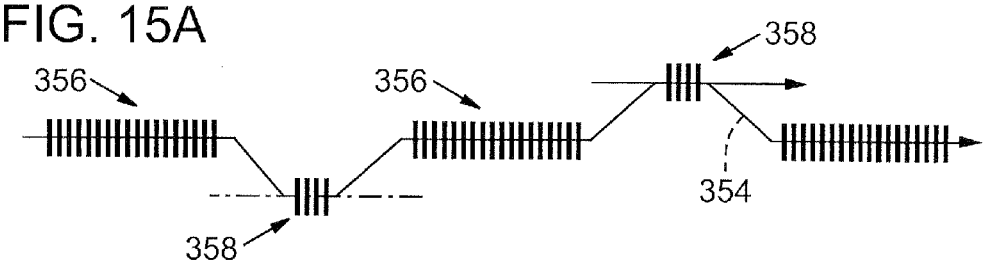
FIG. 15A illustrates a third alternative MRCAD operational mode work path in which the non-deflected laser beam path cross-axis position is adjusted to coincide with the desired link blow position as the on-axis motion of the laser beam progresses along selected link rows.

FIG. 15A shows another operational mode in which a laser beam pathway 354 is adjusted in the cross-axis direction using only the linear stage as the on-axis motion progresses along row 356 and adjacent rows 358. An aspect of this operational mode of the invention is to combine link runs into an MRCAD link run without an FSM. It is possible to implement non-deflected laser beam pathway 354 without an FSM. Although the linear motion stages cannot move the laser beam relative to the workpiece as fast as an FSM, the linear stages can, nevertheless, reduce link processing time and increase throughput.

Figure 15B:
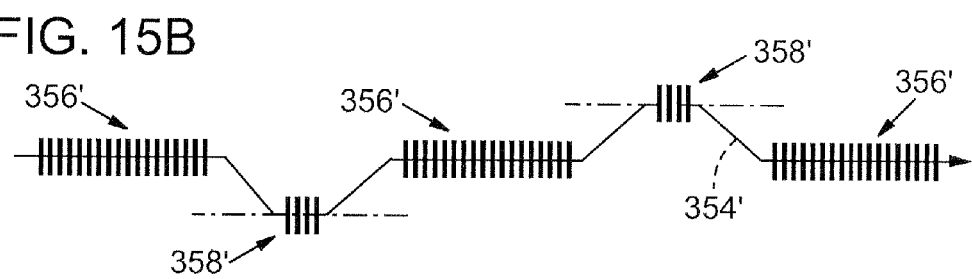
FIG. 15B illustrates a fourth alternative MRCAD operational mode work path in which shorter link runs are nested within longer link runs.

There are many different ways to combine link runs as defined by the prior art to synthesize an MRCAD link run. Combinations may be between two, three, or more link runs, provided there is sufficient time for each lateral move. FIG. 15B shows a laser beam pathway 354' that is the same as laser beam pathway 354 of FIG. 15A, except for the manner in which the laser beam is positioned. Laser beam pathway 354' represents a combined laser path resulting from FSM deflection either alone or in cooperation with cross-axis positioning. FIG. 15B depicts an operational mode for nesting shorter link runs 358' within longer link runs 356'. A non-deflected laser beam pathway 354' represents the combined motion path. Without combining link runs, it would be necessary to process links along a central linear pathway and perform link runs along the adjacent link runs, as indicated in dash-dot lines. Pathway 354' is merely illustrative and may not be followed exactly because of variable link spacing, row spacing, and other variables. Any pathway may be followed between links that are to be processed, and any combination of stage movement and/or steering mirror movements may be used in the processing of link runs and MRCAD link runs.

Processing of links 132 (FIG. 14) and links 356 and 358 (FIGS. 15A and 15B) is preferably carried out by repetitively performing the following process:

1) Determine whether link runs with a cross-axis separation can be combined and determine an appropriate non-deflected beam pathway for an MRCAD link run.

2) Move to a starting position for an MRCAD link run by executing acceleration, deceleration, stop, and fast settle steps. The time to execute these steps varies, depending upon the distance traveled.

3) Perform the MRCAD link run. Performing an MRCAD link run entails ramping up to velocity to begin the link run, moving along the desired pathway to process links, and ramping down and stopping again. As noted earlier with respect to FIGS. 13-15B, the beam may or may not be deflected by a beam steering device, and the nondeflected beam pathway may or may not travel through the links. While performing prior art link runs or MRCAD link runs, it is preferred to accelerate, or gap profile, over large gaps, which reduces the time required to perform such link runs. Skilled persons will appreciate that stopping need not take place before the start of a subsequent link run or MRCAD link run. Moreover, MRCAD runs can be intermixed with traditional prior art link runs. Other processing steps, machining activities, or positioner motion may take place between link runs of either the prior art or MRCAD type.

If two laterally spaced link runs can be combined, there is an immediate time savings for each combined link run. However, this time savings is balanced against time lost if gaps that could be profiled are reduced in size, or if gap profiling becomes impossible due to moving laterally and processing links out of a separate parallel link run.

It is possible to transition from one link run to an adjacent link run whenever the lateral move time is less than or equal to the time required to move in the on-axis direction between processed links. This is expressed mathematically as:

$$T_{lateral} \text{move} <= \text{Distance on-axis}/V_{link\ run}.$$

The time to move laterally varies depending upon the lateral distance, the speed performance parameters of the motion stage and/or steering mirror, move profiling time, and settling time before reaching the next link to be processed.

Figure 16:
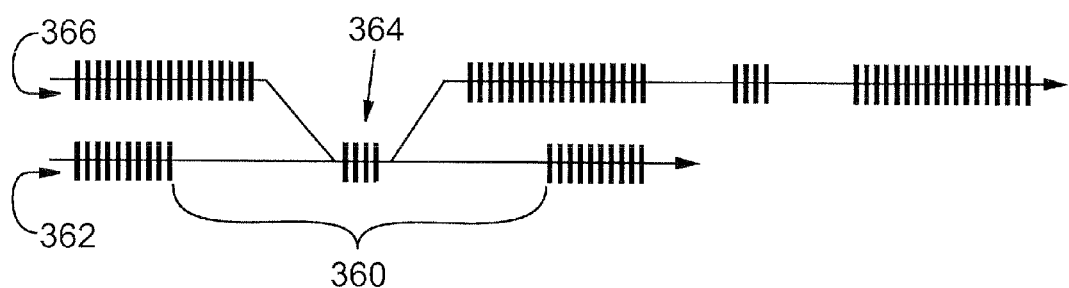
FIG. 16 illustrates a fifth alternative MRCAD operational mode work path in which the effective size of a gap in a link run can be extended by processing a portion of first link run in a second link run.

In another operational mode, it is possible to combine portions of nearby link runs. FIG. 16 shows an example in which the effective size of a gap 360 in a link run 362 can be extended by processing a portion 364 of link run 362 in a different, MRCAD link run 366. The overall number of link runs is not reduced, but throughput is increased by decreasing the time to complete link run 362 through the use of gap profiling applied to one large gap rather than two smaller gaps. Gap profiling of one large gap is faster because higher peak on-axis velocity may be reached and there is only one settling event. By processing portion 364 of link run 362 during MRCAD link run 366, the effective length of gap 360 is increased, whereas without such lengthening, it may not be possible to perform gap profiling.

Figure 17:
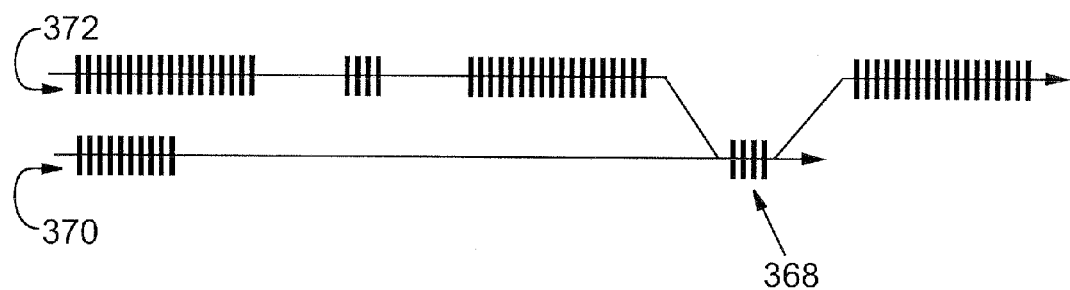
FIG. 17 illustrates a sixth alternative MRCAD operational mode work path in which end links of a link run are processed during processing of an adjacent link run.

FIG. 17 shows another operational mode in which end links 368 of a link run 370 are processed during processing of an adjacent, MRCAD link run 372. Such processing of end links 368 effectively shortens link run 370, resulting in faster processing of link run 370, which saves time and increases throughput.

Figure 18:
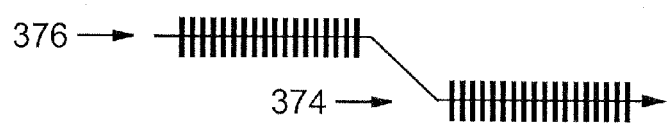
FIG. 18 illustrates a seventh alternative MRCAD operational mode work path in which a first link run is combined with a second link run.

FIG. 18 shows another operational mode in which a link run 374 is combined with a link run 376 to form an MRCAD link run by starting processing in link run 376 and finishing link processing in link run 374. In this mode it is not necessary to laterally move back to link run 376, which saves time and increases throughput.

The operational modes described with reference to FIGS. 15A, 15B, 16, 17, and 18 can be implemented by cross-axis stage positioning and/or FSM deflection.

The above-described MRCAD operational modes may be applied to motion stages and/or steering mirrors of different performance characteristics and structures from those described herein.

In typical operation, the steering mirror commands for MRCAD scanning are used to produce cross-axis motion of the laser beam without commanding on-axis motion of the laser beam. However, other applications are envisioned that would benefit from on-axis supplemental dithering to boustrophedon scanning.

The invention also facilitates relaxed servo performance requirements of the main positioning stages because the steering mirror can correct for linear stage errors, thermal expansions, optical path errors, and various other system errors.

The control schemes depicted in these figures are intended to illustrate the basic implementation and operation of this invention. Skilled persons will readily appreciate that alternative communication and control structures can be used to practice this invention. This invention further includes more advanced control schemes, such as those employing sensor-based position correction and feedforward commands to the motion stages and steering mirror.

Figure 19:
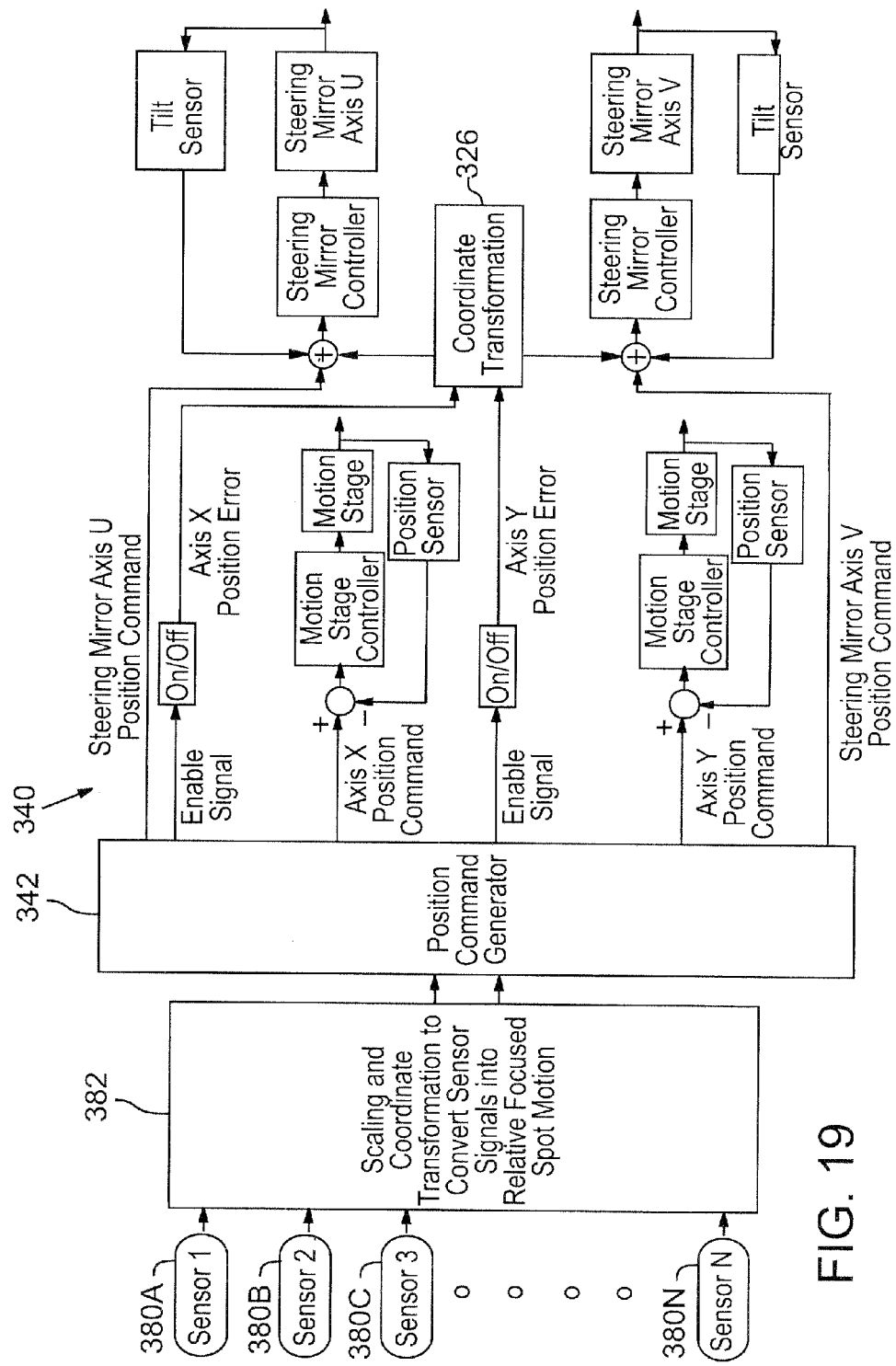
FIG. 19 is a simplified schematic block diagram representing the positioner control system of FIG. 12, and further including sensors and a sensor controller for correcting various sensed beam position errors.

For example, FIG. 19 shows a group of sensors 380A, 380B, 380C, 380N (collectively, "sensors 380") electrically connected to a signal conditioner 382 that performs sensor signal scaling and coordinate transformations to convert the sensor signals into relative focused spot motion commands for actuating a beam steering device, such as two-axis steering mirror 306 (FIG. 11) or reflective surface 236 (FIG. 12). Alternatively, signal conditioner 382 may produce steering mirror commands directly in any coordinate system without an intermediate step of producing commands in the coordinate system of the focused spot. Sensors 380 may include sensors for detecting many different phenomena such as position, relative position, displacement, velocity, beam position, beam quality, optical power, temperature, atmospheric pressure, humidity, air movement, and/or turbulence. Position sensors may include interferometric, capacitive, inductive, strain, magnetic, and resistive sensors, optical encoders, optical position sensitive detectors, and CCD arrays. Sensors 380 may include a beam position sensor for correcting errors detected in the optical path, such as thermally induced beam wandering in response to laser or acousto-optic modulator ("AOM") pointing instability, or optical mount dynamics. Other types of alternative sensors will be apparent to those skilled in the art.

In the FIG. 19 embodiment, signal conditioner 382 is electrically connected to position command generator 342 (FIG. 12), which provides positioning command information and control in positioner control system 340 (FIG. 12). Positioner control system 340 may alternatively include one or more single input/single output controller (SISO) and/or one or more multiple input/multiple output controller (MIMO). For example, the two axes of the linear stage may be controlled by a single MIMO controller, rather than two separate SISO controllers. It is also possible for a single MIMO controller to control the linear stage axes and the steering mirror axes. Those skilled in the art of feedback control will understand that there are many different control system architectures and algorithms for controlling multiple actuators in response to trajectory commands and sensed signals. The architectures depicted here are merely illustrative and are not intended to limit the scope of this invention to a particular architecture or control methodology.

Figure 20:
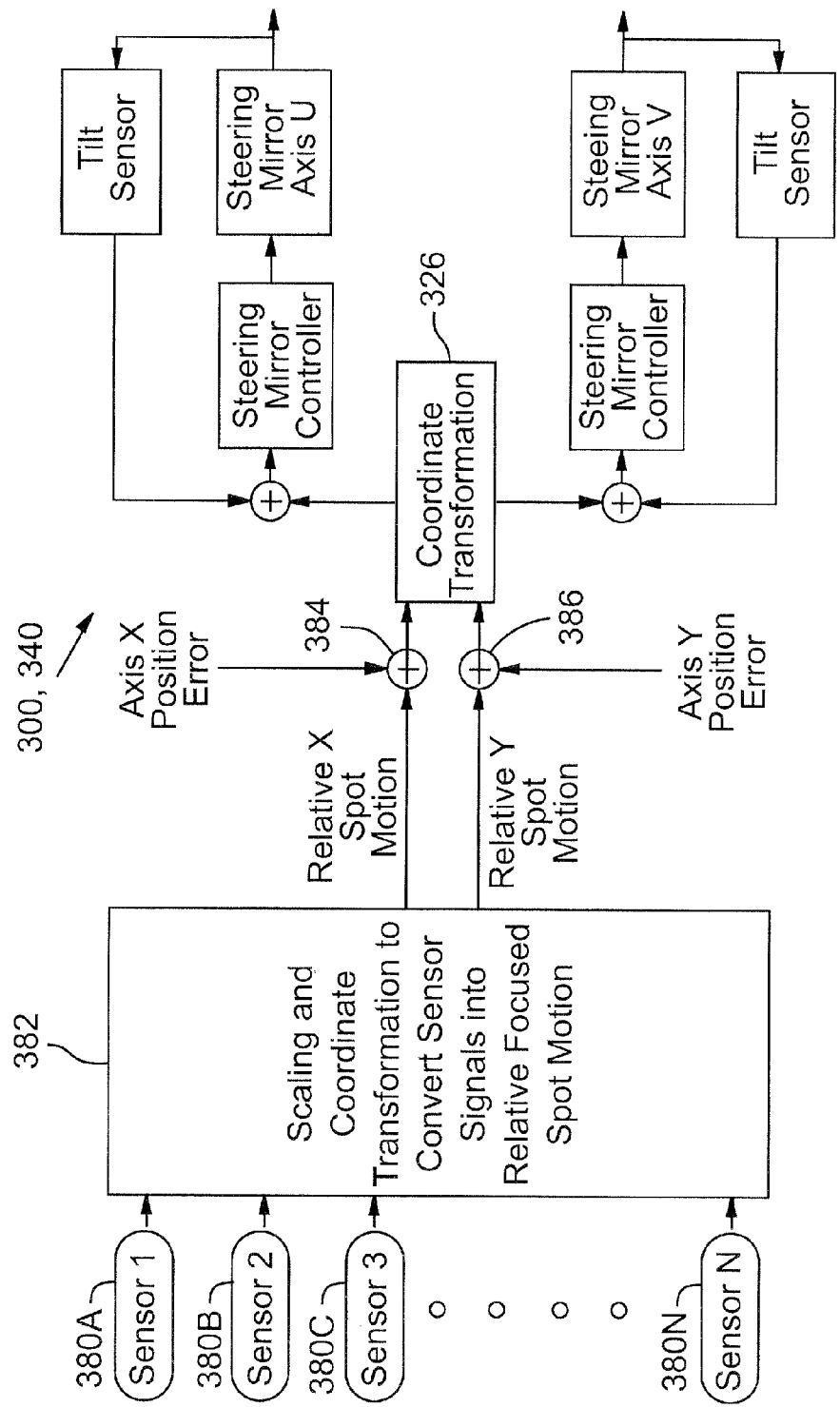
FIG. 20 is a simplified schematic block diagram representing a portion of the positioner control system of FIG. 11, further including sensors and a sensor controller for correcting various sensed beam position errors.

FIG. 20 shows a second embodiment, in which signal conditioner 382 provides relative X- and Y-axis spot motion control signals to summing junctions 384 and 386 that combine X- and Y-axis position error signal to provide positioning command information to coordinate transformation generator 326 (FIGS. 11 and 12) in positioner control systems 300 (FIG. 11) and 340 (FIG. 12).

Figure 21:
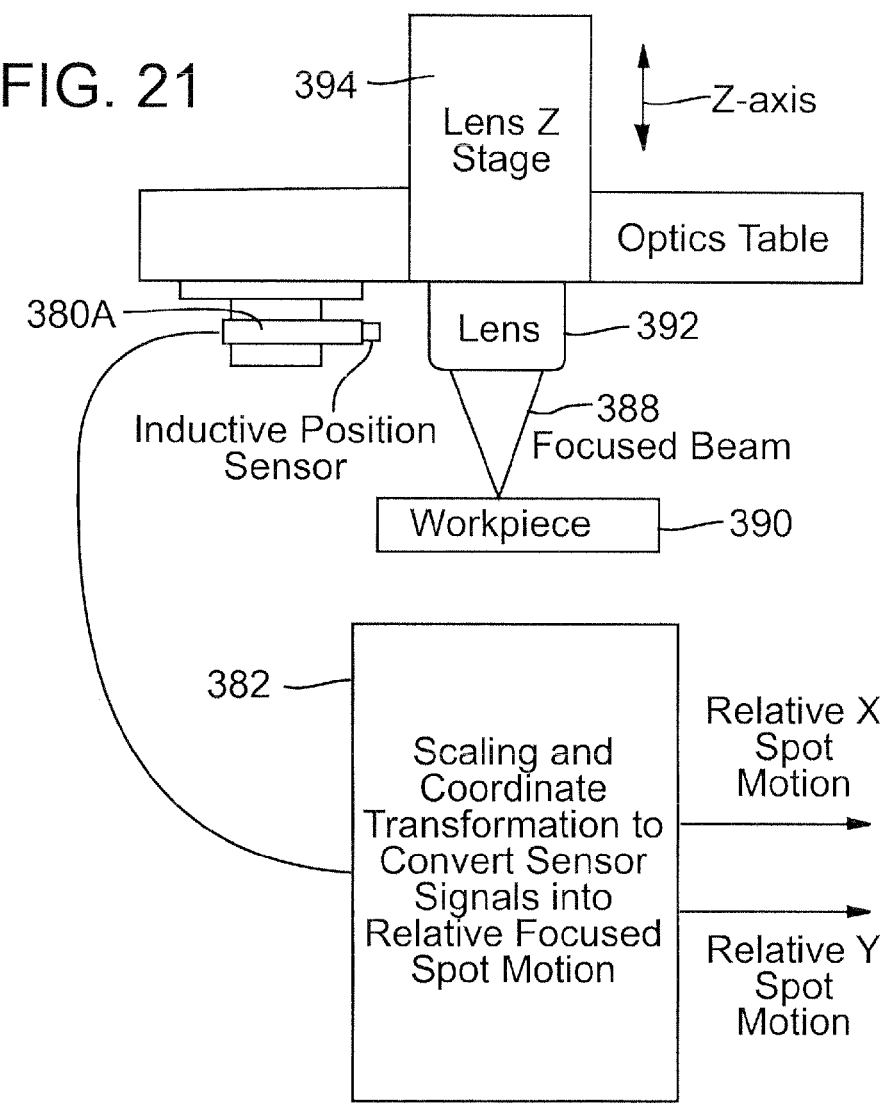
FIG. 21 is a simplified schematic block diagram representing a lens translation sensor coupled to the sensor controller of FIGS. 19 and 20 for correcting laser beam deflection errors caused by lateral deflection of the lens.

FIG. 21 shows a particular sensor embodiment, in which a laser beam 388 is focused on a workpiece 390 by propagating through a focus lens 392 that is translated in Z-axis directions by a lens Z stage 394. Undesirable lateral movement of lens 392 may cause wandering of the X- and Y-axis positions of laser beam 388 on workpiece 390. Undesirable lateral movement may be caused by Z-axis translation of the lens, thermal expansion of system components, or external forces applied to the optics table or other system components causing excitation of resonant modes or shifts in compliant structural components. In this embodiment, sensor 380A is an inductive position sensor that conveys to signal conditioner 382 a signal proportional to the Z-axis position of lens 392. Signal conditioner 382 includes correction information relating the sensed Z-axis positions of lens 392 to associated X- and Y-axis beam position errors and can, therefore, provide to the positioner control system the relative X- and Y-axis spot motion signals necessary to correct for the laser spot wandering errors. The correction information is preferably obtained by pre-characterizing the system, such as by measuring laser beam X- and Y-axis deviations as a function of various Z-axis positions.

Figure 22:
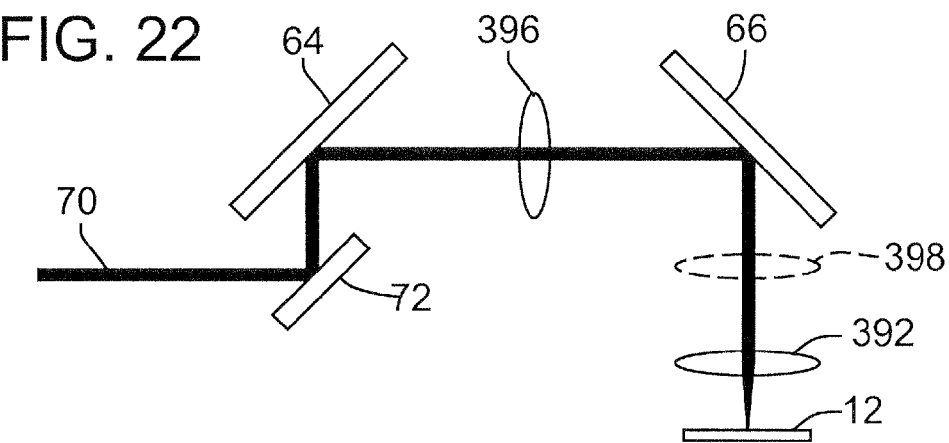
FIG. 22 is a simplified side view of a fast positioner employing a pair of galvanometer-driven mirrors in association with one or two relay lenses to, respectively, image a mirror pivot point at or near the surface of the other mirror or image both mirror pivot points at or near the entrance pupil of a focusing lens.

The entrance pupil of lens 392 is preferably positioned at or near the actual or virtual reflective surface of a two-axis FSM. A relay lens positioned before lens 392 may be associated with or positioned downstream of the FSM. As shown in FIG. 22, the two-axis FSM may be replaced by a pair of galvanometer-driven mirrors 64 and 66 and may include a relay lens 396 (represented as a single lens component) positioned between them to image the pivot point of mirror 64 at or near the surface of mirror 66. An optional relay lens 398 (shown in dashed lines) can be used in cooperation with relay lens 396 to image the pivot points of mirrors 64 and 66 at or near the entrance pupil of focusing lens 392. Skilled persons will appreciate that a relay lens positioned in optical association with a two-axis FSM steering mirror may be used to shift the steering mirror pivot point to a location at or near the entrance pupil of focusing lens 392.

Figure 23:
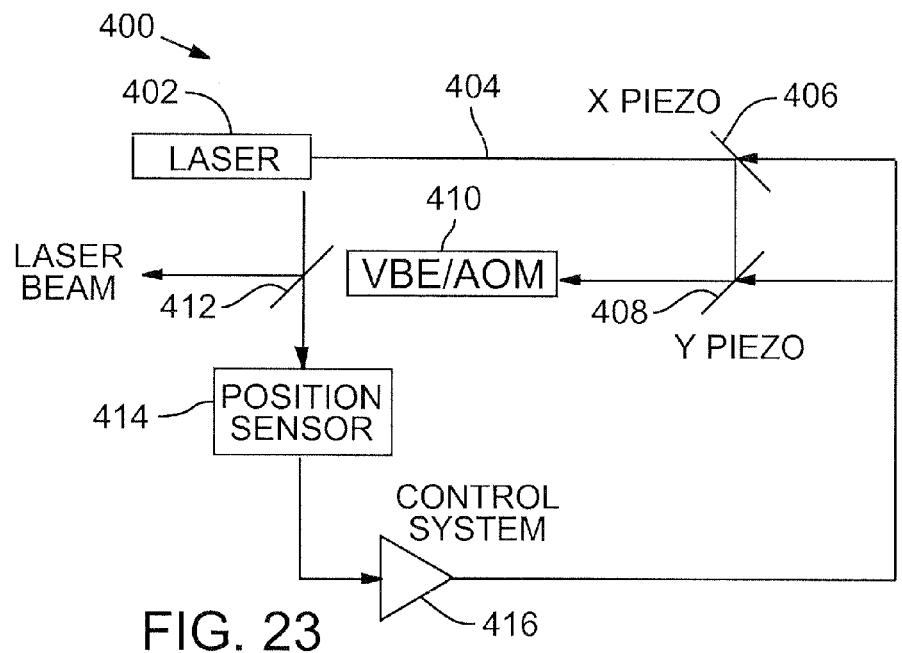
FIGS. 23-26 are simplified schematic block diagrams representing four embodiments of laser beam position correction systems of this invention.

As mentioned above, sensors 380 can be used to provide beam wandering correction signals that are derived from virtually any system-related source. For example, FIG. 23 shows a laser beam position correction system 400 in which a laser 402 emits a laser beam 404 that is deflected by X- and Y-axis piezoelectric-deflected mirrors 406 and 408 for propagation through optical path devices 410, such as a variable beam expander ("VBE") and an AOM. To reduce laser beam 404 positioning errors caused by optical path devices 410, a beam splitter 412 reflects a portion of deflected laser beam 404 to a beam position sensor 414. A control system 416 receives from beam position sensor 414 information related to the actual positions of laser beam 404 relative to the ideal positions. Control system 416 uses the information to generate X- and Y-axis correction signals for driving X- and Y-axis piezoelectric-deflected mirrors 406 and 408, or alternatively, an FSM, X- and Y-axis galvanometer deflected mirrors, or other beam steering technology. Beam wandering errors caused by optical path devices 410 may include low frequency drift caused by AOM thermal loading, VBE deflections as a function of beam expansion, and mechanical thermal expansion. Beam position sensor 414 is preferably a quad photo-detector or other position-sensitive detector (PSD).

Figure 24:
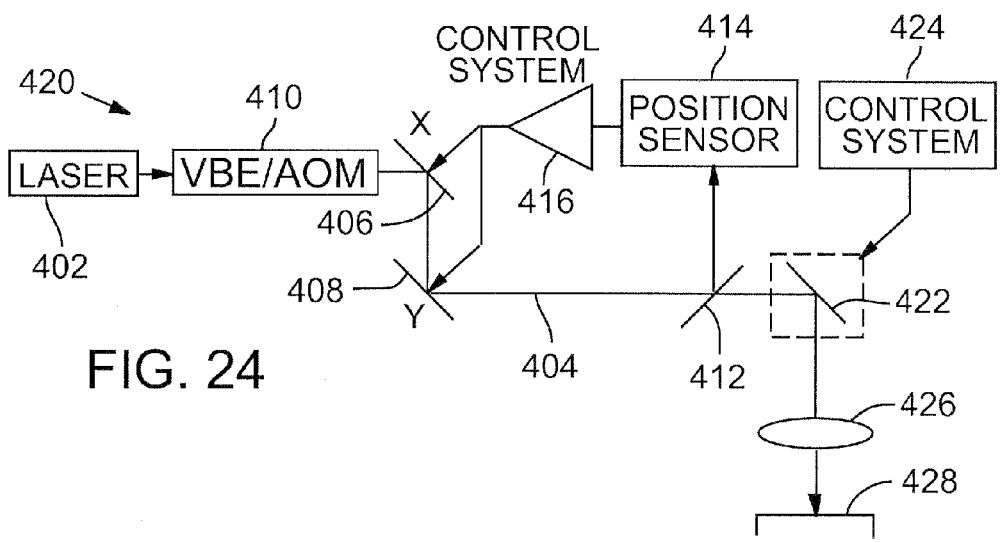

FIG. 24 shows another laser beam position correction system 420, in which optical path devices 410 are positioned before X- and Y-axis piezoelectric-deflected mirrors 406 and 408, and in which the system further includes a two-axis FSM 422 that is driven by a control system 424 for deflecting laser beam 404 through a focusing lens 426 to a workpiece 428. In this embodiment, primary and error correction positioning of laser beam 404 can be carried out jointly or separately by control system 416 or control system 424. It is preferred to separate FSM 422 from the thermal drift correction functions associated with control system 416.

Control system 424 is preferably implemented as a digital signal processor having FSM updating rate that is much higher than the positioning system servo cycle rate. FSM updating is accomplished by calculating desired XY stage positions at a higher rate than is necessary for the XY stage, such as by direct computation, or interpolation of the XY command during the present and subsequent servo cycles. The position error is then determined and conveyed to the FSM at a much higher rate.

Figure 25:
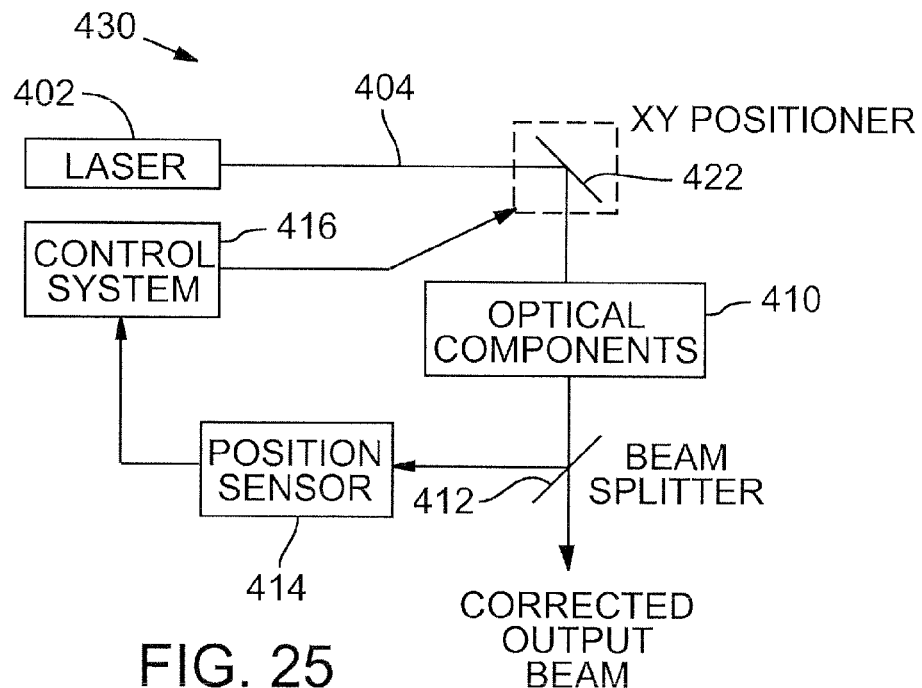
Figure 26:
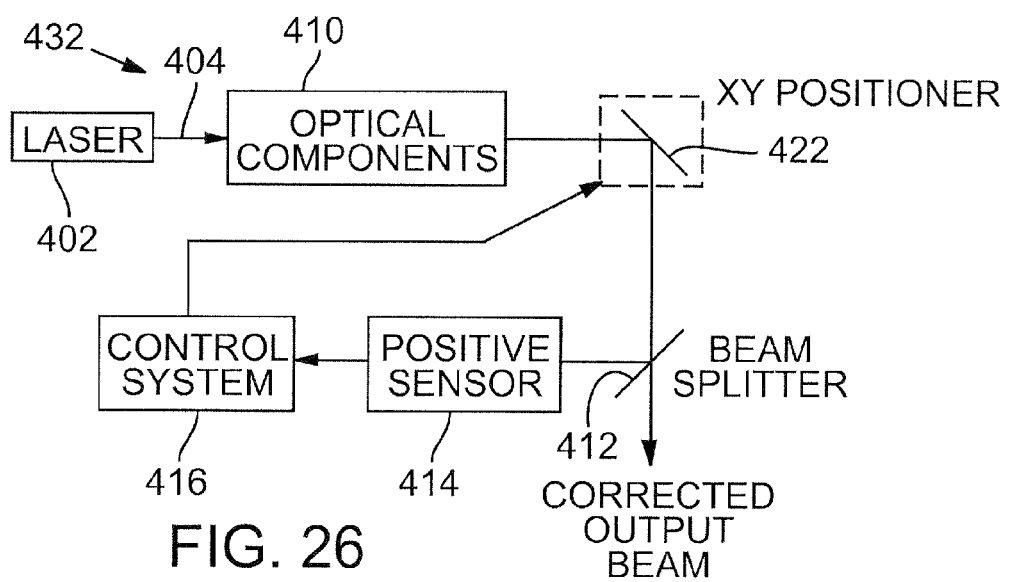

FIGS. 25 and 26 show alternative laser beam position correction systems 430 and 432, in which X- and Y-axis piezoelectric-deflected mirrors 406 and 408 are replaced by two-axis FSM 422. Laser beam position correction systems 430 and 432 also differ in that optical path devices 410 are positioned before or after two-axis FSM 422. Of course, depending on their functions, some or all of optical path devices 410 may be positioned in various locations along the path of laser beam 404.

The FSMs employed in this invention preferably have a full-deflection bandwidth greater than 100 Hz, and, preferably greater than 1,000 Hz. Their deflection angle is preferably greater than 0.05 milliradian, and preferably ±8 milliradians, resulting in a ±50 micron displacement of laser beam 404 at the workpiece. Positioning accuracy of laser beam 404 is preferably within 50 nanometers, and deflection accuracy is preferably within 10 microradians. In some preferred embodiments, the high-speed beam steering device has a resolution of 1 microradian or better or a resolution of 0.1 microradian or better, such as well-documented in the technical data associated with the previously mentioned model S-330 Ultra-Fast Piezo Tip/Tilt Platform. In some preferred embodiments, the high-speed beam steering device has a resolution of 0.2 microradian or better or a resolution of 0.15 microradian or better. In some preferred embodiments, the high-speed beam steering system forms part of a positioning system that provides a position error on at the work piece of less than or equal to 0.25 micron, such as well-documented for the 9800 model series previously mentioned. In some preferred embodiments, the high-speed beam steering system forms part of a positioning system that provides a position error on at the work piece of less than or equal to 0.2 micron, less than or equal to 0.15 micron, or less than or equal to 0.1 micron.

Skilled workers will appreciate that the two-axis steering mirror systems of this invention can be adapted for use in etched-circuit board via drilling, micro-machining, and laser trimming applications as well as for link severing. Moreover, laser-based wafer processing machines practicing this invention may employ single-axis deflection for processing wafer links in one axis direction, after which the wafer is rotated and links are processed in another axial direction, preferably orthogonal to the first direction.

Figure 27:
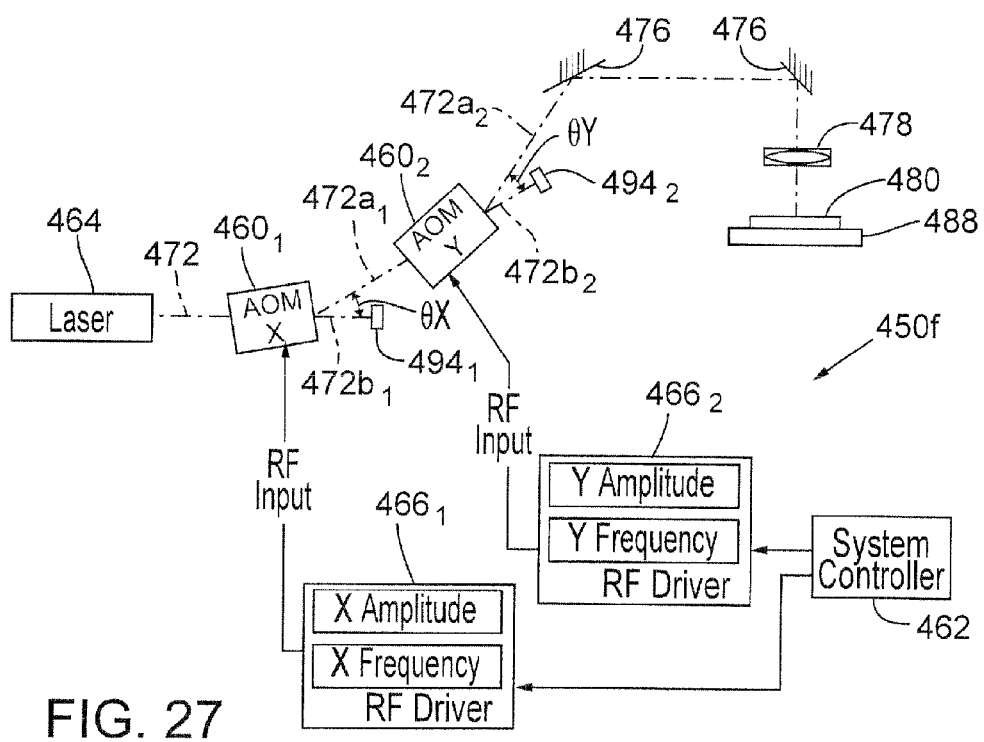
FIG. 27 is a schematic diagram of a laser system employing extracavity AOMs to effect beam positioning.

An AOM scanning system could be used as a substitution for an FSM and/or a galvanometer scan head. FIG. 27 is a schematic diagram of a laser system 450$f$ employing two extracavity AOMs $460_1$ and $460_2$ (generically, AOMs 460) to affect beam positioning on the surface of workpiece 480 in transverse Cartesian axes. In a preferred embodiment, one of the AOMs 460 would control movement along the X axis and the other would control movement along the Y axis, providing a complete range of angular adjustment of the laser beam in X and Y on the surface of the workpiece 480. In FIG. 27, the first AOM $460_1$ is shown modulating in the X axis and the second AOM $460_2$ is shown modulating in the Y axis, but skilled persons will appreciate that the order or positioning could be reversed. Skilled persons will also appreciate that the size of either or both AOMs $460_1$ and $460_2$, and particularly $460_2$, can be increased to permit greater acceptance angles. Skilled persons will also appreciate that while the term "AOM" is used throughout this description it is generally interchangeable with "AOD" (acousto optic device).

AOMs $460_1$ and $460_2$ are preferably driven by separate respective RF drivers $466_1$ and $466_2$ that have the ability to variably control the amplitude and/or the frequency of the RF power delivered to the transducers 470, as may be disclosed in or associated with any of the embodiments described in International Application No. PCT/US2005/019775 or U.S. Pat. No. 7,133,182, so the amplitude and position of the output beam at the workpiece 480 can be accurately controlled. Because the RF driver frequency can be adjusted at very high speeds, the AOMs 460 can be used to steer the beam in real time in an open-loop scanning system with lookup tables of characterized linear effects to calibrate out unwanted position error effects. International Application No. PCT/US2005/019775 was published as WO 2005/121889 and corresponds to U.S. patent application Ser. No. 11/138,657, now U.S. Pat. No. 7,133,182, which is assigned to assignee of the present application, and which is herein incorporated by reference.

Figure 28:
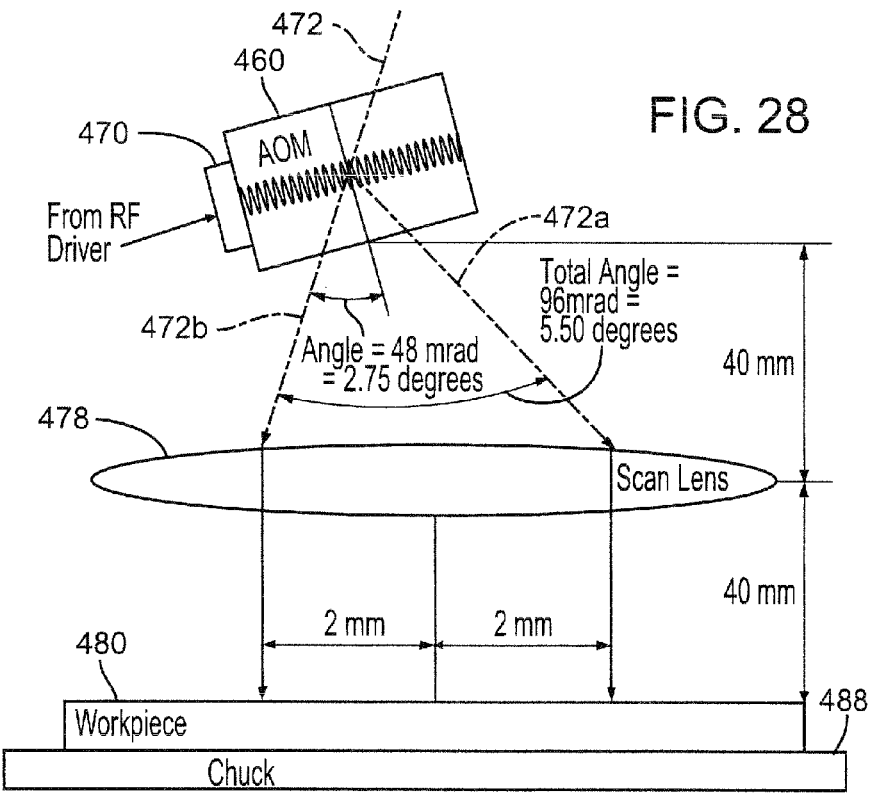
FIG. 28 is a schematic diagram showing an exemplary deflection angle range of an AOM.

FIG. 28 is a schematic diagram showing exemplary positioning and deflection angle range of an exemplary AOM 460 responsive to an RF driver driven up to 50 MHz at 2 W. When the AOM 460 is positioned at an exemplary height of about 40 mm from the focusing lens 478, which is positioned at an exemplary distance of about 40 mm above the workpiece 480, and assuming about a 96 mrad or 5.5 degree total angle of deflection for theta, calculations can be done to show that the effective scan dimensions on the workpiece 480 yield at least a 4 mm scan field in X and/or Y. In some embodiments for SLP applications, assuming a plus and minus deflection angle of 3.2 milliradians for theta, calculations can be done to show that the effective scan dimensions on the workpiece 480 yield a plus or minus 25 micron scan field in X and/or Y.

With respect to the angular resolution, in one embodiment, the output of a DDS driver for the RF power can be set in very small increments of 1 Hz, allowing for a theoretical resolution set by the following equation:

$$\theta = \frac{\lambda}{2v_s} f \quad (1)$$

For example, using a wavelength $\lambda$ of 355 nm and an acoustic velocity $v_s$ of 650 m/s, the angular change relating to a 1 Hz frequency f change of the acoustic wave is 2.73 E-10 degrees. However such resolution might be impractical due to the mechanical limitations of the system to actually resolve the frequency. So in some embodiments, a range of values for control can be specified by minimum resolution of steps of 4.1 E-6 degrees or the equivalent of 0.72 micro radians, which is equivalent to a 15 kHz step size in frequency. An exemplary AOM optical scanning system having an angular setting of about 50 milliradians, would provide 69,444 steps of angular resolution.

The bandwidth of the AOM 460 is primarily affected by three items: the maximum speed available from the electronic devices to generate a new frequency, such as the RF drivers 466; the ability of the AOM transducer 470 to create a vibration of the new frequency; and the time it takes for the new sound wave to be created in the AOM 460. Generally, this third item concerning the formation of a new sound wave takes the most time and thus dominates the scanning bandwidth.

One equation relating the angle corresponding to a particular frequency can be expressed as:

$$\theta = \sin^{-1}\left(\frac{\lambda}{2\Lambda}\right) = \sin^{-1}\left(\frac{f\lambda}{2v_s}\right) \approx \frac{\lambda}{2v_s} f \quad (2)$$

where $v_s$ is the speed of sound in the medium.
The bandwidth, B, can then be given as:

$$B = \frac{v_s}{D} \quad (3)$$

where D is the width of the laser beam through the AOM 60.
For a common AOM 60, the parameters might be:
Material: Fused quartz (n=1.46, $v_s$=6 km/s);
Sound: Frequency f=100 MHz;
Light: 1047 nm wavelength; and
Laser beam diameter: 12 mm.

Using these parameters, one exemplary AOM 460 in a scanning system would have bandwidth of up to about 500 kHz at an acceptable angle. In contradistinction, a typical galvanometer bandwidth is about 4 kHz and with a fast steering mirror can be upwards of about 12 kHz. The primary limitations of a galvanometer scanner is the inertia created by moving a mass and the resonance of the movement. An AOM 460 does not incur such mass-related effects, so its bandwidth can be up to 100 times greater.

Figure 29:
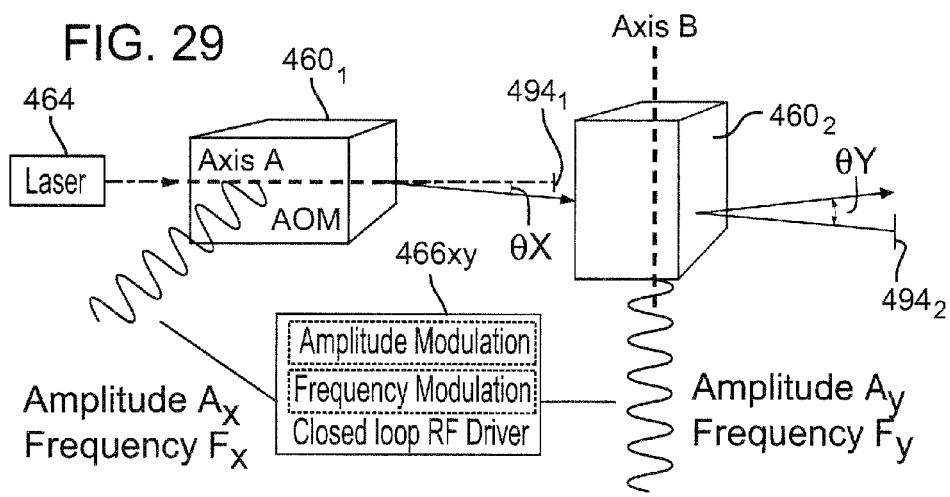
FIG. 29 is a schematic diagram showing an AOM scanning system employing AOMs in series to effect beam positioning in two axes.

FIG. 29 is a schematic diagram showing an embodiment of AOMs $460_1$ and $460_2$ of FIG. 27 in greater detail, with the AOMs 460 aligned along different axes to provide a dual-axis scanning system. The AOM $460_1$ is set in position with the axis A perpendicular to the axis A of the AOM $460_2$. Therefore, changing the frequency of the drive signal to AOM $460_1$ will change the output angle of the AOM $60_1$ in the X axis, with the relationship that varying frequency will vary the exit angle theta X. Changing the frequency of the drive signal to AOM $460_2$ will change the exit angle of the AOM $460_2$ in the Y axis, with the relationship that varying frequency will vary the theta Y. AOMs $460_1$ and $460_2$ can be close together and modulated independently, with the same or different frequencies and amplitudes. Thus, the output beam can change in amplitude and can move in the X and Y axis directions. The size and shape of the beam dumps $494_1$ and $494_2$ can be adapted to accommodate the desired scan field and prevent the propagation of unwanted light to the workpiece 480.

Figure 29A:
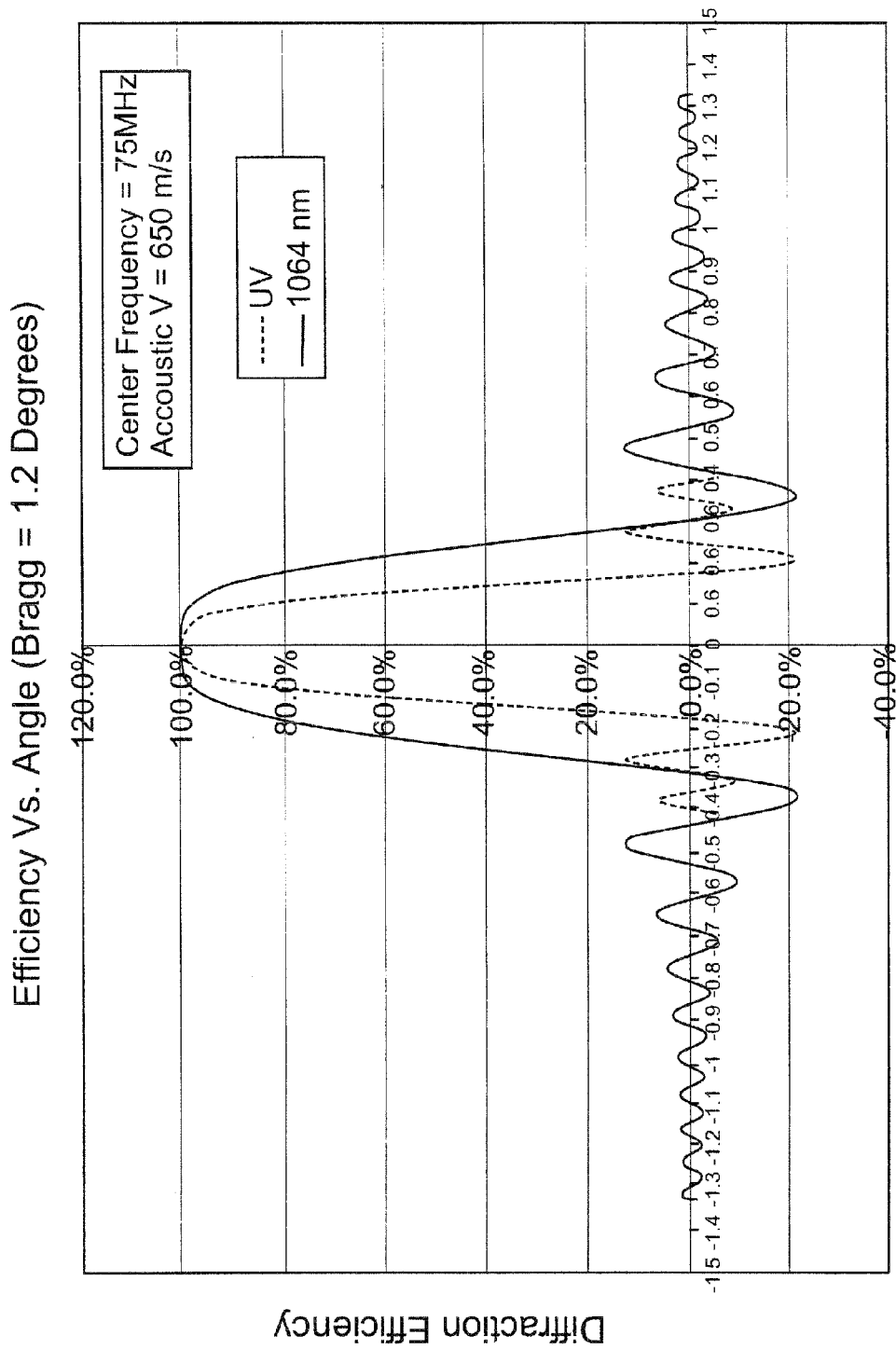
FIG. 29A provides a graph of scanning angle diffraction efficiency versus angle change from a particular Bragg angle for exemplary UV and IR wavelengths.

FIG. 29A provides a graph of scanning angle diffraction efficiency versus angle change from a particular Bragg angle at exemplary UV and IR wavelengths. An equation for finding the diffraction efficiency of an AOM may be expressed as:

$$\frac{I_0}{I_1} = \eta \, \text{sinc}^2 \sqrt{\eta + \frac{\Delta\Phi^2}{4}} \quad (4)$$

where the material properties can be described by $$\eta = \frac{\pi^2}{2\lambda} M \frac{L}{H} P \quad (5)$$

where $\lambda$ is the light wavelength, M is the figure of merit of the material, L is the length of the transducer interaction zone, H is the height of the transducer 470, and P is the RF power applied. The change due to frequency modulation of the signal can be described by $\Delta\Phi$ as expressed as:

$$\Delta\Phi = \frac{\pi\lambda}{v}\frac{\Delta f}{2}\frac{L}{\Lambda_0} \quad (6)$$

where v is the acoustic velocity sound in the material, $\Delta f$ is the frequency change for modulation, L is the interaction length, and $\Lambda_0$ is the wavelength of the sound in the material. Substituting equations (5) and (6) into equation (4) will result in the diffraction efficiency for a particular Bragg Angle for a change in frequency. The diffraction efficiency is shown for an example in which an initial frequency of 75 MHz that produces a Bragg angle of 1.2 degrees at a UV wavelength of 355 nm is changed by ±14 MHz (about a ±0.175 degree scanning angle change for the UV wavelength). So, for example, to keep above 80% diffraction efficiency, one might employ an available scan angle change of ±0.1 degree.

The diffraction efficiency at 1064 nm is also shown, indicating that as the wavelength decreases, the allowable scan angle decreases. The usable "scan angle" area can be defined by the minimum diffraction efficiency that the system can withstand in terms of the laser power processing window. If there is a large process window, then the system has more of a laser overhead power budget to allow larger scan angles.

With reference again to FIGS. 27-29, if one or more additional AOMs 460 (or other movable devices such as FSMs) are placed in front of the scanning AOMs 460₁ and/or AOM 460₂ for the respective axes, the incoming Bragg angle condition can be moved to provide a secondary Bragg angle or plurality of Bragg angles that can be selected to increase the scanning range of the scanning AOM 460.

Figure 29B:
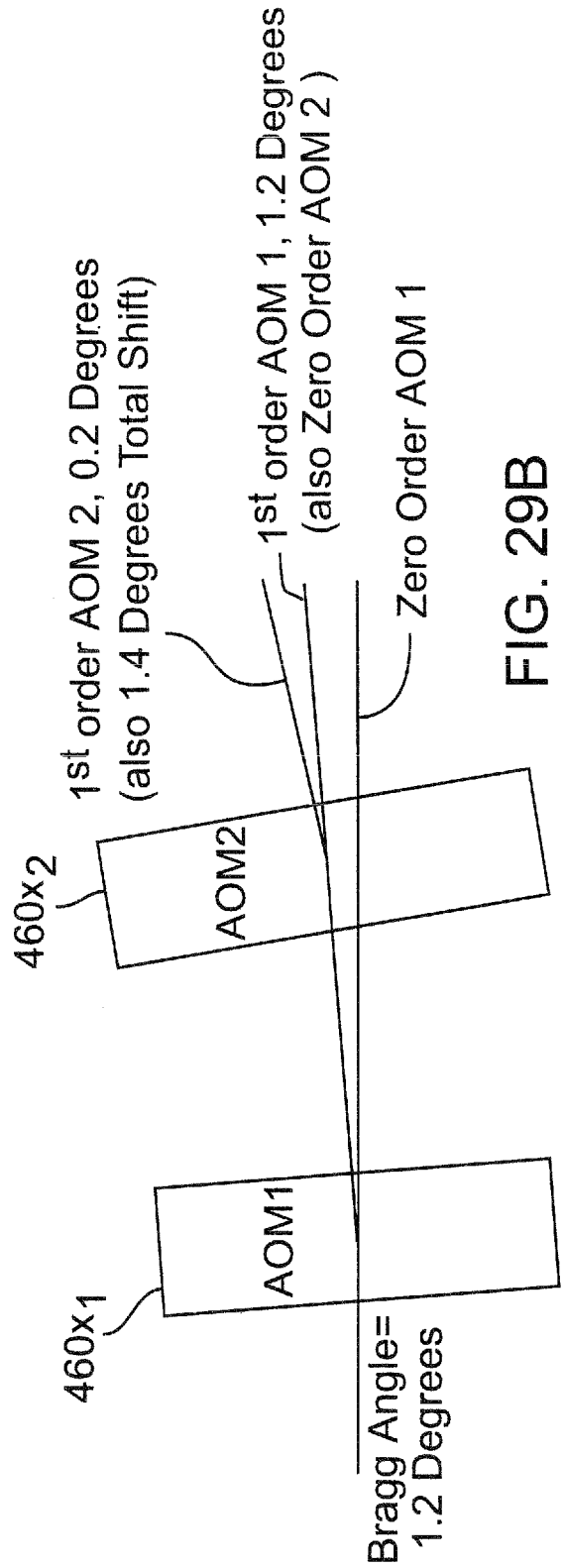
FIG. 29B is a schematic diagram showing an AOM scanning system employing AOMs in series to expand beam-positioning range in a given axis.

FIG. 29B is a schematic diagram showing an AOM scanning system employing AOMs 460$x_1$ and 460$x_2$ in series to expand beam-positioning range within a given Cartesian or workpiece axis. With reference to FIG. 29B, the upstream AOM 460$x_1$ can be positioned (preferably at its Bragg angle) along beam path 472 such that its zero-order output achieves the Bragg Angle for the downstream AOM 460$x_2$. The first-order output of the upstream AOM 460$x_1$ can then be set for a second Bragg angle on the downstream AOM 460$x_2$. This expansion of beam-positioning range can also be accomplished with an AOM 460₃ having multiple transducers as shown and described later with respect to FIG. 32C instead of using separate AOMs 460$x_1$ and 460$x_2$.

Figure 29C:
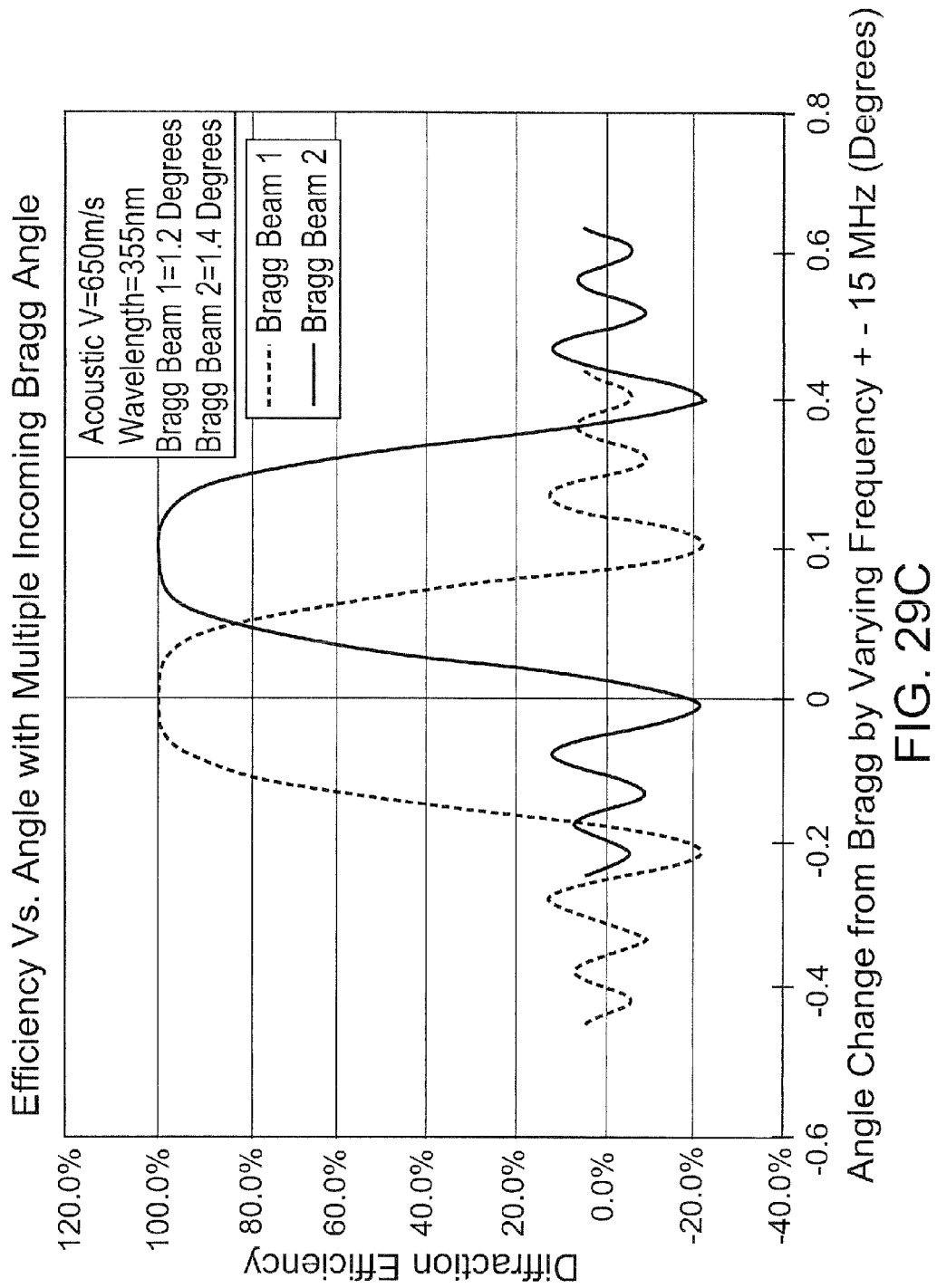
FIG. 29C provides a graph of scanning angle diffraction efficiency versus angle change resulting from serial same axis-modulating AOMs 60 at exemplary UV and IR wavelengths.

In one example, the upstream AOM 460$x_1$ shifts the first-order beam by 1.2 degrees and the downstream AOM 460$x_2$ shifts that incoming beam by an additional 0.2 degree without great loss in efficiency. FIG. 29C provides a graph of scanning angle diffraction efficiency versus angle change resulting from serial same axis-modulating AOMs 460 at exemplary UV and IR wavelengths. With reference to FIGS. 27-29C, employing serial AOMs 460 for modulating the same axis can extend the scan angle of the downstream AOM 460$x_2$ as determined by the extent of scan angle of the upstream AOM 460$x_1$ or other device. An AOM 460$x_1$ as the upstream Bragg adjustment device can provide a larger scan angle than using a single AOM 460 alone and can be accomplished at a bandwidth higher than most laser repetition rates, i.e., greater than 100 kHz. Skilled persons will appreciate that even small AOM scanning range improvements will be particularly beneficial at UV wavelengths where the Bragg efficiency factors can be somewhat limiting.

A slower device, such as an FSM or galvanometer system, as the upstream Bragg adjustment device can extend the scan angle of the downstream AOM 460$x_2$ even more greatly, but the overall speed performance is limited by the bandwidth of such upstream positioner. Such slower upstream Bragg adjustment devices would nevertheless be useful, especially for making angle shifts to compensate for slow offsets in laser beam positioning that cause the Bragg efficiency to drop. For example, a downstream AOM 460$x_2$ is used to correct for instabilities in the laser optics system which are causing the laser beam slope through the focusing lens 478 to be slightly off and which are causing an accuracy problem on exemplary link cutting systems. Such small correction can be very fast with the AOM 460$x_2$, almost eliminating pointing drift from small thermal and other effects. However, after a few days, or potentially weeks, the offset from the beginning calibration can be significant in terms of angle of incidence on the entrance surface of the AOM 460$x_2$, causing a loss in efficiency through the AOM 460$x_2$. One solution to this problem would be to include a slower upstream Bragg adjustment device (where a larger but adjustment angle might be warranted or slower adjustment time might be sufficient) to be able to adjust (or calibrate) the incoming beam to adjust for the exact Bragg condition of the AOM 460$x_2$, allowing for maximization of efficiency through it. Without such AOM 460$x_1$ slower upstream Bragg adjustment device before the AOM 460$x_2$, then calibration might necessitate fine positioning the device by hand (or potentially with a mechanical stage under the AOM 460$x_2$ that is movable by hand or electronic means).

Skilled persons will appreciate that the upstream Bragg adjustment device can be variably controlled over a large range or can just be used as a switch between two or more specific angles that satisfy sufficiently efficient Bragg angles of the downstream AOM 460$x_2$. A third serial AOM 460 (or other beam adjustment device, not shown) may also be employed to correct for movement of the pupil when shifting between two Bragg conditions. Skilled persons will also appreciate that serial same-axis AOMs 60 (or other upstream Bragg adjustment devices) can be employed to improve the scan range along either axis or both axes of an AOM scanning system. Skilled persons will further appreciate that, as later described, the amplitude of the RF signal applied to the transducer(s) 470 can be adjusted to compensate for deviation from Bragg efficiency resulting from a shift of the exit angle in either of the AOMs 460$x_1$ or 460$x_2$.

Figure 30:
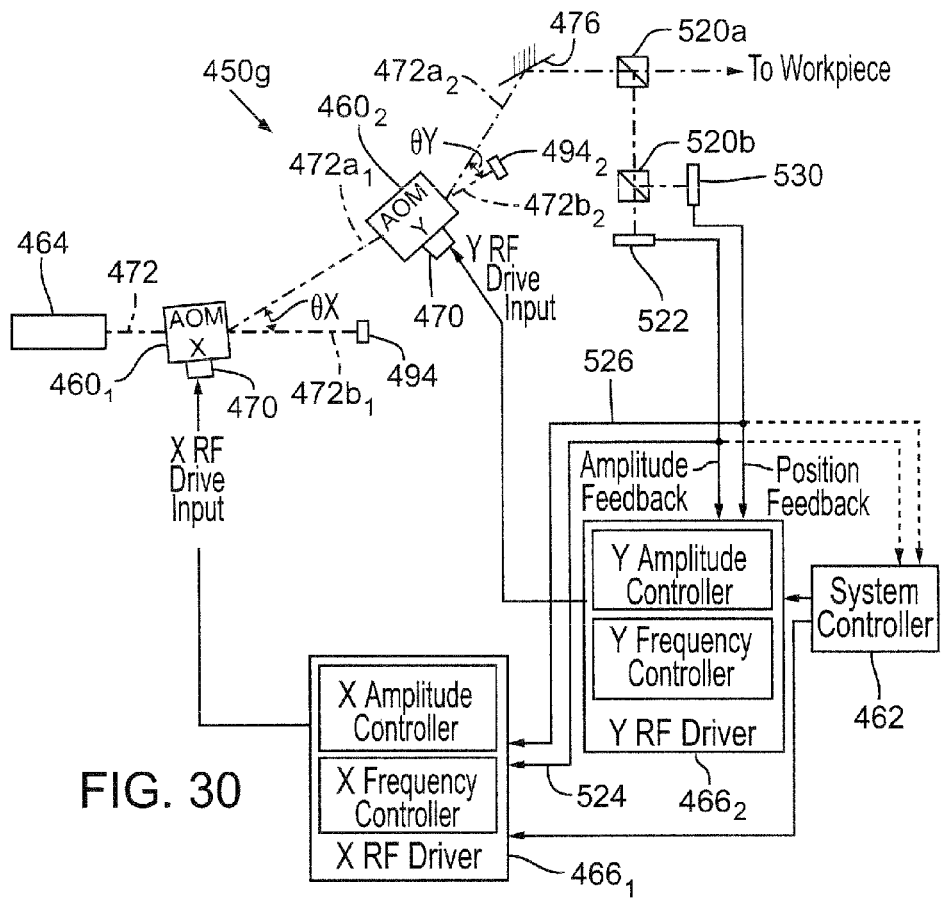
FIG. 30 is a schematic diagram of a laser system employing extracavity AOMs and closed-loop correction control to affect beam positioning.

FIG. 30 is a schematic diagram of a laser system 450g employing extracavity AOMs 460₁ and 460₂, two beam-splitting optical elements 520a and 520b, an energy and amplitude detector 522, and a position-sensing detector 530 to provide closed-loop control of pulse energy, amplitude, and laser beam position at the surface of the workpiece 480. Beam alignment can be critical to the outcome of many processing operations, especially when submicron accuracy is desired. In some embodiments, accuracy is better than 0.18 microns, or even better than 0.15 microns, and will soon be better than 0.1 microns. Beam alignment can be affected by a variety of factors such as mechanical motion, vibration or thermal variations in any of the optical media, and/or other beam walk contributors. Closed-loop AOM beam-positioning control can reduce beam misalignments and product loss caused by such factors.

In implementing angular corrections using frequency control of the AOM RF power, diffraction efficiency of the first-order beam will be less as the angle is higher or lower than the angle accepting of the Bragg condition. The angle defined by the Bragg condition is stated as:

$$\sin\theta_B = \frac{\lambda}{2\Lambda} \quad (7)$$

where $\theta_B$ is the angle of incidence of the incoming light, $\lambda$ is the wavelength of light, and $\Lambda$ is the wavelength of sound in the AOM medium.

If the frequency of the transducer 470 is modified, the wavelength of the sound wave will be modified, causing the Bragg angle that satisfies the Bragg equation to change. In this case, the reflectance or the efficiency of the diffraction will drop off with a relationship equivalent to:

$$R_e = \text{sinc}\lfloor(\sin\theta - \sin\theta_B)2L/\lambda\rfloor \quad (8)$$

where L is the length of interaction of the sound and light (or the diameter of the light beam).

This sinc function can limit the angle usable in a laser machining operation, as high efficiencies are typically required for processing. However, a laser power or energy overbudget can be implemented to account for the efficiency drop during angle control, as well as for harmonizing energy or amplitude of the system.

For example, employing $TeO_2$ AOM crystal, operating at 60-80 MHz with greater than 2 W RF power and acoustic velocity of 650 m/s on a 1064 nm laser with a 2 mm beam diameter, provides a maximum allowable angle of approximately 50 milliradians before zero efficiency is diffracted to the first-order beam.

In a laser beam correcting application to correct for transients in the optical system, for example, an angle range of at least ±0.5 milliradian is desirable. If the efficiency of the AOM 460 at the Bragg condition is 80%, then a deviation from the Bragg condition will result in an efficiency loss on the first-order beam of approximately 0.8%, or a new first-order diffraction efficiency of 79.2%.

In such case, the laser power budget to allow for some additional laser energy can be implemented to allow for this extra loss due to angular correction as well as for amplitude correction for laser transients, thermal effects, or other disturbances in the optics train. Accordingly, the RF power to the AOM 460 can be set to a lower level at the Bragg condition to have the maximum laser energy output of $E_{max}$; a possible number is the equivalent energy of 75% efficiency for this example. Thus, a total control budget of 5% efficiency can be available to use for amplitude adjustments and angular corrections. As the angle is adjusted to +0.5 milliradian from the Bragg condition, the efficiency will drop to 79.2%, but the RF amplitude can be increased by 0.8% to offset the reduced efficiency due to the angular correction. In this example, 4.4% more overhead room would still be available for other amplitude corrections that may be desirable.

Thus, the amplitude of the RF signal applied to the transducer 470 can be adjusted to compensate for deviation from Bragg efficiency resulting from a shift of the exit angle, from a beam path 472 at the Bragg angle that would impinge a nominal beam position to a positioned angle that directs the beam path 472 to impinge a desired beam position that is offset from the nominal beam position. The Bragg efficiency amplitude compensation information may be mathematically and/or experimentally determined for each AOM 460 of specified characteristics. The compensation data may be placed into a lookup table or be provided by an algorithm, such as an algorithm based on a sinc function. The Bragg efficiency amplitude compensation information may be implemented at the RF driver 66 from the laser system controller 462 or from an intermediate controller or separate controller.

Bragg efficiency compensation can be implemented for either or both of the AOMs 460$_1$ and 460$_2$ to affect amplitude correction on the respective X and Y axes on the surface of the workpiece 480. Similarly, Bragg efficiency compensation can be implemented for either or both of the transversely or orthogonally positioned transducers 470x and 470y (FIG. 33), as later described.

With reference again to FIG. 30, signals from the amplitude detector 522 and the position-sensing detector 530 can be fed to the laser system controller 62 and/or directly or indirectly to the X and Y RF drivers 466$_1$ and 466$_2$. In some alternative embodiments, beam-splitting elements 520 and position-sensing detectors 530 can be employed after each AOM 460. Beam-splitting elements 520 may even be attached directly to the output surfaces of one or both of the AOMs 460.

The methods of feedback for these feedback control systems vary from capacitance detection of mechanical rotation to position-sensing electronics for detecting laser spots. The electronics of the position-sensing detector(s) 530 might be the limiting factor for AOM performance in terms of being able to accurately detect the angular position of the AOMs 460. Therefore, alternative closed-loop system components and techniques known to skilled practitioners can be employed.

The bandwidth of the position-sensing detector(s) 530 in the closed-loop control systems may preferably employ filtering techniques to enhance position accuracy by reducing the noise from the electronics. If the desired accuracy is extremely high, very high noise reduction can be employed, but the bandwidth of the position-sensing detector(s) 530 may be limited due to filtering.

The coefficients of the control system can be updated at a rate that is greater than the overall system bandwidth desired, but not on every cycle of the AOM update. This update parameter can be set depending on the desired accuracy and the desired bandwidth of the system. An exemplary system may have the following parameters:

AOM bandwidth=250 kHz;
Desired system bandwidth=25 kHz; and
Position-sensing bandwidth (after filtering)=250 Hz.

The AOM control parameters would be then updated every 100 cycles of the system, allowing for detection of transients of up to 250 Hz to be controlled and also giving an overall system performance of 25 kHz. Thus, in cooperation with the very fast frequency updating and adjustment speeds of the AOMs 460$_1$ and 460$_2$ by any of the techniques previously described, the closed-loop control system is able to make slight adjustments in alignment on-the-fly in real time.

Figure 31A:
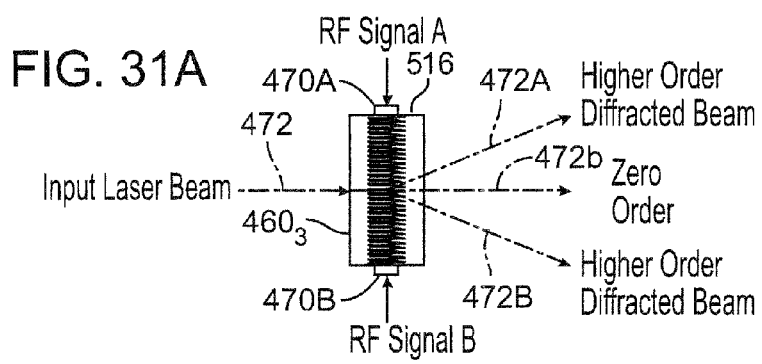
FIG. 31A is a schematic diagram of an AOM employing at least two transducers to divert a beam that is perpendicular to the AOM entrance surface.
Figure 31:
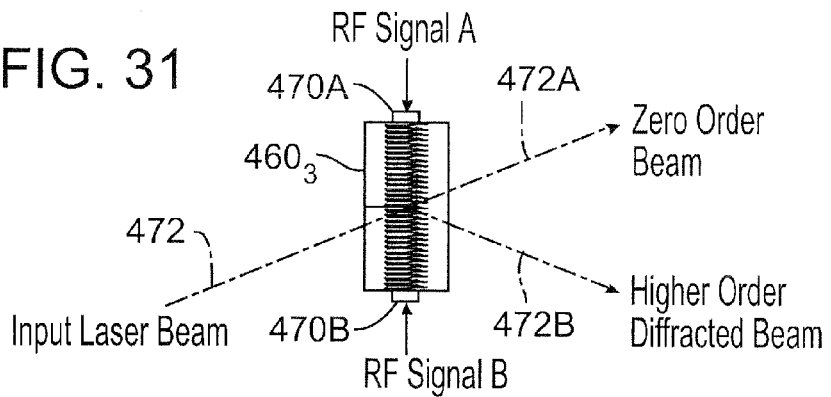
FIG. 31 is a schematic diagram of an AOM employing at least two transducers to divert a beam that is angled to the AOM entrance surface.

FIG. 31 is a schematic diagram of an AOM 460$_3$ employing at least two transducers 470A and 470B (generically transducers 470) having overlapping transducer modulation zones 516 to allow for selection of the direction of the propagating sound wave through the medium of the AOM 460. Transducer 470A will produce a frequency downshifted reflection of light along path 472B, and transducer 470B will produce a frequency upshifted reflection of light along path 472B as well. When used at the same frequency, and preferably phase locked, the addition of these transducer signals can produce small magnitude gains in efficiency of the diffracted light. Estimated efficiency gains may range from about 1% to greater than or equal to about 15%, depending on wavelengths and other typical laser parameters.

Only one of the transducers 470A and 470B may be activated at a given time, or both the transducers 470A and 470B may be activated at a given time. Skilled persons will appreciate that each transducer 470 can be driven by the same or different RF drivers 66 (not shown) at the same or different frequencies in accordance with any of the previously described AOM modulation techniques or embodiments. If transducers 470A and 470B are operated at different frequencies, there is the potential to cause multiple diffractions in the device, allowing for the formation of two separate beams, separated by the angle defined by the difference in frequency. Transducers 470A and 470B may also be operated concurrently at slightly different phases to increase scan angle resolution beyond that available to a single transducer 470 alone. At least two or more transducers 470A and 470B can also or alternatively be positioned on the same surface of AOM $460_3$ to achieve similar advantages. These embodiments can be applied to AOMs 460 oriented for either axis.

If transducers 470A and 470B have different sizes, they can potentially allow for different frequency drivers that would permit one of the transducers 470 to produce a higher frequency than the other. With reference again to equation (7), the Bragg angle can be increased by increasing the acoustic frequency of either of the transducers 470A and 470B. Traditional transducers 470 are in the range of 50 MHz to 250 MHz for Bragg angles of 0.7 degrees to 4 degrees. Frequencies greater than 250 MHz typically require smaller transducers and RF power generators with the capability to drive them at higher frequencies. Using the smaller of the two transducers 470A or 470B when desirable would allow for formation of a larger Bragg angle for the incoming beam (and, therefore, allows for a larger first-order exit angle), potentially making the separation from the zero order larger (and placement of beam dump 494 easier) and thus making propagation of the first-order beam to the workpiece 480 easier. Using the larger of the two transducers 470A or 470B when desirable would allow for greater diffraction efficiency whenever the larger Bragg angle is not desired. Similarly, two smaller frequency and phase-locked transducers 470A and 470B could be employed to expand the diffraction efficiency over a single smaller transducer 470 where applications or system constraints require the larger Bragg angle. Such embodiments would add greater versatility to the AOM scanning system.

FIG. 31A is a schematic diagram of an AOM $460_3$ employing at least two transducers 470A and 470B to allow for selection of the direction of the propagating sound wave through the medium of the AOM 460 to divert a beam that is perpendicular to the AOM entrance surface. As discussed in connection with FIG. 31, this embodiment may be employed to increase diffraction efficiency, increase diffraction angle range by providing a higher combined frequency, or increase versatility by employing transducers 470 of different sizes. Skilled persons may also note that when the input beam 472 is closer to either of the transducers 70, the response time of the AOM $460_3$ may be slightly increased.

Figure 32C:
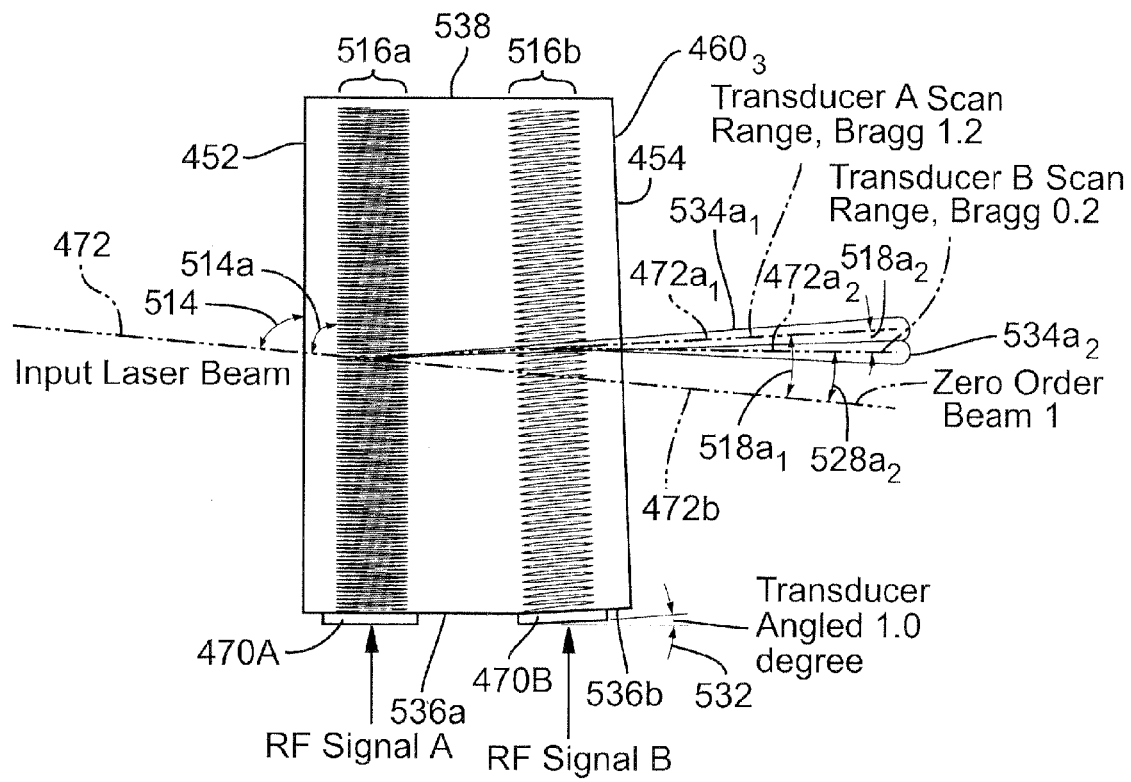
FIG. 32C is a schematic diagram demonstrating the effects of two transducers positioned at different angles to each other to expand beam-positioning range.
Figure 32A:
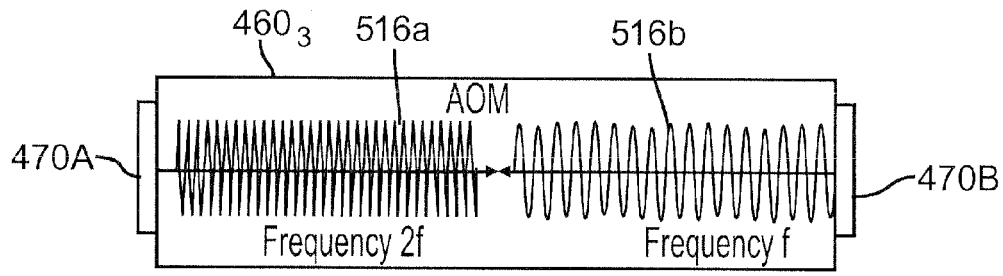
FIGS. 32A and 32B are schematic diagrams demonstrating effects of at least two transducers propagating different frequencies on an AOM along the same axis.
Figure 32B:
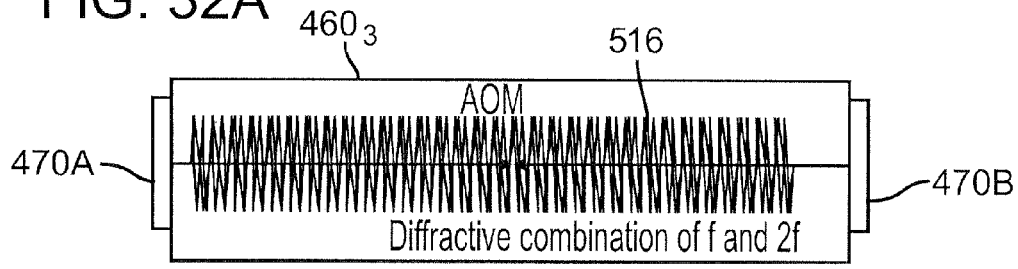

FIGS. 32A and 32B are schematic diagrams demonstrating effects of at least two transducers 470A and 470B propagating different frequencies on the AOM 460 within overlapping transducer modulation zones 516. FIG. 32A shows exemplary different frequencies propagating through the AOM 460 when the transducers 470A and 470B are "ON" contemporaneously, and FIG. 32B shows the potential to create diffraction inside the AOM 460 that is the combination of the two sources.

In certain exemplary cases, such as when both of the transducers 470 are "ON" and the first transducer 470A provides twice the frequency of the second transducer 470B, the diffractive combination of the two frequencies in the medium of the AOM 460 can be beyond the frequency limitations of the independent AOM RF drivers 466 to create on their own and beyond the frequency limitations of either of the transducers 470 to create on their own (due to mechanical limitations of the transducer and electrical limitations of the RF power amplifier). Such frequency combinations can lead to achieving higher angular beam-positioning resolution or higher Bragg angles than are available to embodiments employing single RF drivers 66 that drive single transducers 470. Skilled persons will also appreciate that for some embodiments, the transducers 470 may be positioned so that the transducer modulation zones 516 are parallel instead of overlapping. In such embodiments, the transducers 470 may be placed so that they are both on the same surface or on opposite surfaces.

At least two or more transducers 470A and 470B can also be used to diffract multiple wavelengths from the same beam. With reference again to FIG. 31, the incoming laser beam 472 may contain multiple wavelengths, such as when harmonics are generated by the laser 464. For example, if the laser beam 472 has a wavelength of 355 nm generated from 1064 nm using third harmonic generation techniques, the laser beam 472 can contain energy from 710 nm as well as 355 nm. In such case, the AOM $460_3$ may act as a wavelength selector, only allowing the specific wavelength satisfying the Bragg equation (7). Therefore, if the selected frequency on the first transducer 470A is set to a frequency resulting in the Bragg diffraction of 355 nm wavelength, the 710 nm portion of the beam will not diffract and will travel the zero-order path 472A. Skilled persons will appreciate that the use of a laser output having multiple selected wavelengths is beneficial to some laser applications, so a method of having both wavelengths travel to the work surface may be desirable. So in addition to setting the first transducer 470A to satisfy the Bragg equation for the first wavelength, a skilled person can set the second transducer 470B to satisfy the Bragg equation for the second wavelength, propagating both wavelengths in the first-order path 472B.

FIG. 32C is a schematic diagram demonstrating the effects of at least two transducers 470 positioned at different angles with respect to each other to expand beam-positioning range in a single Cartesian axis. With reference to FIGS. 29-29C and 23A-23C, the second transducer 70B is positioned at a tilt angle 532 with respect to the first transducer 470A such that their respective transducer modulation zones 516b and 516a are nonparallel with each other but traverse the beam path 72 in the same plane such that they modulate the exit or deflection angle in the same Cartesian axis. The transducers 470A and 470B are preferably positioned such that their respective transducer modulation zones 516a and 516b are non-overlapping, but overlap is permissible and may be desirable in some circumstances.

Skilled persons will appreciate that the second transducer 470B may alternatively be positioned on the opposite transducer surface 538 if provided with the appropriate tilt angle 532. However, the tilt angle 532 of the second transducer 470B can be selected so the diffracted order of the second transducer 470B is offset from the diffracted order of the first transducer 470A to allow the placement of the transducers in close proximity along the same side of the AOM $460_3$.

In some preferred embodiments, the first transducer modulation zone 516a is parallel to the beam entrance surface 452, and the second transducer modulation zone 516b is parallel to the beam exit surface 454, such that the beam entrance surface 452 and the beam exit surface 454 are nonparallel. In other preferred embodiments, one of the transducer modulation zones 516 is parallel to the beam entrance surface 452 and the beam exit surface 454 such that the beam entrance surface 452 and the beam exit surface 454 are parallel. In yet other preferred embodiments, one of the transducer modulation zones 516 is parallel to the beam entrance surface 452, and the beam exit surface 454 may be at an angle that is an average of 90 degrees and 90 degrees±the tilt angle 532 or may be at some other angle between 90 degrees and 90 degrees±the tilt angle 532. Alternatively, the beam entrance surface 452 may be angled with respect to the first transducer modulation zone 516a, and the beam exit surface 454 may be parallel to the second transducer modulation zone 516b.

The AOM $460_3$ may be angle cut to provide the tilt angle 532 for the second transducer 470B by broaching or milling the transducer surface 536b or neighboring surface 536a to the desired angle, depending on the AOM material. These techniques are known in the optical material/device industry along with other techniques to achieve precision surfaces. Although the transducer surface 536b is shown to extend outwardly from the transducer surface 536a, skilled persons will appreciate that the transducer surface 536b would function properly if it extended inwardly by the same tilt angle 532.

In most embodiments, the tilt angle 532 is a small angle typically no greater than 5 degrees, and preferably less than about 2.5-3 degrees. In most embodiments, the tilt angle 532 is typically greater than about 0.1 degree, and preferably greater than 0.3 degree or 0.5 degree. FIG. 32C depicts an exemplary tilt angle 532 of about 1 degree.

The AOM $460_3$ is preferably positioned on the beam path 472 such that the beam path 472 impinges the AOM $460_3$ at an entrance angle 514 or 514a that is at or in proximity to a Bragg angle with respect to the beam entrance surface 452 or the first transducer modulation zone 516a. Skilled persons will appreciate that the frequency of the RF signal applied to the first transducer 470A can be adjusted or calibrated to compensate for slight unintentional deviation in alignment.

Whenever scanning is desired along the beam path $472a_1$ or its associated scan range $534a_1$ (down to a minimum desirable Bragg efficiency), the first transducer 470A is activated by an RF signal at a frequency that satisfies or approximately satisfies the Bragg condition such that the beam path 472 is deflected to a desired exit angle $518a_1$ within the scan range $534a_1$ such that the beam path $472a_1$ impinges the workpiece 480 at a desired beam position 542 (FIG. 36) that is shifted from its nominal or original beam position. The frequency of the RF signal applied to the first transducer 470A would be adjusted to determine the desired exit angle $518a_1$ within the scan range $534a_1$, and the amplitude of the RF signal applied to the first transducer 470A could also be adjusted to a desired amplitude to control beam power or energy. Furthermore, whenever scanning is desired along the beam path $472a_1$ or its associated scan range $534a_1$, preferably, no RF signal is applied to the second transducer 470B so that the second transducer modulation zone 516b generally does not affect the exit angle $518a_1$ of the beam path $472a_1$. In some embodiments, however, it may be desirable to set the tilt angle 532 so that the first-order or higher-order beam path created by the second transducer 470B is aligned with the beam path $472a_1$, in which case the second transducer 470B would be driven at full amplitude and at an RF frequency to match the Bragg condition.

Whenever scanning is desired beyond the scan range $534a_1$ and within a scan range $534a_2$ that results from the cooperative contemporaneous operation of the transducers 470A and 470B, the transducers 470A and 470B are activated by respective RF signals at respective frequencies that satisfy or approximately satisfy their Bragg conditions such that the beam path 472 is deflected to a desired exit angle $518a_2$ within the scan range $534a_2$ such that the beam path $472a_2$ propagates at a cooperative deflection angle (or cooperative deflection propagation direction) $528a_2$ to impinge the workpiece 480 at a desired beam position 542 that is beyond the scan range $534a_1$. The frequency of the RF signal applied to the second transducer 470B would be adjusted to determine the desired exit angle $518a_2$ within the scan range $534a_2$. In some preferred embodiments, the second transducer 470B would be driven at full amplitude, and the amplitude of the RF signal applied to the first transducer 470A could be adjusted to a desired amplitude to control beam power or energy.

Although in some preferred embodiments the transducers 470A and 470B may be identical and driven by identical variably controllable RF drivers 466 as previously discussed, in some preferred embodiments the transducers 470A and 470B and their associated RF drivers 66 may have different operating characteristics or parameters. In particular, in some preferred embodiments, the first transducer 470A may have a smaller size and operate at a higher frequency than the second transducer 470B such that the first transducer modulation zone 516a could provide a larger Bragg angle range than the second transducer modulation zone 516b.

Although the scan angle ranges $534a_1$ and $534a_2$ may range down to 0% Bragg efficiency, exemplary scan ranges 534 are used only down to 20% Bragg efficiency, or down to 50% Bragg efficiency, or down to 80% Bragg efficiency (as roughly depicted in FIG. 32C). In one example, as depicted in FIG. 32C, the incoming Bragg condition is 1.2 degrees for the first transducer 470A, and the incoming Bragg condition is 0.2 degree for the second transducer 470B, as depicted by respective beam paths $472a_1$ and $472a_2$.

Figure 32D:
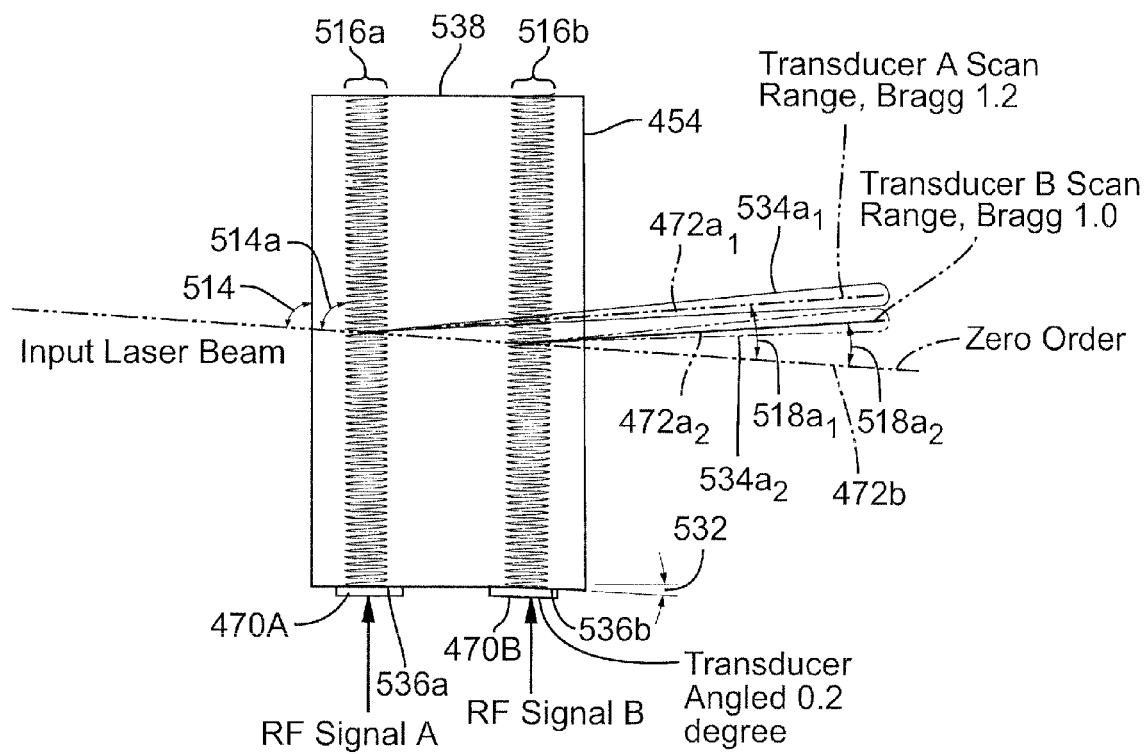
FIG. 32D is a schematic diagram of an alternative embodiment demonstrating the effects of having two transducers positioned at different angles to each other to expand beam-positioning range.

FIG. 32D is a schematic diagram of an alternative embodiment demonstrating the effects of having two transducers 470A and 470B positioned at a tilt angle 532 angle with respect to each other to expand beam-positioning range. With reference to FIG. 32D, in some preferred embodiments, the transducers 470A and 470B can be positioned so that their respective tilt angle(s) 532 and transducer modulation zones 516 are aligned to provide a common zero-order beam path 472b.

The tilt angle 532b and the frequency of the RF signal applied to the transducer 470B are adapted to provide a first-order beam path $472a_2$ from the transducer modulation zone 516b with a scanning range $534a_2$ that is adjacent to or overlaps the scanning range $534a_1$ of the first-order beam path $472a_2$ provided by the transducer modulation zone 516b. In such example, whenever an exit angle $518a_1$ within scan range $534a_1$ is desired, the transducer 470A is modulated at the desired frequency and amplitude while the transducer 470B is effectively turned "OFF" as previously discussed with respect to any of the full extinction techniques, such as simply changing the frequency to provide zero effective Bragg efficiency. Whenever an exit angle $518a_2$ within scan range $534a_2$ is desired, the transducer 470B is modulated at the desired frequency and amplitude while the transducer 470A is effectively turned "OFF." In some embodiments, the zero-order beam path through the AOM $460_3$ can be used as the working beam path to provide a scan range similar to that of scan range $534a_1$ about the zero-order beam path, and the tilt angle 532 and frequency applied to the transducer 470B could be adjusted to provide a scan range $134a_2$ that is adjacent to or overlaps the scan range $534a_1$.

The second transducer 470B with the tilt angle 532 can also be employed to produce a second beam wherein the frequencies applied to the transducers 470A and 470B are configured to provide two resolvable beam spots simultaneously. The amplitude of the RF signal applied to the transducer 470A (with the transducer 470B receiving a full amplitude signal) can be used to control the power content of both beams. Alternatively, the amplitudes applied to both of the transducers 470A and 470B can be controlled.

Employing the second transducer 470B at a tilt angle 532 can, therefore, be used to extend the overall scanning range while limiting loss due to Bragg efficiency constraints and to provide other advantages similar to those described with respect to FIGS. 29A-29C. Skilled persons will appreciate that such second transducer 470B and the tilt angle 532 can be employed to control the deflection angle on either or both Cartesian axes.

Figure 32E:
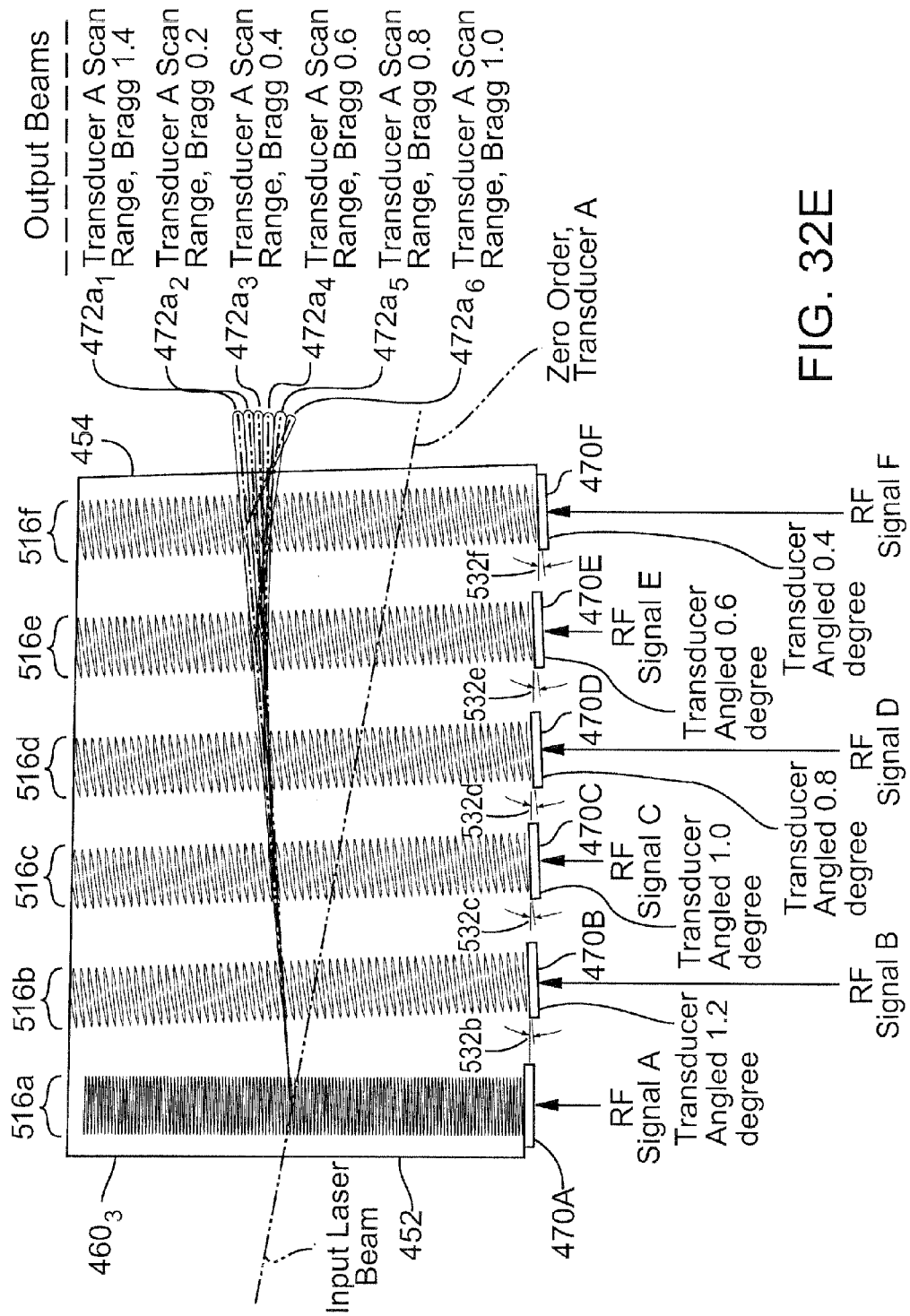
FIG. 32E is a schematic diagram demonstrating the advantages of having multiple transducers positioned at different angles to each other to expand beam-positioning range.
Figure 32F:
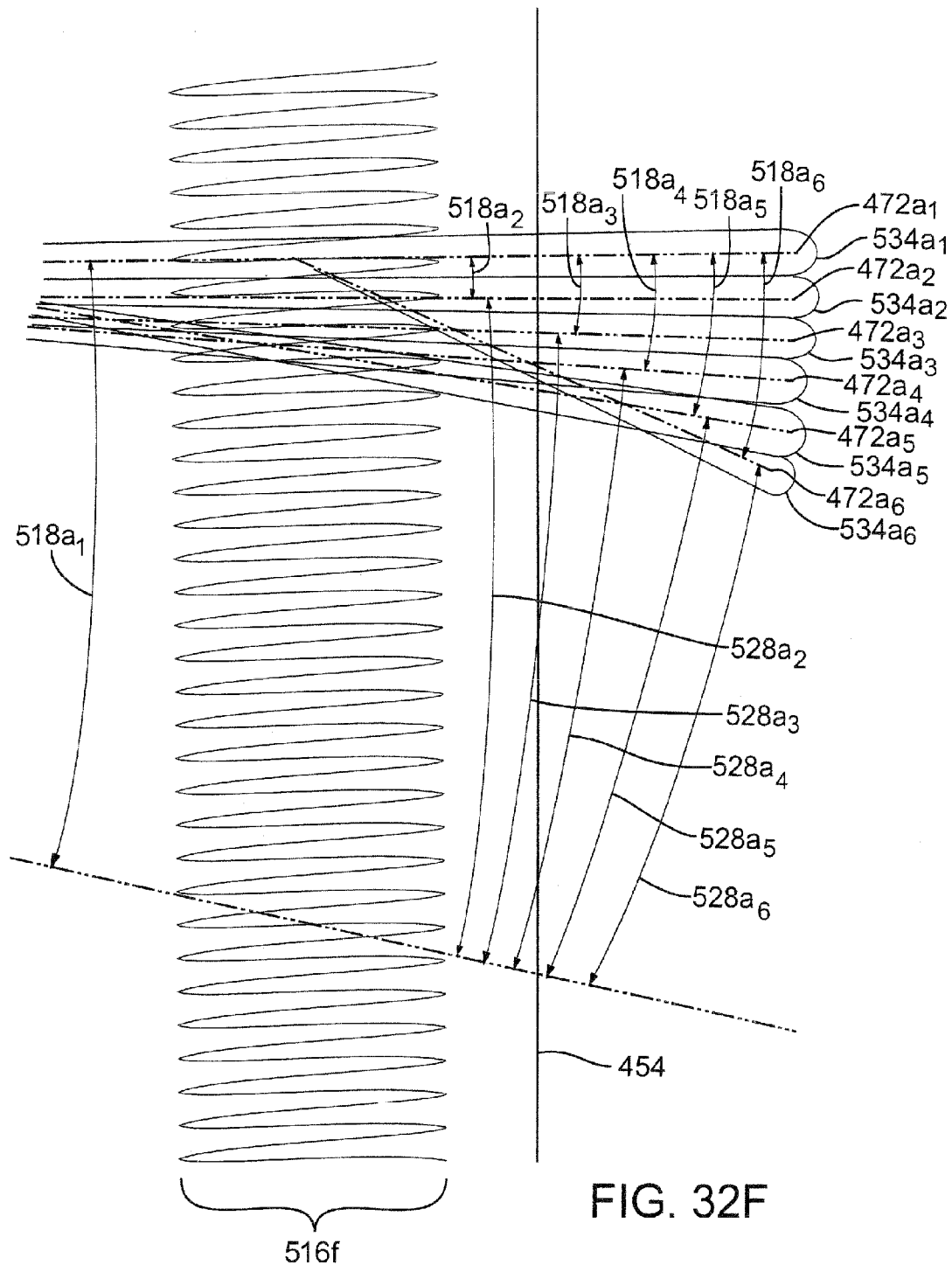
FIG. 32F is a schematic diagram showing an enlargement of a portion of FIG. 23E.

FIG. 32E is a schematic diagram demonstrating the advantages of having multiple transducers 470 positioned at different angles to an AOM side (with respect to the plane of the transducer surface 536a of the transducer 470A) in order to expand beam-positioning range, and FIG. 32F shows an enlargement of a portion of FIG. 23E. With reference to FIGS. 32C-32F, the concept of the tilt angle 532 can be extended to the use of multiple tilted transducers 470A-470F in series to further extend the scanning range of the AOM $460_3$ along a single Cartesian axis.

As previously discussed with respect to FIG. 32C, the input beam path 472 to the AOM $460_3$ is set to achieve a desired Bragg angle to allow for a desirable distance between the zero-order beam path 472b and the first-order beam path $472a_1$ of the first transducer 470A. Frequency modulating the first transducer 470A slightly in either direction will give the allowable scan angle range $534a_1$ for the first-order beam diffracted from the sound wave generated by the transducer 470A in the first transducer modulation zone 516a. FIG. 32E depicts an example employing a 355 nm wavelength beam and an acoustic velocity of 650 m/s with approximately ±0.2 degree as a desirable maximum scan angle range $534a_1$. An exemplary scan angle range $534a_1$ of ±0.1 degree could, however, have alternatively been used and would provide a higher diffraction efficiency, corresponding to only a 20% loss in efficiency at the maximum of 0.1 degree away from the Bragg condition.

To extend the range, the second transducer 470B can be tilted at a tilt angle 532b (with respect to the plane of the transducer surface of the first transducer 470A) that is equivalent to:

$$\text{tilt} = \text{Incoming Bragg Angle} - \text{Separation Angle} \quad (9)$$

where the Incoming Bragg Angle is the Bragg angle of the first transducer 470A and the Separation Angle defines the amount of overlap desired between the scan angle 534 of the second transducer 470B with that of the first transducer 470A. This can be seen in terms of diffraction efficiency in FIG. 32E.

In the case of FIG. 32E, the incoming Bragg angle is set to 1.4 degrees, which is obtained by using an AOM material with an acoustic velocity of 650 m/s, 355 nm wavelength of light, and an RF frequency of 90 MHz applied to the first transducer 470A. If a separation of 0.2 degree is desired for overlap of the diffraction beam resulting from the second transducer 470B, then a tilt angle 532 of 1.2 degrees is employed. The frequency of the RF signal applied to the second transducer 470B would then be set to approximately 12.8 MHz to produce the Bragg angle of 0.2 degree. This frequency can be calibrated by finding the maximum diffraction efficiency to alleviate any manufacturing tolerances in precision manufacturing of any of the transducers 470 or any of their respective tilt angles 532 on AOM $460_3$. Since the first transducer 470A is set to have an outgoing beam at an exit angle $518a_1$ of 1.4 degrees impinging on the second transducer modulation zone 516b caused by the 1.2-degree tilt angle 532b of the second transducer 470B, the Bragg condition of 0.2 degree is matched for the second transducer 470B. In this case, if range beyond the scan angle range $534a_1$ of the first transducer 470A is desired, then the first transducer 470A is used to cause diffraction at a desired amplitude and RF frequency satisfying the Bragg equation for the transducer 470A. The resulting beam path $472a_1$ will then be diffracted by the second transducer 470B, which is run at full amplitude and a frequency at which the desired exit angle $518a_2$ and cooperative deflection angle $528a_2$ are achieved for positioning the beam spot on the workpiece 480.

This concept can then be extended for the additional transducers 470C-470F, lining up the tilt angles $532c$-$532f$ and the transducer modulation zones 116c-516f so that the respective scanning angle ranges $534a_3$-$534a_6$ have the desired diffraction efficiencies. In this example, a diffraction angle of ±0.1 degree is desired, so a tilt angle 532 of 1.0 degree is required to satisfy equation (9) using an incoming Bragg angle of 1.4 degrees for the first transducer 470A and a separation of 0.4 degree. In this example, a 0.4-degree separation is used for the transducer 470C because the second transducer 470B scan angle range $534a_2$ of ±0.1 degree is taken into account in the separation angle. If an angle in scanning is desired that falls within the scan angle range $534a_3$ of the transducer 470C, then RF power is applied to the first transducer 470A to control the amplitude desired at the workpiece 480 and at a frequency satisfying the Bragg equation, and full RF power is applied to the transducer 470C at a frequency between 19.1 MHz and 32 MHz to achieve the desired exit angle $518a_3$ and desired cooperative deflection angle $528a_3$ for positioning the beam on the workpiece 480. The transducer 470C would be most efficient at its Bragg angle of 0.4 degree at a frequency of approximately 25.6 MHz.

This same logic used to find the tilt angle 532c of the transducer 470C can be applied to determining tilt angles 532 for the additional transducers 470 in the series. In this example, the transducer 470D is set to a tilt angle 532d of 0.8 degree, making a Bragg condition of 0.6 degree; the transducer 470E is set to a tilt angle 532e of 0.6 degree, making a Bragg condition of 0.8 degrees; and the transducer 470F is set to tilt angle 532f of 0.4 degree, making a Bragg condition of 1.0 degree. If any of these extended scan angle ranges 534 are needed, then the RF power is applied to the first transducer 470A at the desired amplitude and frequency satisfying the Bragg condition, and the respective transducer 470 that is needed is given full RF power at the frequency for the scan range of the particular transducer 470. As noted earlier, the angle cuts for the placements of the transducers 470 on the AOM $460_3$ may not be perfect, so slight frequency adjustments from the frequencies meeting the theoretical Bragg conditions may be desirable.

In addition to determining scan ranges based on minimum desirable diffraction efficiency, skilled persons can implement a power budget and employ amplitude compensation, preferably on the first transducer 470A, for Bragg angle efficiency deviation as previously described.

Although the example employs decreasing respective tilt angles 532 and respective frequencies as the respective distances of the transducer modulation zones 516 increase from the beam entrance surface 452, skilled persons will appreciate that the transducers 470B-470F and their respective tilt angles 532, transducer modulation zones 516, and frequencies can be placed in any order with respect to the beam entrance surface 452. For example, the transducers 470F and 470C, with their accompanying tilt angles 532 and frequencies, could be positionally exchanged.

Also as previously discussed, the tilt angles 532 may extend inwardly or outwardly, and the transducers 470 may be displaced and positioned on the generally opposed transducer sides of the AOM $460_3$. One advantageous embodiment could alternately position the transducers 470A-470F on the generally opposed sides such that transducers 470A, 470C, and 470E are generally on one side of the AOM $460_3$, and the transducers 470B, 470D, and 470F are generally on the other side of the AOM $460_3$.

Also as previously discussed, the transducer modulation zone $516a$ may be parallel to the beam entrance surface 452, and the last serial transducer modulation zone $516f$ may be parallel to the beam exit surface 454, such that the beam entrance surface 452 and the beam exit surface 454 are nonparallel. In other preferred embodiments, one of the transducer modulation zones 516 is parallel to the beam entrance surface 452 and the beam exit surface 454 such that the beam entrance surface 452 and the beam exit surface 454 are parallel. In yet other preferred embodiments, one of the transducer modulation zones 516 is parallel to the beam entrance surface 452, and the beam exit surface 454 may be at an angle that is an average of 90 degrees and 90 degrees±the tilt angle $532f$, may be at an angle that is parallel to the transducer modulation zone 516 that represents the mean, or may be at some other angle between 90 degrees and 90 degrees±the tilt angle $532b$. Alternatively, the beam entrance surface 452 may be angled with respect to the first transducer modulation zone $516a$, and the beam exit surface 454 may be parallel to the last transducer modulation zone $516f$.

Skilled persons will appreciate that large numbers of serial tilted transducers 470 can be employed depending on the overall desirable scan range, the tilt angles 532, the relative positioning arrangements and order, the size of the transducers 470, the properties of the AOM material, any size limitations of the AOM $460_3$ with respect to manufacture or system alignment, or any other variables known to skilled practitioners. In some exemplary embodiments, two to five or two to ten tilted transducers 470 are employed. In other exemplary embodiments, at least three tilted transducers 470 or more than 15 transducers 470 are employed. In these exemplary embodiments, the AOM $460_3$ can still be less than a few inches long or less than 10 cm long, but can be longer if desirable.

Although in some preferred embodiments the transducers 470A-470F may be identical and driven by identical variably controllable RF drivers 466 as previously discussed, in some preferred embodiments the transducers 470A-470F and their associate RF drivers 466 may have different operating characteristics or parameters. In particular, in some preferred embodiments, the transducers 470 with respectively greater tilt angles 532 (with respect to the plane of the transducer surface of transducer 470A) may have respectively larger sizes and operate at respectively lower frequencies than correspondingly smaller transducers 470.

Figure 32G:
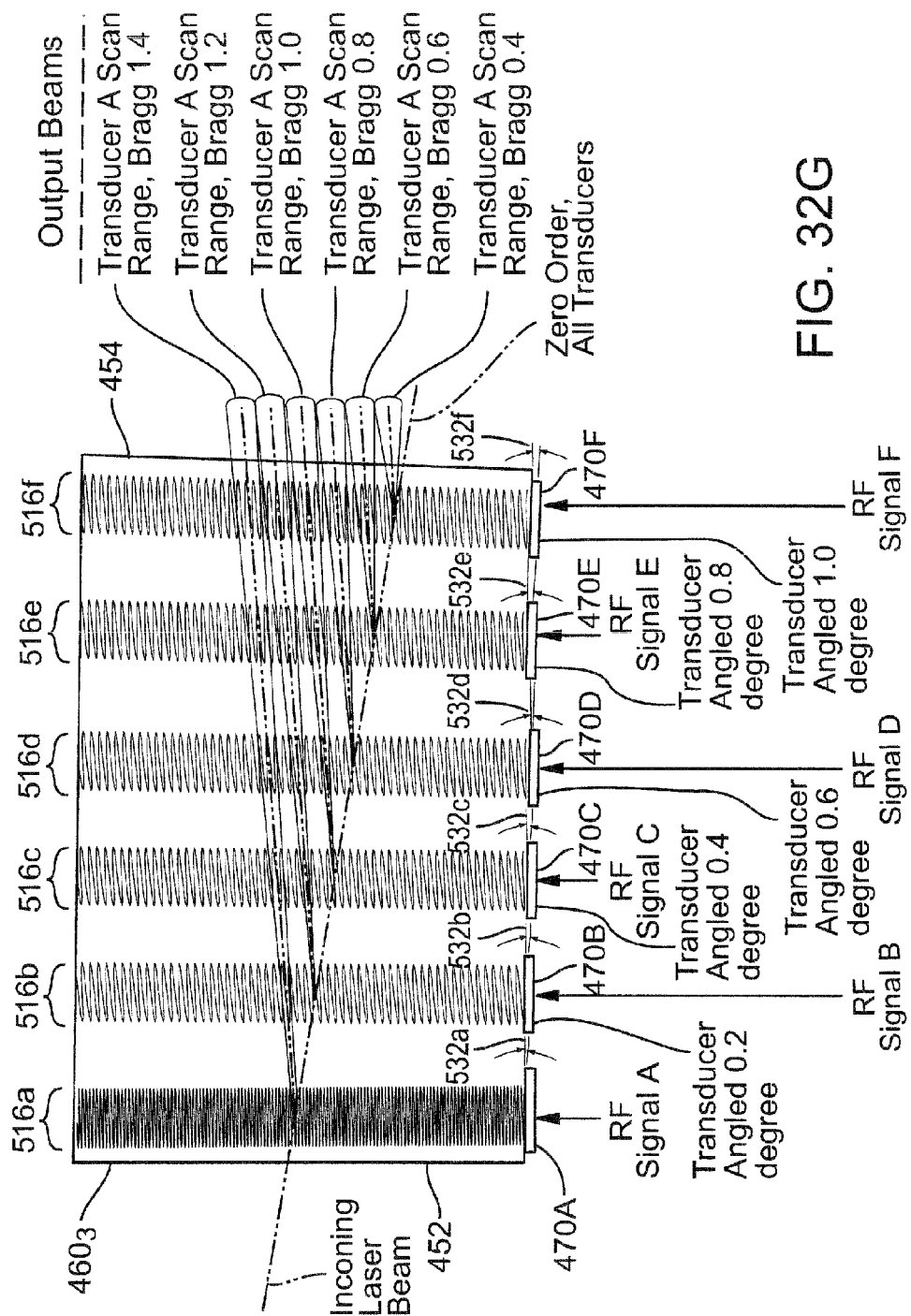
FIG. 32G is a schematic diagram of an alternative embodiment demonstrating the advantages of having multiple transducers positioned at different angles to each other to expand beam-positioning range.

FIG. 32G depicts an alternative embodiment employing multiple tilted transducers 470A-470F demonstrating the advantages of having multiple transducers 470 positioned at different angles to an AOM surface to extend the scanning range of an AOM $460_3$ in a single Cartesian axis. With reference to FIGS. 32C-32G, the tilt angles $532a$-$532f$ and frequencies of the respective transducers 70B-70F can be organized such that zero-order beams are commonly aligned to the zero-order beam path $472b$ so that their first-order beam paths $472a_1$-$472a_6$ scan ranges $534a_2$-$534a_6$ are adjacent or slightly overlapping. Skilled persons will recognize that transducers 470B-470F are arranged for convenience in reverse positions with respect to their arrangement in FIG. 32E; however, any arrangement would be suitable as previously discussed.

Whenever an exit angle $518a_1$ within scan range $534a_1$ is desired, the transducer 470A is modulated at the desired frequency and amplitude while the remaining transducers 470B-470F are effectively turned "OFF." Whenever an exit angle $518a_2$ within a respective scan range $534a_2$ is desired, the transducer 470B is modulated at the desired frequency and amplitude while the transducers 470A and 470C-470F are effectively turned "OFF." Similarly, whenever an exit angle $518a_3$-$518a_6$ within a respective scan range $534a_3$-$534a_6$ is desired, the respective transducer 470C-470F is modulated at the desired frequency and amplitude while all the other transducers 470 are effectively turned "OFF." One advantage of this embodiment is that only one transducer 470 would need to be activated to achieve any of the scan ranges. Another advantage of this embodiment is that little or no loss is occurring when the zero-order beam path $472b$ is used as the base beam path for the other transducers 470 to deflect from.

Skilled persons will appreciate that AOM $460_3$ with a plurality of serial tilted transducers 470 can be employed for pulse-picking (with or without the full extinction techniques) and amplitude control in one or both Cartesian axes as previously and hereinafter discussed.

The combination of two AOMs $460_1$ and $460_2$ close together as shown in FIGS. 27, 29, and 30 can produce a very good scanning system as already described; however, the entrance aperture of the second AOM $460_2$ can limit the angle achievable from the first AOM $460_1$. Another inconvenience that is typical of most scanning systems is that the focusing lens 478 will typically be adapted to have a focal length or pupil that is between the two galvanometer positioning devices, which can be replaced by AOMs $460_1$ and $460_2$ as described in the previous embodiments. Additional AOMs 460 (or other beam adjustment device, not shown) may also be employed in series to correct for movement of the pupil when the AOM scanning system is positioned somewhere other than in a condition meeting the back pupil of the focusing lens 478.

Figure 33:
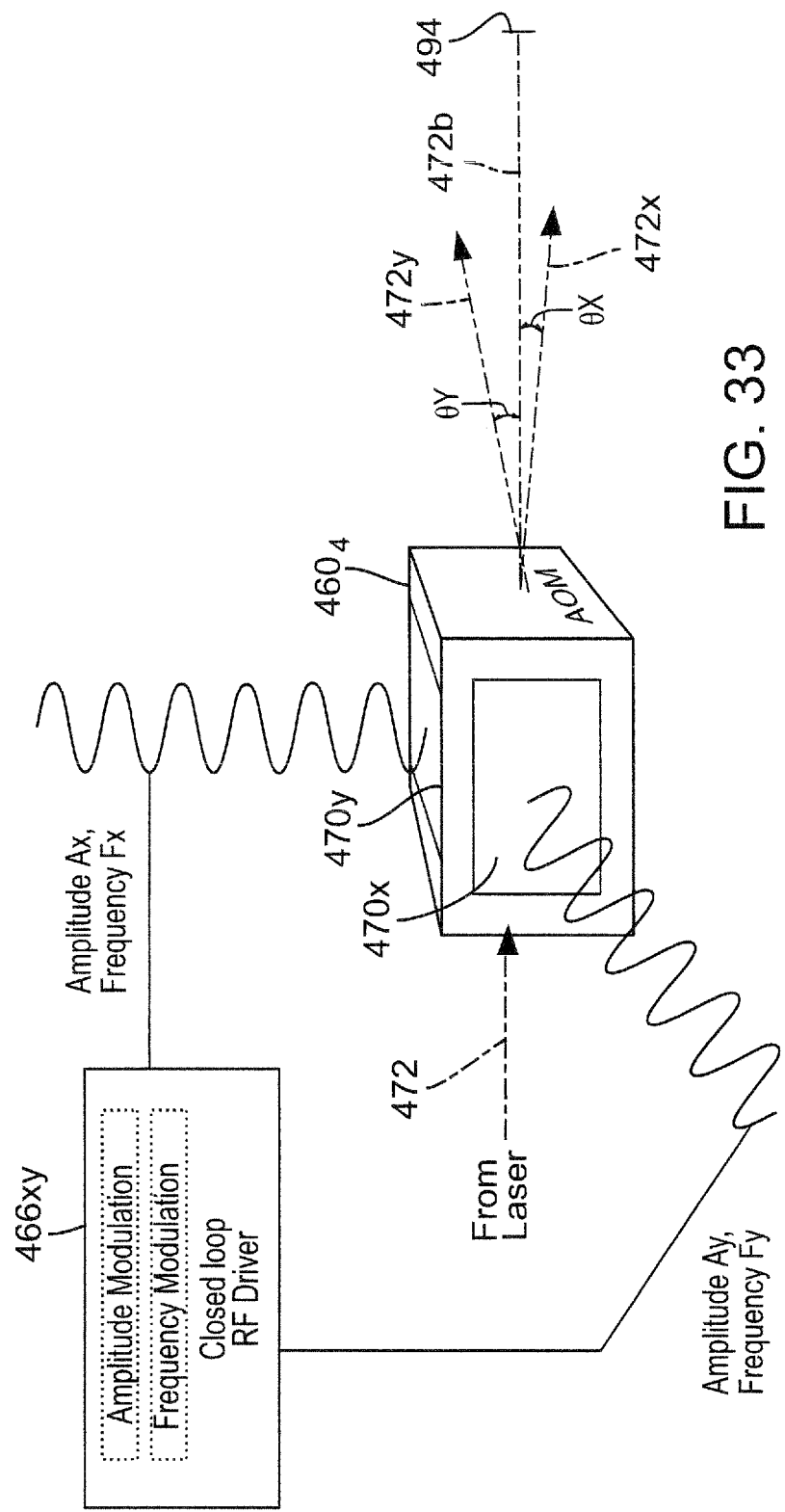
FIG. 33 is a schematic diagram showing an AOM scanning system employing an AOM with at least two transducers.

FIG. 33 is a schematic diagram showing an AOM $460_4$ employing transducers $470x$ and $470y$ positioned on transverse, and preferably orthogonal, surfaces to modulate different transducer modulation axes (transverse and preferably orthogonal) in a single medium to provide for scanning control of both X and Y axes or directions on the surface of the workpiece 480. With reference to FIG. 33, RF driver(s) $466xy$ apply signals to transducer $470x$ to control beam position in the X axis and to transducer $470y$ to control beam position in the Y axis. Skilled persons will appreciate that each transducer 470 can be driven by the same or different RF drivers $466xy$ at the same or different frequencies in accordance with any of the previously described AOM modulation techniques or embodiments. One advantage of employing a single AOM $460_4$ is that the focusing lens 478 can be reduced in complexity because the focal length can be placed at the output of the single AOM $460_4$, and the angle of scanning could then be increased due to not having an entrance aperture limitation for a second AOM 460. Nevertheless, one or more additional single-axis or dual-axis AOMs 460 (or other beam adjustment device, not shown) may also be employed to correct for movement of the pupil when the AOM scanning system is positioned somewhere other than in a condition meeting the back pupil of the focusing lens 478.

Figure 34:
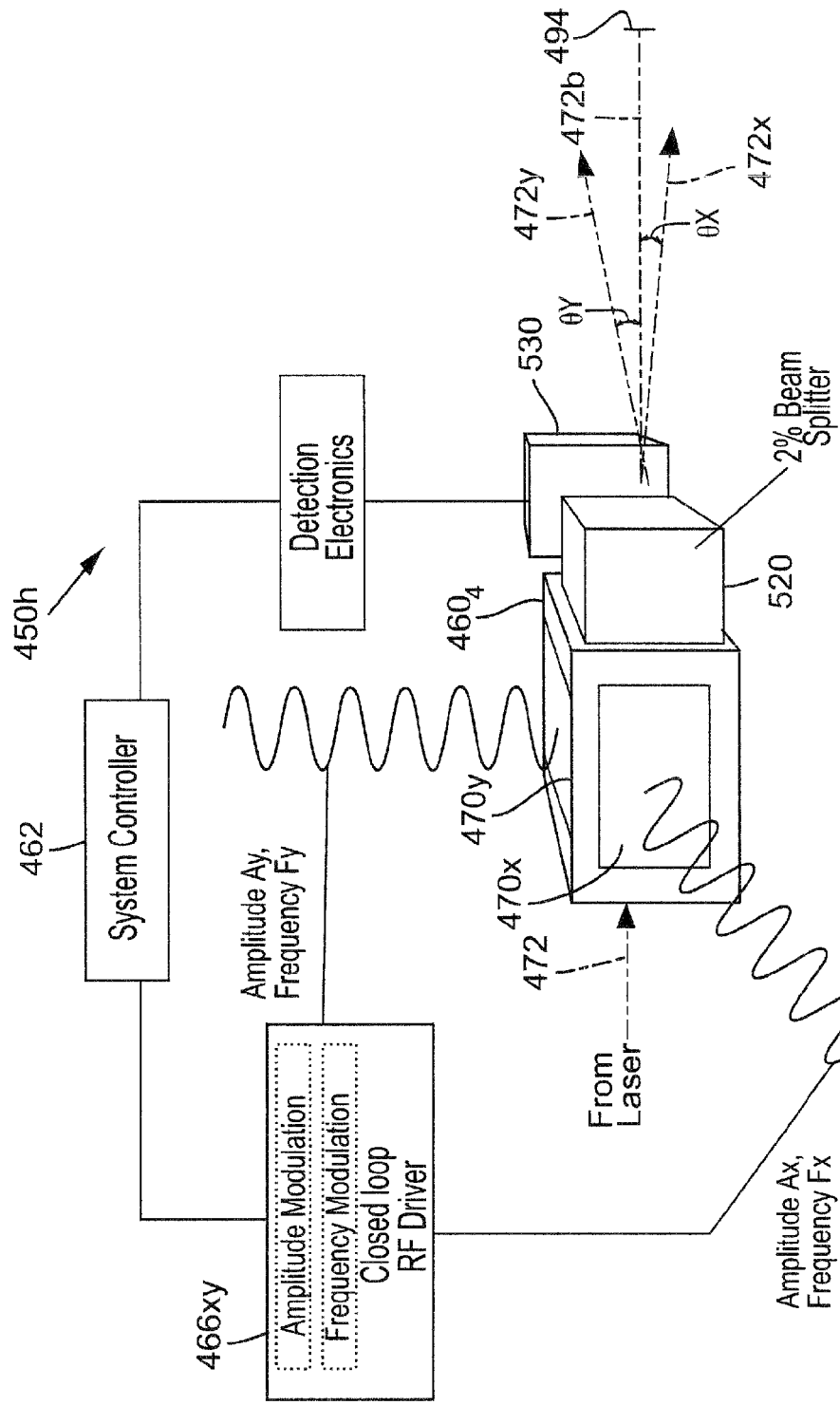
FIG. 34 is a schematic diagram showing an AOM scanning system employing an AOM with at least two transducers and a closed-loop control system.

FIG. 34 shows an exemplary embodiment of AOM $460_4$ employed in a laser system $50h$ that utilizes a closed-loop beam detection and positioning system using a beam-splitting element 520 on the output surface of the AOM 460₄ and a position-sensing detector 530 to detect the angle of the optical path 472 at the exit surface of the AOM 460₄, such as in a combination of the embodiments discussed in connection with FIGS. 30 and 33.

Figure 35:
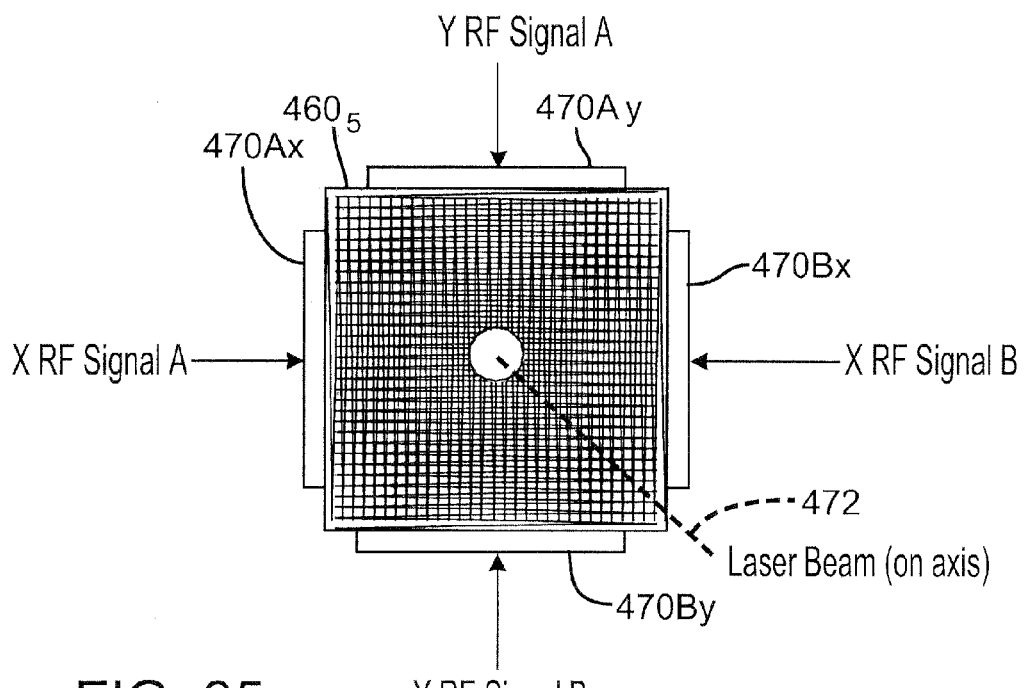
FIG. 35 is a schematic diagram of an AOM employing four transducers.

FIG. 35 is a schematic diagram of an AOM 460₅ employing four transducers 470Ax, 470Bx, 470Ay, and 470By (generically transducer 470). This embodiment combines the advantages described with respect to the AOM 460₃ of FIGS. 31 and 32 with those described with respect to the AOM 460₄ of FIGS. 33 and 34 to facilitate larger scan angles and more versatility. Skilled persons will appreciate that each transducer 470 can be driven by the same or different RF drivers 466 or 466xy at the same or different frequencies in accordance with any of the previously described AOM modulation techniques or embodiments. Skilled persons will appreciate that AOMs 460₄ and 460₅ can be used to replace any AOM 460 previously discussed or any pair of AOMs 460 previously discussed.

Some alternative preferred embodiments of AOMs 460₄ and 460₅ employ a plurality of transducers 470 at tilt angles 532 to extend scanning range as previously discussed. Skilled persons will appreciate that the transducer modulation zones 516 in the transverse Cartesian axes can be non-intersecting, but intersecting transverse-axis transducer modulation zones 516 are preferred. For convenience in manufacture and control, some preferred embodiments employ identical tilt angles 532 for the transducers 470 of intersecting transducer modulation zones 516, but such relationships are not required. In some embodiments employing tilt-angled transducers 470, where the scan ranges are arranged about the zero-order beam path 472b, only a single transducer 470 would need to be activated for each Cartesian axis to provide full extended range scanning control in both axes. Tilt-angled transducers 470 can also be employed in two axes to provide a matrix of beams, with each of the beams having a selectable portion of the energy of the beam entering the AOM 460.

Figure 36:
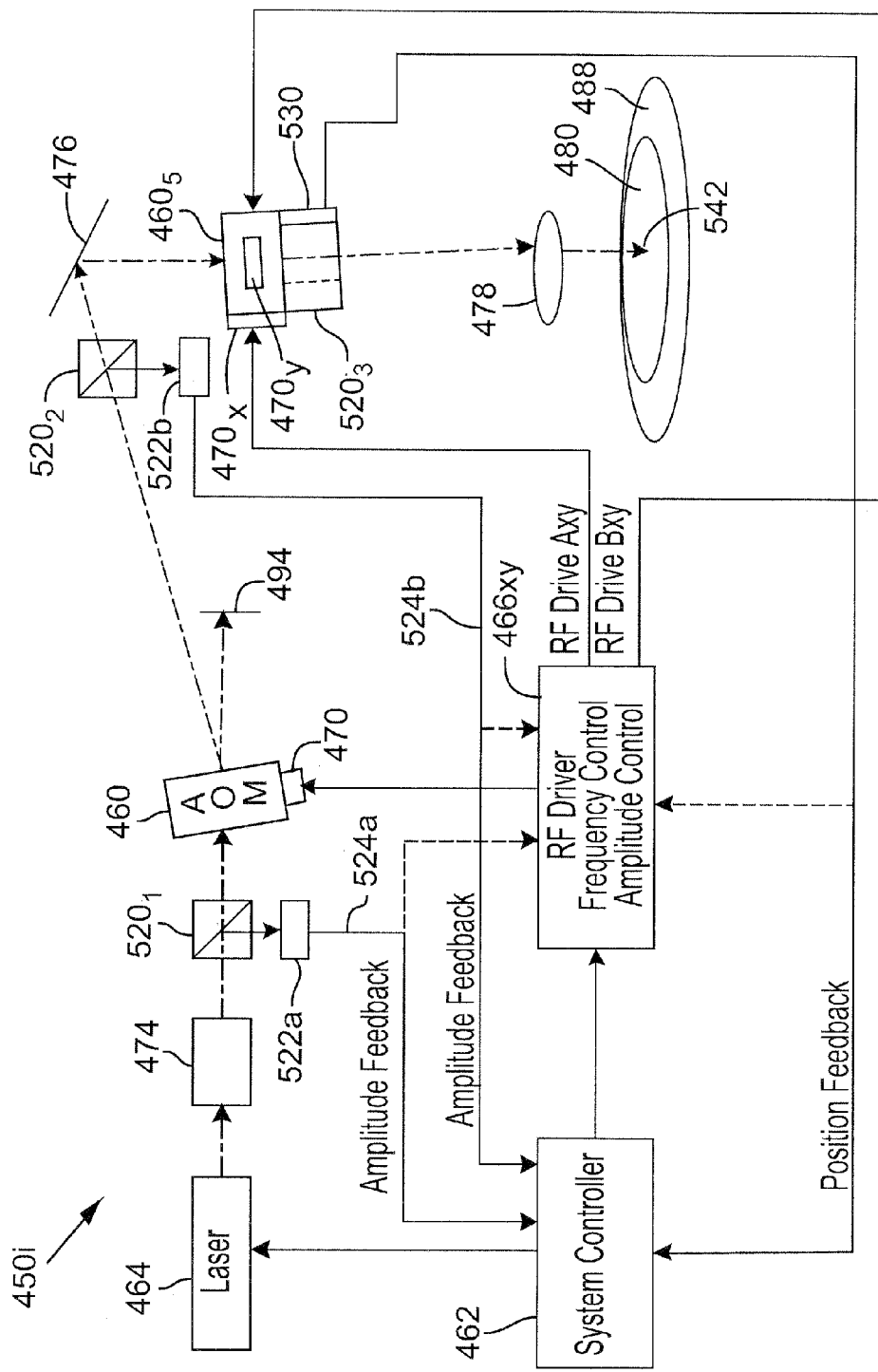
FIG. 36 is a schematic diagram of a laser system employing an extracavity AOM to effect laser pulse gating, and an extracavity AOM employing multiple transducers to effect beam positioning and amplitude modulation with closed-loop control.

FIG. 36 is a schematic diagram of an exemplary laser system 450i employing an extracavity AOM 460 to effect laser pulse gating; an extracavity AOM 460₄ or 460₅ employing multiple transducers 470, a beam-splitting element 520₃, and a position-sensing detector 530 to effect beam positioning with closed-loop control; and beam-splitting elements 520₁ and 521₂ and amplitude detectors 522a and 522b to effect closed-loop amplitude control. With reference to FIG. 36, the amplitude feedback signals 524a and/or 524b may be directed to the system controller 462 and/or the RF driver(s) 466xy. Similarly, the position feedback signal 526 may be directed to the system controller 462 and/or the RF driver(s) 66xy. Skilled persons will appreciate that each transducer 470 can be driven by the same or different RF driver(s) 466xy at the same or different frequencies in accordance with any of the previously described AOM modulation techniques or embodiments.

This embodiment employs a separate AOM 460 as a laser shutter or gate for pulse gating ("pulse picking") to allow pulses to travel through the scanning system only when wanted. In certain embodiments, different angular placement of the pulse picking AOM 460 could be used to eliminate need for the beam dump 494. One advantage of employing a separate pulse-picking AOM 460 is that the AOM 460₄ can be positioned to provide its full angular displacement capabilities. Such a separate pulse-picking AOM 460 can be employed in conjunction with any of the previously described embodiments or AOM modulation techniques. Skilled persons will appreciate, however, that the pulse picking AOM 460 is not required. The AOM 460₄ can be angularly displaced with respect to the optical path 472 such that AOM 460₄ can perform both pulse selection and beam positioning. Such configuration could limit the total scanning angle to the workpiece 480. Skilled persons will appreciate that AOMs 460 employed in any previously described embodiments for beam positioning and/or amplitude modulation can also be employed for pulse picking by selectively positioning the AOM 60 with respect to the optical path 472.

Skilled persons will appreciate that current beam-positioning or scanning systems in laser processing equipment are generally mechanical in nature, being either a galvanometer-based system or a fast-steering-mirror—(FSM) or other type of movable-mirror-based system. Both the galvanometer and FSM techniques have mechanical masses that limit the overall scanning speed of the system. In general, the trade-off between scan angle and scanning speed can be seen in both of these systems: where galvanometer systems have a larger scanning angle and slower speed, whereas FSMs have a smaller scanning angle but higher speed.

Figure 37:
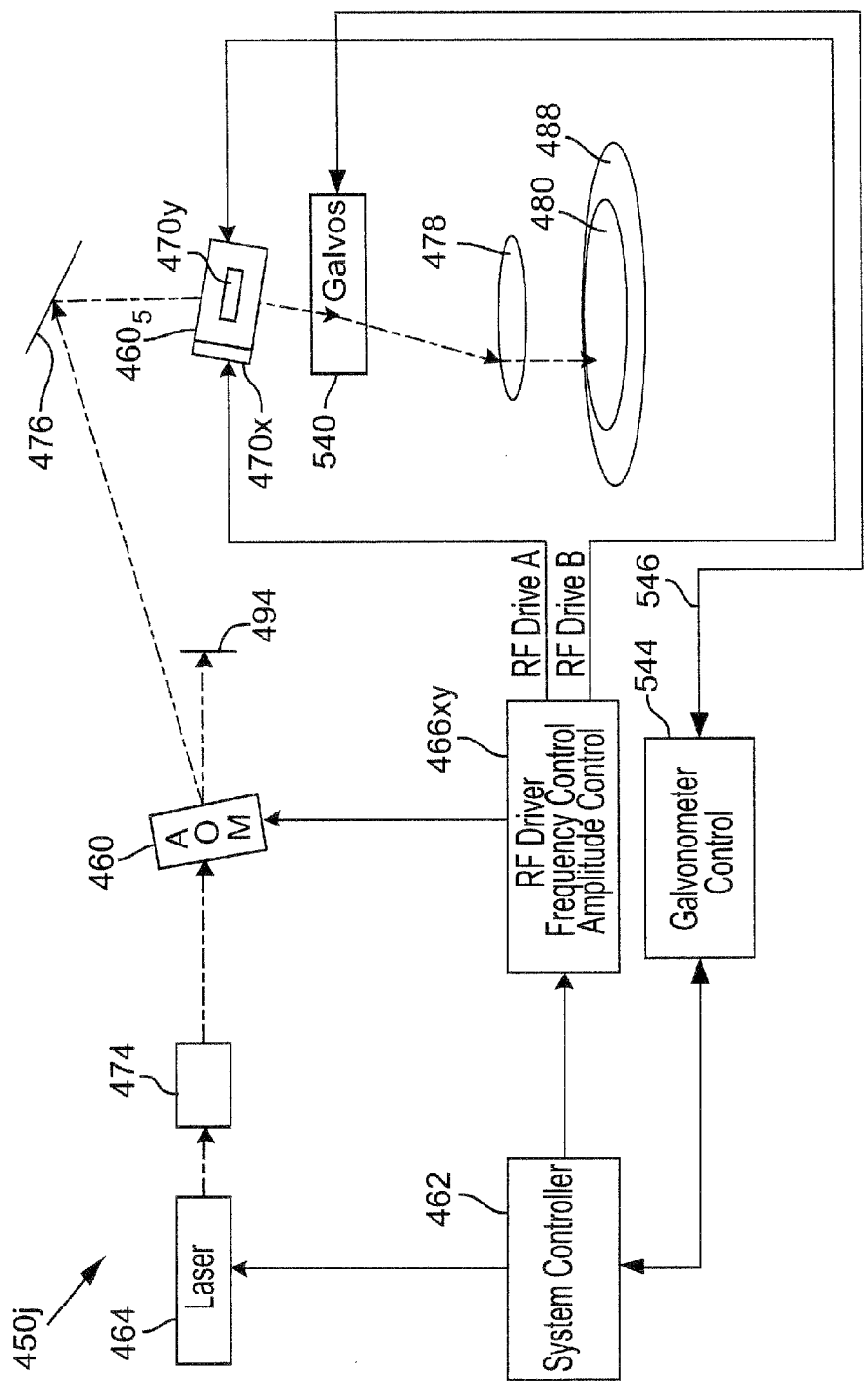
FIG. 37 is a schematic diagram of a laser system employing an extracavity AOM to effect laser pulse gating and an extracavity AOM employing at least two transducers to effect tertiary beam positioning in conjunction with a galvanometer.

FIG. 37 is a schematic diagram of an exemplary laser system 450j having a beam-positioning AOM 460₄ or 460₅ that works in conjunction with a typical fast positioner, such as an FSM or a galvanometer scan head 540 including a pair of galvanometer mirrors, to improve overall throughput of a laser system 450 by having a multiple compound or tertiary beam-positioning system supported by a conventional slow positioner (such as a single axis or split-axis X-Y table). The AOM 460₄ or 460₅ or a pair of AOMs 460 or 460₃ can be upstream or downstream of the galvanometer scan head 540. The motion between the AOM and galvanometer scanning systems can be coordinated directly or indirectly by the system controller 462, with or without the aid of the RF driver(s) 466xy and/or a galvanometer controller 544 that receives galvanometer feedback signals 546 from the galvanometer scan head 540.

Skilled persons will appreciate that a separate AOM 460 for pulse picking is shown and may be used to simplify motion-control coordination; however, the AOM 460 can be omitted and the AOM 460₄ or 460₅ can be used for pulse picking as well as for beam positioning. Skilled persons will also appreciate that although an open-loop system is shown for simplicity, alternative embodiments of laser system 450j can easily be implemented to include position and or amplitude feedback for closed-loop control. Skilled persons will also appreciate that the AOM 460₄ or 460₅ can be modulated as discussed with respect to any previous embodiment and that laser system 450j can be adapted to incorporate the variations of any previously discussed embodiment.

Figure 38:
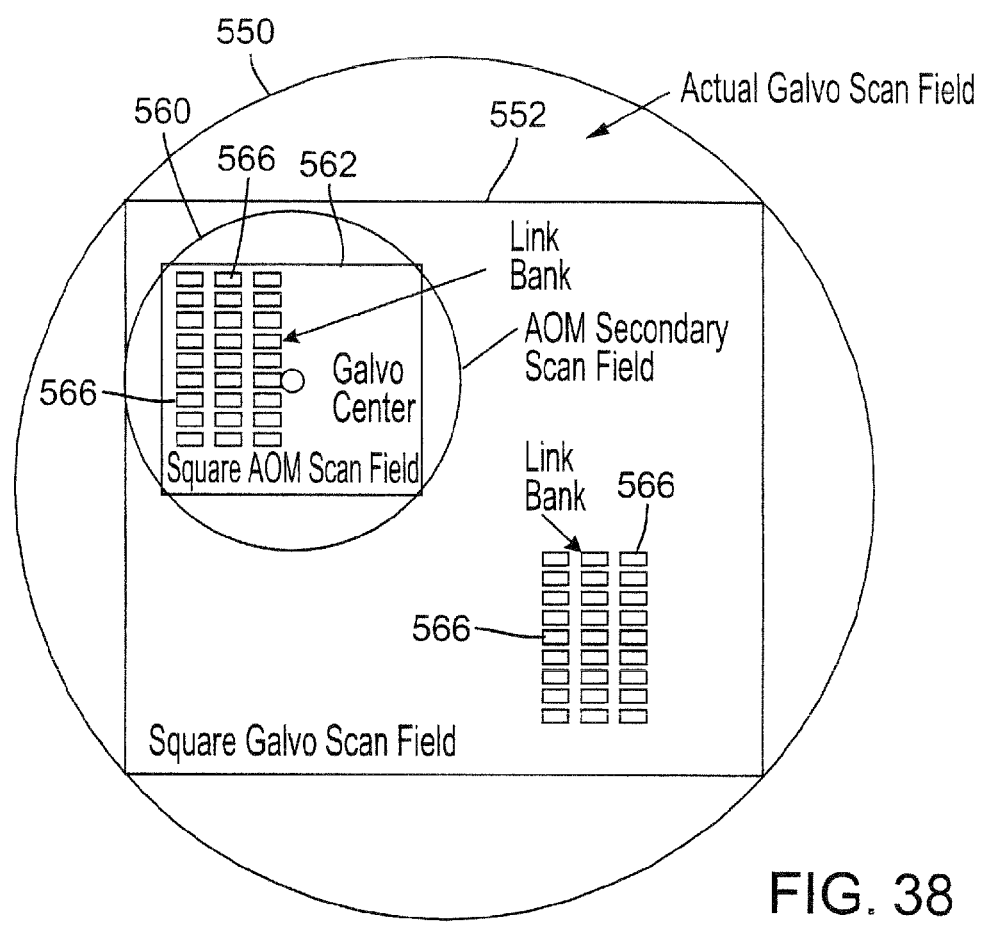
FIG. 38 is a representation of an exemplary scan field of the galvanometer scan head and an AOM as they may be used in conjunction for a laser link severing application.

FIG. 38 is a representation of exemplary scan fields of the galvanometer scan head 540 and AOM 460₄ or 460₅ as they may be used in conjunction for different laser processing applications, such as link processing. With reference to FIGS. 37 and 38 and conventional beam-positioning technology, although an X-Y table may be employed to move the chuck 488 and its supported workpiece 480, the galvanometer scan head 540 may have a fixed position or may be positioned in a split-axis arrangement so that it can be directed along one or more geometrical axes. The relative movement between the galvanometer scan head 540 and the workpiece 480 can be used to position a main galvanometer scan field 550 (and its square galvanometer subfield 552) within a main AOM scan field 560 (and its square AOM subfield 562) with respect to targets on the surface of the workpiece 480. Because the galvanometer bandwidth is much smaller than the AOM bandwidth, the galvanometer (and the workpiece 480) can be kept in continuous motion while the AOM 460₄ or 460₅ processes targets within its main AOM scan field 560. This is in addition to the coordinated motion of the linear motor and the galvanometer.

Such an adaptation would be very beneficial for laser applications having very high-density processing sites. The smaller and much faster AOM scan field 560 would be able to process multiple resistors 564, multiple links 566, and multiple IC packages very quickly in one single galvanometer move, instead of numerous conventional galvanometer moves.

In addition to use as a beam-positioning system, as a substitution for an FSM and/or a galvanometer scan head, or as an additional beam-positioning system component, an AOM scanning system could be used for simulated spot enlargement or abbe error correction and can be positioned along the beam path before or after the "fast" positioning components. Furthermore, skilled persons will appreciate that one or more AOMs 460 with or without modulation enhancement may be substituted for (or added to) any of the "fast" positioning system components described in U.S. Pat. Nos. 4,532,402, 5,751,585, 5,847,960, 6,430,465, and 6,706,999 and U.S. Patent Publication No. US 2002/0117481, which are herein incorporated by reference.

It will be obvious to those having skill in the art that many changes may be made to the details of the above-described embodiment of this invention without departing from the underlying principles thereof. The scope of this invention should, therefore, be determined only by the following claims.

The invention claimed is:

1. A method for increasing the throughput of a laser system for processing circuit links on a substrate, the circuit links being arranged in at least first and second parallel rows, comprising:
    generating laser output for propagation along a laser beam axis that intersects the substrate;
    imparting relative movement between the laser beam axis and the substrate along a first travel axis which is parallel to the first row of circuit links;
    processing multiple first circuit links, including at least first primary, secondary, and tertiary circuit links, in the first row with laser output during a first on-the-fly pass of relative movement between the laser beam axis and the substrate along the first travel axis; and
    imparting multiple temporary offsets to the laser beam axis, the offsets being in a direction that is transverse to the travel axis, to process multiple second circuit links, including at least second primary and secondary circuit links, in the second row with laser output during the first on-the-fly pass of relative movement between the laser beam axis and the substrate, wherein the second primary circuit link is processed after the first primary circuit link is processed and before the first secondary circuit link is processed, and wherein the second secondary circuit link is processed after the first secondary circuit link is processed and before the first tertiary circuit link is processed.

2. The method of claim 1 in which the relative movement between the laser beam axis and the substrate along a first travel axis is imparted by a motion stage.

3. The method of claim 2 in which a portion of the offset in the direction transverse to the travel axis is imparted by the motion stage.

4. The method of claim 2 in which a portion of the offset in the direction transverse to the travel axis is imparted by a second motion stage.

5. The method of claim 1 in which a portion of the offset in the direction transverse to the travel axis is imparted by the motion stage.

6. The method of claim 1 in which the relative movement between the laser beam axis and the substrate along a first travel axis is imparted by a split-axis positioner system.

7. The method of claim 1 in which the relative movement between the laser beam axis and the substrate along a first travel axis is imparted by a stacked stage positioner system.

8. The method of claim 1 in which the relative movement between the laser beam axis and the substrate along a first travel axis is imparted by a planar positioner system.

9. The method of claim 1 in which the first and second rows are next to each other.

10. The method of claim 1 in which at least a third circuit link is arranged in a third parallel row that is distinct from the first and second rows, the method further comprising:
    imparting to the laser beam axis another offset in a direction transverse to the travel axis to process at least the third circuit link in the third row with laser output during the first on-the-fly pass.

11. The method of claim 1 in which circuit links in the first and second rows are arranged in columns, including first and second neighboring columns, and in which the first and second primary circuit links processed are located in the first and second neighboring columns.

12. The method of claim 10 in which circuit links in the first, second, and third link rows are generally arranged in columns, including first and second neighboring columns, and in which two consecutively processed circuit links are in different rows and neighboring columns.

13. The method of claim 1 in which all of the circuit links to be processed are contained in a total number of rows, the method further comprising:
    conducting a total number of on-the-fly passes of the laser beam axis relative to the substrate, in which at least one circuit link is processed during each on-the-fly pass, and the total number of passes being fewer than the total number of rows having circuit links to be processed.

14. A method for increasing the throughput of a laser system for processing circuit links on a substrate, the circuit links being arranged in at least first and second parallel rows, comprising:
    generating laser output for propagation along a laser beam axis that intersects the substrate;
    imparting relative movement between the laser beam axis and the substrate along a first travel axis which is parallel to the first row of circuit links;
    processing multiple first circuit links in the first row with laser output during a first on-the-fly pass of relative movement between the laser beam axis and the substrate along the first travel axis; and
    imparting multiple temporary offsets to the laser beam axis, the offsets being in a direction that is transverse to the travel axis, to process multiple second circuit links in the second row with laser output during the first on-the-fly pass of relative movement between the laser beam axis and the substrate such that at least one second circuit link is processed temporally between two first circuit links, and at least a portion of each of the multiple offsets to the laser beam axis being imparted by a high-speed beam steering device.

15. The method of claim 14 wherein the high-speed beam steering device employs a piezoelectric actuator.

16. The method of claim 14 wherein the high-speed beam steering device employs a electrostrictive actuator.

17. The method of claim 14 wherein the high-speed beam steering device employs a voice coil actuator.

18. The method of claim 14 in which the high-speed beam steering device comprises a fast steering mirror.

19. The method of claim 14 in which the high-speed beam steering device has a maximum beam axis deflection range of less than or equal to 100 microns at the substrate.

20. The method of claim 14 in which the high-speed beam steering system has a maximum beam axis deflection range of less than or equal to 50 microns at the substrate.

21. The method of claim 14 in which the high-speed beam steering device has a maximum beam axis deflection range of less than or equal to 20 microns at the substrate.

22. The method of claim 14 in which the high-speed beam steering device comprises a two-axis steering device.

23. The method of claim 22, further comprising:
a focusing lens having an entrance pupil, the high-speed beam steering device being positioned within 1 mm of the entrance pupil.

24. The method of claim 22, further comprising:
a focusing lens having an entrance pupil; and
a relay lens positioned between the focusing mirror and the high-speed beam steering device, the relay lens imaging the pivot point of the high-speed beam steering device to the focusing lens.

25. The method of claim 14 in which the high-speed beam steering device is positioned upstream of a focusing lens through which the laser beam axis propagates to intersect the substrate.

26. The method of claim 14, further comprising:
employing a calibration procedure to characterize movement of the laser beam axis by the high-speed beam steering device, prior to the step of processing at least a first circuit link.

27. The method of claim 14, further comprising:
employing a command generator to generate control signals of a motion stage and the high-speed beam steering device.

28. The method of claim 27 in which the high-speed beam steering device control signals comprise a component to compensate for one or more error signals.

29. The method of claim 28 in which at least one error signal is indicative of an error in the position of a motion stage that moves the substrate.

30. The method of claim 28 wherein at least one error signal is provided by sensor information that is indicative of laser beam alignment with respect to a reference datum.

31. The method of claim 14 wherein the high-speed beam steering device has an angular positioning accuracy of 10 microradians or better.

32. The method of claim 14 wherein the high-speed beam steering device has a resolution of 1 microradian or better.

33. The method of claim 14 wherein the high-speed beam steering device has a resolution of 0.1 microradian or better.

34. The method of claim 14 wherein the high-speed beam steering device contributes a beam position error at the substrate of less than 50 nanometers.

35. The method of claim 14 in which the relative movement between the laser beam axis and the substrate along a first travel axis is imparted by a motion stage.

36. The method of claim 14 in which a portion of the offset in the direction transverse to the travel axis is imparted by a motion stage.

37. A method for accurately processing circuit links on a substrate using a laser system, comprising:
determining a first calibration which characterizes the relative motion of a laser beam axis that intersects the substrate and target links on the substrate in response to commands of a motion stage;
determining a second calibration which characterizes the relative motion of the laser beam axis that intersects the substrate and target links on the substrate in response to commands of a high-speed beam steering device;
generating stage motion commands based upon the first calibration;
generating high-speed beam steering device commands based upon the second calibration;
imparting relative movement between the laser beam axis and the substrate by the simultaneous use of the motion stage and the high-speed beam steering device; and
generating laser output for propagation along the laser beam axis that intersects the substrate during the relative movement between the laser beam axis and the substrate.

38. The method of claim 37 wherein the calibrations correct for scale factors and/or rotations.

39. The method of claim 37 wherein the calibrations correct for nonlinearities.

40. The method of claim 37 wherein errors in the coordinate system of the motion stage and transformed into the coordinate system of the high-speed beam steering device.

41. The method of claim 37 wherein circuit links are supported by the substrate and are arranged in a total number of parallel rows, wherein the total number of rows is greater than two rows, the method further comprising:
conducting a total number of on-the-fly passes of the laser beam axis relative to the substrate, wherein multiple circuit links are processed during each on-the-fly pass in at least two parallel rows such that at least one circuit link in a first row is processed temporally between two circuit links in a second row, and the total number of passes being fewer than the total number of rows having circuit links to be processed.

42. A method for increasing the throughput of a laser system for processing circuit links on a substrate, the circuit links being arranged in a total number of parallel rows, wherein the total number of rows is greater than two rows, comprising:
generating laser output for propagation along a laser beam axis that intersects the substrate;
imparting relative movement between the laser beam axis and the substrate along a first travel axis which is parallel to the rows of circuit links;
imparting a temporary offset to the laser beam axis during the relative movement between the laser beam axis and the substrate, the offset being in a direction that is transverse to the travel axis; and
conducting a total number of on-the-fly passes of the laser beam axis relative to the substrate, wherein multiple circuit links are processed during each on-the-fly pass in at least two parallel rows such that at least one circuit link in a first row is processed temporally between two circuit links in a second row, and the total number of passes being fewer than the total number of rows having circuit links to be processed.

43. The method of claim 1 in which circuit links in the first, second, and third link rows are generally arranged in columns, including first, second, and third sequentially neighboring columns, and in which the first secondary link is in the first column, the second secondary link is in the second column, and the first tertiary link is in the third column.

44. The method of claim 1 in which the circuit links are processed in order according to the relative movement along the first travel axis.

45. The method of claim 1 in which a circuit link in the second row or third row is processed with a single offset from the first row.

* * * * *